(12) United States Patent
Dharmaraju et al.

(10) Patent No.: US 8,667,144 B2
(45) Date of Patent: Mar. 4, 2014

(54) WIRELESS ARCHITECTURE FOR TRADITIONAL WIRE BASED PROTOCOL

(75) Inventors: Dinesh Dharmaraju, San Diego, CA (US); Ranganathan Krishnan, San Diego, CA (US); Soham Sheth, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 517 days.

(21) Appl. No.: 12/179,411

(22) Filed: Jul. 24, 2008

(65) Prior Publication Data
US 2009/0031035 A1   Jan. 29, 2009

Related U.S. Application Data

(60) Provisional application No. 60/951,919, filed on Jul. 25, 2007.

(51) Int. Cl.
*G06F 15/16*   (2006.01)

(52) U.S. Cl.
USPC ............................. 709/227; 709/203; 709/230

(58) Field of Classification Search
USPC .......................................... 709/227, 203, 230
See application file for complete search history.

(56) References Cited

U.S. PATENT DOCUMENTS

| | | | |
|---|---|---|---|
| 4,791,554 A | 12/1988 | Hirota et al. | |
| 5,835,723 A | 11/1998 | Andrews et al. | |
| 5,925,137 A | 7/1999 | Okanoue et al. | |
| 6,049,549 A | 4/2000 | Ganz et al. | |
| 6,424,626 B1 | 7/2002 | Kidambi et al. | |
| 6,515,992 B1 | 2/2003 | Weston et al. | |
| 6,594,699 B1 | 7/2003 | Sahai et al. | |
| 6,748,195 B1 * | 6/2004 | Phillips | 455/41.2 |
| 6,760,772 B2 | 7/2004 | Zou et al. | |
| 6,876,857 B1 | 4/2005 | Nee et al. | |
| 6,917,976 B1 | 7/2005 | Slaughter et al. | |
| 7,035,281 B1 | 4/2006 | Spearman et al. | |
| 7,085,420 B2 | 8/2006 | Mehrotra | |
| 7,324,462 B1 * | 1/2008 | Page et al. | 370/255 |
| 7,328,021 B1 | 2/2008 | Satapathy | |
| 7,333,464 B2 * | 2/2008 | Yang et al. | 370/338 |

(Continued)

FOREIGN PATENT DOCUMENTS

| | | |
|---|---|---|
| CN | 1596004 A | 3/2005 |
| CN | 1774106 A | 5/2006 |

(Continued)

OTHER PUBLICATIONS

IEEE 802.15.3 MAC, "Part 15.3: Wireless Medium Access Control (MAC) and Physical Layer (PHY) Specifications for High Rate Wireless Personal Area Networks (WPANs)," IEEE Computer Society, Jun. 12, 2003.

(Continued)

*Primary Examiner* — Duyen Doan
(74) *Attorney, Agent, or Firm* — Donald C. Kordich

(57) ABSTRACT

Aspects describe service discovery of wireless MDDI client-capable devices though interaction with an underlying bearer protocol. Service discovery can be performed when the underlying layer supports multicasting, when the underlying layer is wiMedia UWB MAC and/or UDP/IP. Service discovery can be initiated by a w-MDDI sender and/or a w-MDDI receiver. An optional mutual security association procedure can be conducted if both devices support security and security is necessary.

62 Claims, 37 Drawing Sheets

(56) References Cited

U.S. PATENT DOCUMENTS

| | | | |
|---|---|---|---|
| 7,366,204 B2 | 4/2008 | Kang et al. | |
| 7,477,659 B1 | 1/2009 | Nee et al. | |
| 7,519,470 B2 | 4/2009 | Brasche et al. | |
| 7,529,823 B2 | 5/2009 | Trufinescu et al. | |
| 7,565,357 B2 | 7/2009 | Rao | |
| 7,696,980 B1 | 4/2010 | Piot et al. | |
| 7,716,385 B2 | 5/2010 | Saint-Hilaire et al. | |
| 7,719,972 B2 | 5/2010 | Yuan et al. | |
| 7,720,096 B2 | 5/2010 | Klemets | |
| 7,881,315 B2 | 2/2011 | Haveson et al. | |
| 7,929,475 B2 | 4/2011 | Simonson et al. | |
| 8,001,384 B2 | 8/2011 | Yamamoto et al. | |
| 8,102,849 B2 | 1/2012 | Martinez Bauza et al. | |
| 8,437,347 B2 | 5/2013 | Casaccia et al. | |
| 2002/0007494 A1 | 1/2002 | Hodge | |
| 2003/0033417 A1 | 2/2003 | Zou et al. | |
| 2003/0064752 A1 | 4/2003 | Adachi et al. | |
| 2003/0110297 A1 | 6/2003 | Tabatabai et al. | |
| 2003/0152098 A1 | 8/2003 | Zhu | |
| 2003/0225737 A1 | 12/2003 | Mathews | |
| 2004/0071169 A1 | 4/2004 | Abe et al. | |
| 2004/0103282 A1 | 5/2004 | Meier et al. | |
| 2004/0160967 A1 | 8/2004 | Fujita et al. | |
| 2004/0214571 A1 | 10/2004 | Hong | |
| 2005/0044142 A1 | 2/2005 | Garrec et al. | |
| 2005/0060750 A1 | 3/2005 | Oka et al. | |
| 2005/0096086 A1 | 5/2005 | Singamsetty | |
| 2005/0102699 A1 | 5/2005 | Kim et al. | |
| 2005/0111361 A1 | 5/2005 | Hosein | |
| 2005/0130611 A1 | 6/2005 | Lu et al. | |
| 2005/0136990 A1 | 6/2005 | Hardacker et al. | |
| 2005/0138193 A1 | 6/2005 | Encarnacion et al. | |
| 2005/0144225 A1 | 6/2005 | Anderson et al. | |
| 2005/0166241 A1 | 7/2005 | Kim et al. | |
| 2005/0176429 A1 | 8/2005 | Lee et al. | |
| 2005/0184993 A1 | 8/2005 | Ludwin et al. | |
| 2005/0198663 A1 | 9/2005 | Chaney et al. | |
| 2005/0266798 A1 | 12/2005 | Moloney et al. | |
| 2006/0002320 A1* | 1/2006 | Costa-Requena et al. | 370/312 |
| 2006/0013182 A1 | 1/2006 | Balasubramanian et al. | |
| 2006/0050640 A1 | 3/2006 | Jin et al. | |
| 2006/0058003 A1 | 3/2006 | Lee | |
| 2006/0069797 A1 | 3/2006 | Abdo et al. | |
| 2006/0098593 A1 | 5/2006 | Edvardsen et al. | |
| 2006/0101146 A1 | 5/2006 | Wang | |
| 2006/0133414 A1* | 6/2006 | Luoma et al. | 370/466 |
| 2006/0198448 A1 | 9/2006 | Aissi et al. | |
| 2006/0199537 A1 | 9/2006 | Eisenbach | |
| 2006/0218298 A1 | 9/2006 | Knapp et al. | |
| 2006/0233191 A1 | 10/2006 | Pirzada et al. | |
| 2006/0256851 A1 | 11/2006 | Wang et al. | |
| 2006/0268869 A1 | 11/2006 | Boers et al. | |
| 2006/0270417 A1 | 11/2006 | Chi | |
| 2006/0288008 A1 | 12/2006 | Bhattiprolu et al. | |
| 2007/0004387 A1* | 1/2007 | Gadamsetty et al. | 455/414.1 |
| 2007/0008922 A1 | 1/2007 | Abhishek et al. | |
| 2007/0022195 A1 | 1/2007 | Kawano et al. | |
| 2007/0037600 A1 | 2/2007 | Fukuda | |
| 2007/0057865 A1* | 3/2007 | Song et al. | 345/1.1 |
| 2007/0061433 A1 | 3/2007 | Reynolds et al. | |
| 2007/0126715 A1 | 6/2007 | Funamoto | |
| 2007/0141984 A1* | 6/2007 | Kuehnel et al. | 455/41.2 |
| 2007/0141988 A1 | 6/2007 | Kuehnel et al. | |
| 2007/0171910 A1* | 7/2007 | Kumar | 370/392 |
| 2007/0182728 A1 | 8/2007 | Fujimori | |
| 2007/0264988 A1 | 11/2007 | Wilson, Jr. et al. | |
| 2007/0264991 A1* | 11/2007 | Jones et al. | 455/420 |
| 2007/0292135 A1 | 12/2007 | Guo et al. | |
| 2008/0005348 A1 | 1/2008 | Kosiba et al. | |
| 2008/0018657 A1 | 1/2008 | Montag | |
| 2008/0031210 A1* | 2/2008 | Abhishek et al. | 370/338 |
| 2008/0037506 A1 | 2/2008 | Dharmaraju et al. | |
| 2008/0037785 A1 | 2/2008 | Gantman et al. | |
| 2008/0045149 A1* | 2/2008 | Dharmaraju et al. | 455/39 |
| 2008/0109763 A1 | 5/2008 | Lee | |
| 2008/0129879 A1 | 6/2008 | Shao et al. | |
| 2008/0198848 A1 | 8/2008 | Yamagishi | |
| 2008/0205394 A1 | 8/2008 | Deshpande et al. | |
| 2008/0232402 A1 | 9/2008 | Higuchi et al. | |
| 2008/0270532 A1 | 10/2008 | Billmaier et al. | |
| 2008/0273485 A1* | 11/2008 | Tsigler et al. | 370/328 |
| 2008/0304408 A1* | 12/2008 | Kraemer et al. | 370/230 |
| 2008/0307349 A1 | 12/2008 | Wang et al. | |
| 2008/0310391 A1* | 12/2008 | Schneidman et al. | 370/349 |
| 2009/0002263 A1 | 1/2009 | Pasetto | |
| 2009/0013081 A1* | 1/2009 | Laroia et al. | 709/228 |
| 2009/0070404 A1 | 3/2009 | Mazzaferri | |
| 2009/0089453 A1 | 4/2009 | Bohan et al. | |
| 2009/0102838 A1 | 4/2009 | Bullard et al. | |
| 2009/0109974 A1 | 4/2009 | Shetty et al. | |
| 2009/0133122 A1 | 5/2009 | Koo et al. | |
| 2009/0141692 A1* | 6/2009 | Kasslin et al. | 370/338 |
| 2009/0153737 A1 | 6/2009 | Glen | |
| 2009/0162029 A1 | 6/2009 | Glen | |
| 2009/0252130 A1 | 10/2009 | Sheth et al. | |
| 2010/0027467 A1 | 2/2010 | Wu et al. | |
| 2010/0118200 A1 | 5/2010 | Gelman et al. | |
| 2010/0134312 A1 | 6/2010 | Park et al. | |
| 2010/0146143 A1 | 6/2010 | Thorup | |
| 2010/0146583 A1 | 6/2010 | Prehofer et al. | |
| 2010/0153553 A1 | 6/2010 | Sheth et al. | |
| 2010/0166017 A1 | 7/2010 | Na et al. | |
| 2010/0172320 A1 | 7/2010 | Suzuki | |
| 2010/0189131 A1 | 7/2010 | Branam et al. | |
| 2010/0199187 A1 | 8/2010 | Lin et al. | |
| 2010/0205321 A1 | 8/2010 | Martinez Bauza et al. | |
| 2010/0257450 A1 | 10/2010 | Go et al. | |
| 2010/0289871 A1 | 11/2010 | Tatsuta et al. | |
| 2010/0289872 A1 | 11/2010 | Funabiki et al. | |
| 2011/0002255 A1 | 1/2011 | Dharmaraju et al. | |
| 2011/0019620 A1 | 1/2011 | Wang | |
| 2011/0037447 A1 | 2/2011 | Mair | |
| 2011/0069720 A1 | 3/2011 | Jacobs et al. | |
| 2011/0072473 A1 | 3/2011 | Funabiki et al. | |
| 2011/0107388 A1 | 5/2011 | Lee et al. | |
| 2011/0115818 A1 | 5/2011 | Chung et al. | |
| 2011/0128442 A1 | 6/2011 | Blanchard et al. | |
| 2011/0145879 A1 | 6/2011 | Rajamani et al. | |
| 2011/0149806 A1 | 6/2011 | Verma et al. | |
| 2011/0157470 A1 | 6/2011 | Tsuruga et al. | |
| 2011/0182195 A1 | 7/2011 | Oikawa | |
| 2011/0205433 A1 | 8/2011 | Altmann | |
| 2011/0216239 A1 | 9/2011 | Raveendran | |
| 2011/0216785 A1 | 9/2011 | Begen et al. | |
| 2011/0216829 A1 | 9/2011 | Raveendran | |
| 2011/0281557 A1 | 11/2011 | Choi et al. | |
| 2012/0036543 A1 | 2/2012 | George et al. | |
| 2012/0036549 A1 | 2/2012 | Patel et al. | |
| 2012/0044985 A1 | 2/2012 | Tao et al. | |
| 2012/0113113 A1 | 5/2012 | Hong | |
| 2013/0003621 A1 | 1/2013 | Huang et al. | |
| 2013/0003622 A1 | 1/2013 | Huang et al. | |
| 2013/0003624 A1 | 1/2013 | Huang et al. | |
| 2013/0009873 A1 | 1/2013 | Huang et al. | |
| 2013/0009887 A1 | 1/2013 | Huang et al. | |
| 2013/0009996 A1 | 1/2013 | Raveendran et al. | |
| 2013/0013318 A1 | 1/2013 | Huang et al. | |
| 2013/0033435 A1 | 2/2013 | Raveendran et al. | |
| 2013/0033496 A1 | 2/2013 | Raveendran et al. | |
| 2013/0047189 A1 | 2/2013 | Raveendran et al. | |
| 2013/0238702 A1 | 9/2013 | Sheth et al. | |

FOREIGN PATENT DOCUMENTS

| | | | |
|---|---|---|---|
| CN | 1832481 A | 9/2006 | |
| CN | 1983945 A | 6/2007 | |
| CN | 101083825 A | 12/2007 | |
| EP | 1206080 A1 | 5/2002 | |
| EP | 1233326 | 8/2002 | |
| EP | 1325591 A1 | 7/2003 | |
| EP | 1333373 A1 | 8/2003 | |
| EP | 1385336 A2 | 1/2004 | |
| EP | 1423778 A2 | 6/2004 | |
| EP | 1517228 A2 | 3/2005 | |

(56) References Cited

FOREIGN PATENT DOCUMENTS

| | | |
|---|---|---|
| EP | 1550264 A1 | 7/2005 |
| EP | 1653678 | 5/2006 |
| EP | 1944946 | 7/2008 |
| EP | 2012461 | 1/2009 |
| EP | 2037683 | 3/2009 |
| EP | 2190202 A1 | 5/2010 |
| GB | 2383920 A | 7/2003 |
| JP | 2000354031 A | 12/2000 |
| JP | 2002165248 A | 6/2002 |
| JP | 2002262341 A | 9/2002 |
| JP | 2003143237 A | 5/2003 |
| JP | 2004054783 A | 2/2004 |
| JP | 2004505531 A | 2/2004 |
| JP | 2004192120 A | 7/2004 |
| JP | 2004274159 A | 9/2004 |
| JP | 2004531916 | 10/2004 |
| JP | 2005515714 A | 5/2005 |
| JP | 2005142808 A | 6/2005 |
| JP | 2005204016 A | 7/2005 |
| JP | 2006514353 A | 4/2006 |
| JP | 2006254328 A | 9/2006 |
| JP | 2007082070 A | 3/2007 |
| JP | 2007088539 A | 4/2007 |
| JP | 2007274150 A | 10/2007 |
| JP | 2007282219 A | 10/2007 |
| JP | 2008191929 A | 8/2008 |
| JP | 2008547264 A | 12/2008 |
| KR | 1020050007533 | 1/2005 |
| KR | 20060060717 A | 6/2006 |
| RU | 2207723 C1 | 6/2003 |
| RU | 2005113275 A | 10/2005 |
| RU | 2269873 C2 | 2/2006 |
| TW | 496058 | 7/2002 |
| TW | I234954 | 6/2005 |
| TW | I239179 | 9/2005 |
| TW | 200618653 | 6/2006 |
| WO | WO0184291 A1 | 11/2001 |
| WO | WO0210942 | 2/2002 |
| WO | 0223825 A1 | 3/2002 |
| WO | WO0249314 A2 | 6/2002 |
| WO | 03061240 A1 | 7/2003 |
| WO | 2004034646 A1 | 4/2004 |
| WO | WO2005122509 | 12/2005 |
| WO | WO2006135289 A1 | 12/2006 |
| WO | WO2007000757 | 1/2007 |
| WO | WO2007021269 | 2/2007 |
| WO | 2008027724 A1 | 3/2008 |
| WO | 2008087713 A1 | 7/2008 |

OTHER PUBLICATIONS

Miller B et al., "Mapping salutation architecture APIs to Bluetooth service discovery layer," Bluetooth White Paper, [Online} Jul. 1, 1999, XP002511956.

Nordbotten, N.A. et al.. "Methods for service discovery in Bluetooth scatternets," Computer Communications, Elsevier Science Publishers BV, Amsterdam, NL, vol. 27, No. 11, Jul. 1, 2004, pp. 1087-1096, XP004503638.

International Search Report—PCT/US08/071147, International Search Authority—European Patent Office, Feb. 5, 2009.

Written Opinion—PCT/US08/071147, International Search Authority—European Patent Office, Feb. 5, 2009.

Euihyeok Kwon et al: "An idle timeslot reuse scheme for IEEE 802.15.3 high-rate wireless personal area networks" Vehicular Technology Conference, 2005. VTC-2005-FALL. 2005 IEEE 62nd Dallas, TX, USA Sep. 25-28, 2005, Piscataway, NJ, USA, IEEE, Sep. 25, 2005, pp. 715-719, XP010878576.

Zhanping Yin et al: "Third-party handshake protocol for efficient peer discovery in IEEE 802.15.3 WPANs" Broadband Networks, 2005 2nd International Conference on Boston, MA Oct. 3-7, 2005, Piscataway, NJ, USA IEEE, Oct. 3, 2005, pp. 902-911, XP010890303.

International Search Report—PCT/US07/069813, International Search Authority—European Patent Office, Jan. 18, 2008.

International Search Report—PCT/US07/069815, International Search Authority—European Patent Office, Feb. 7, 2008.

Helmy A: "Architectural framework for large-scale multicast in mobile ad hoc networks" Proceedings of IEEE International Conference on Communications.

Apr. 28-May 2, 2002—New York, NY, USA, IEEE, Piscataway, NJ, USA LNKDDOI: 10.1109/ICC.2002.997206, vol. 4, Apr. 28, 2002, pp. 2036-2042, XP010589844 ISBN: 978-0-7803-7400-3.

Basso et al., "RTP Payload Format for MPEG-4 Streams; draft-ietf-avt-mpeg4-multisi-03.txt", vol. avt, No. 3, Nov. 1, 2001, XP015015620, ISSN: 0000-0004.

Schulzrinne, et al., "RTP: A Transport Protocol for Real-Time Applications", rfc3550.txt, Jul. 1, 2003, XP015009332, ISSN: 0000-0003.

Video Electronics Standards Association (VESA) "Mobile Display Digital Interface Standard (MDDI)," Jul. 2004.

Apple, Safari Web Content Guide, Chapter 6, Handling Events, Oct. 12, 2011, retrieved from http://developerapple.com/library/safari/#documentation/AppleApplications/Reference/SafariWebContent/HandlingEvents/HandlingEvents.html.

Brandenburg, et al., AVTCore, RTCP for inter-destination media syncronization, Internet Draft, draft-ietf-avtcore-idms-092.txt, Oct. 31, 2011.

Doerffel T., "User manual iTALC—Intelligent Teaching and Learning with Computers Version 1.0.4", Jan. 29, 2008, pp. 1-17, XP55025785, Retrieved from the Internet: URL:http://italc.sourceforge.net/italc-manual-2007-01-29.pdf [retrieved on Apr. 29, 2012] the whole document.

McKnight et al. (TPRC 30th Research Conference on Communication, Information and Internet Policy, Aug. 2002) Virtual Markets in Wireless Grids: Peering Policy Obstacles, hereinafter referred as McKnight, pp. 1 and 20.

Media Content Distribution (MCD); 3D 1-30 Gaming Graphics Delivery Overview, Technical Report, European Telecommunications Standards Institute (ETSI), 650, Route Des Lucioles ; F-06921 Sophia-Antipolis ; France, vol . MCD, No. V1. 1. 1, Dec. 1, 2010, XP014061814, section 5.

Mihai Mitrea et al: "Novel approaches to 1-30 remote display representations: BiFS-based solution and its deployment within the FP7 MobiThin project", 87. MPEG Meeting; Feb. 2, 2009-Jun. 2, 2009; Lausanne; (Motion Picture Expert Group or ISO/IEC JTC1/SC29/WG11),, No. M16058, Jan. 29, 2009, XP030044655, sections 2 and 3.

MSDN DirectShow, retrieved Nov. 28, 2011 from: http://msdn.microsoft.com/en-us/library/dd375454(VS.85).aspx.

MSDN Windows Sockets 2, retrieved Nov. 28, 2011 from: http://msdn.microsoft.com/en-us/library/ms740673(VS.85).aspx.

Myers, et al: "Collaboration Using Multiple PDAS Connected to a PC," Proceedings of the ACM Conference on Computer Supported Cooperative Work (CSCW), Nov. 14, 1998, pp. 285-294, ISBN: 978-1-58113-009-6.

Nave I et al., "Games@large graphics streaming architecture", Consumer Electronics, 2008. ISCE 2008. IEEE International Symposium on, IEEE, Piscataway, NJ, USA, Apr. 14, 2008, pp. 1-4, XP031283619, ISBN: 978-1-4244-2422-1 abstract col. 2-col. 6.

Shoji Y., et al., "Research and Standardization activty for IEEE802.15.3c mmW WPAN: (2) Target applications and Usage Models", IEICE Tech. Rep., vol. 106, No. 555, RCS2006-279, pp. 179-182, Feb. 2007.

Taiwan Search Report—TW097128564—TIPO—Nov. 22, 2011.

Wenger et al., "RTP Payload Format for H.264 Video," Network Working Group, RFC 3984, Feb. 2005, 78 pp.

Co-pending U.S. Appl. No. 10/236,657, filed Sep. 6, 2002.

\* cited by examiner

| Client # | MAC address | Client ID |
|---|---|---|
| 1 | X:Y:Z:P:Q:R | C21 |
| 2 | U:V:W:L:M:N | C22 |

WIRELESS ARCHITECTURE FOR TRADITIONAL WIRE BASED PROTOCOL

RELATED APPLICATIONS

This application claims the benefit of U.S. Provisional Application Ser. No. 60/951,919, filed Jul. 25, 2007, entitled "WIRELESS ARCHITECTURE FOR A TRADITIONAL WIRE-BASED PROTOCOL" the entirety of which is incorporated herein by reference.

BACKGROUND

I. Field

The following description relates generally to communication systems and more particularly to enabling traditional wire-based devices to communicate over a wireless link and/or a wired link.

II. Background

Wireless networking systems are utilized by many to communicate wherever the user may be located at a particular time (e.g., home, office, traveling, . . . ) Wireless communication devices have become smaller and more powerful (e.g., increased functionality and/or applications, larger memory capacity) to meet user needs while improving portability and convenience. Users have found many uses for wireless communication devices including cellular telephones, personal digital assistants (PDAs) and the like. For example, wireless communication devices can include functionality to capture and process images (e.g., still images, moving images, video gaming, and the like).

Applications and/or functionalities that operate utilizing very high data rates can have substantial power requirements and/or high current levels. Such power requirements and/or current levels are readily available for devices that communicate utilizing a wired protocol. However, wireless communication systems may not have the capability to operate utilizing the high data rates. Thus, the communication a user desires to send and/or receive can be limited in some situations.

Some devices have traditionally only operated in a wired capacity, such as, for example, a Mobile Display Digital Interface (MDDI). Thus, a user having such a device may not be able to communicate while mobile (e.g., while traveling or on the move) and may need to expend further costs to obtain a wireless device, which may not always be feasible. In some situations, a user may decide to operate two devices, one with wired capacity and one with wireless capacity to achieve the benefits of both devices. However, the costs associated with two devices, as well as keeping track of both devices, might impose an undue burden on a user.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with service discovery between a wireless MDDI (w-MDDI) host and a w-MDDI client in order for the devices to associate with each other and utilize capabilities of each other. The service discovery can be initiated by either the host and/or the client. The service discovery is performed through interaction with an underlying bearer protocol, which can be wiMedia UWB MAC and/or UDP/IP and/or can support multicasting. An optional mutual authentication can be performed prior to device association.

An aspect relates to a method for wirelessly communicating data at a high rate between a host entity and at least one remote wireless MDDI client capable device. The method includes performing a service discovery process to obtain information related to a plurality of wireless MDDI client capable devices in a local area and receiving an indication to associate with at least one of the plurality of wireless MDDI client capable devices. The method also includes determining security capabilities of each of the plurality of wireless MDDI client capable devices and selectively performing a security association procedure. Further, the method includes associating with the at least one of the plurality of wireless MDDI client capable devices.

Another aspect relates to a wireless communications apparatus that includes a memory and a processor. The memory retains instructions related to performing a service discovery process to gather information related to a plurality of wireless MDDI client capable devices in a local area and receiving a request to associate with at least one of the plurality of wireless MDDI client capable devices. The memory also retains instructions related to determining security capabilities of each of the plurality of wireless MDDI client capable devices, performing a security association procedure, and associating with the at least one of the plurality of wireless MDDI client capable devices. The processor is coupled to the memory and is configured to execute the instructions retained in the memory.

A further aspect relates to a wireless communications apparatus that wirelessly communicates data at a high rate. The apparatus includes a means for performing a service discovery process to gather information related to a plurality of wireless MDDI client capable devices in a local area and a means for receiving a request to associate with at least one of the plurality of wireless MDDI client capable devices. Also included in apparatus is a means for determining security capabilities of each of the plurality of wireless MDDI client capable devices, a means for selectively performing a security association procedure, and a means for associating with the at least one of the plurality of wireless MDDI client capable devices.

Yet another aspect relates to a computer program product that comprises a computer-readable medium. The computer-readable medium includes a first set of codes for causing a computer to perform a service discovery process to obtain information related to a plurality of wireless MDDI client capable devices in a local area. The computer-readable medium also includes a second set of codes for causing the computer to receive an indication to associate with at least one of the plurality of wireless MDDI client capable devices and a third set of codes for causing the computer to determine security capabilities of each of the plurality of wireless MDDI client capable devices. Further, the computer-readable medium includes a fourth set of codes for causing the computer to perform a security association procedure and a fifth set of codes for causing the computer to associate with the at least one of the plurality of wireless MDDI client capable devices.

Still another aspect relates to at least one processor configured to communicate data at a high rate between a host entity and at least one remote wireless MDDI client capable device. The processor includes a first module for performing a service discovery process to obtain information related to a plurality of wireless MDDI client capable devices in a local area and a second module for receiving an indication to associate with at least one of the plurality of wireless MDDI client capable device. Also include in processor is a third module for determining security capabilities of each of the plurality of wireless MDDI client capable devices. Further, processor includes a fourth module for selectively performing a security association procedure and a fifth module for associating with the at least one of the plurality of wireless MDDI client capable devices.

Another aspect relates to a method for wirelessly communicating data at a high rate with a host entity. The method includes transmitting a neighbor list message to a lower layer, the neighbor list message solicits a list of devices in a local area and receiving a list of devices in the local area. The method also includes sending a host query packet to each of the devices, receiving a reply that includes string identifiers for the replying device, and selectively associating with the replying device. The reply is received before expiration of a predetermined interval.

Another aspect relates to a wireless communications apparatus that includes a memory and a processor. The processor is coupled to the memory and is configured to execute the instructions retained in the memory. The memory retains instructions related to transmitting a neighbor list message to a lower layer. The neighbor list message solicits a list of devices in a local area. The memory also retains instructions related to receiving a list of devices in the local area and sending a host query packet to each of the devices. Further, the memory retains instructions related to receiving a reply that includes string identifiers for the replying device and selectively associating with the replying device. The reply is received before expiration of a predetermined interval.

Still another aspect relates to a wireless communications apparatus that wirelessly communicates data at a high rate. The apparatus includes a means for sending a neighbor list message to a lower layer and a means for receiving a list of devices in the local area. The neighbor list message solicits a list of devices in a local area. The apparatus also includes a means for transmitting a host query packet to each of the devices and a means for receiving a reply that includes string identifiers for the replying device. The reply is received before expiration of a predetermined interval. Also included is a means for associating with the replying device.

Yet another aspect relates to a computer program product that includes a computer-readable medium. The computer-readable medium includes a first set of codes for causing a computer to transmit a neighbor list message to a lower layer. The neighbor list message solicits a list of devices in a local area. Also included in the computer-readable medium is a second set of codes for causing the computer to receive a list of devices in the local area and a third set of codes for causing the computer to transmit a host query packet to each of the devices. Also included is a fourth set of codes for causing the computer to receive a reply that includes string identifiers for the replying device and a fifth set of codes for causing the computer to associate with the replying device. The reply is received before expiration of a predetermined interval; and Still a further aspect relates to at least one processor configured to communicate data at a high rate. The processor includes a first module for transmitting a neighbor list message to a lower layer and a second module for receiving a list of devices in the local area. The neighbor list message solicits a list of devices in a local area. Processor also includes a third module for sending a host query packet to each of the devices and a fourth module for receiving a reply that includes string identifiers for the replying device. The reply is received before expiration of a predetermined interval. Also included in processor is a fifth module for selectively associating with the replying device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
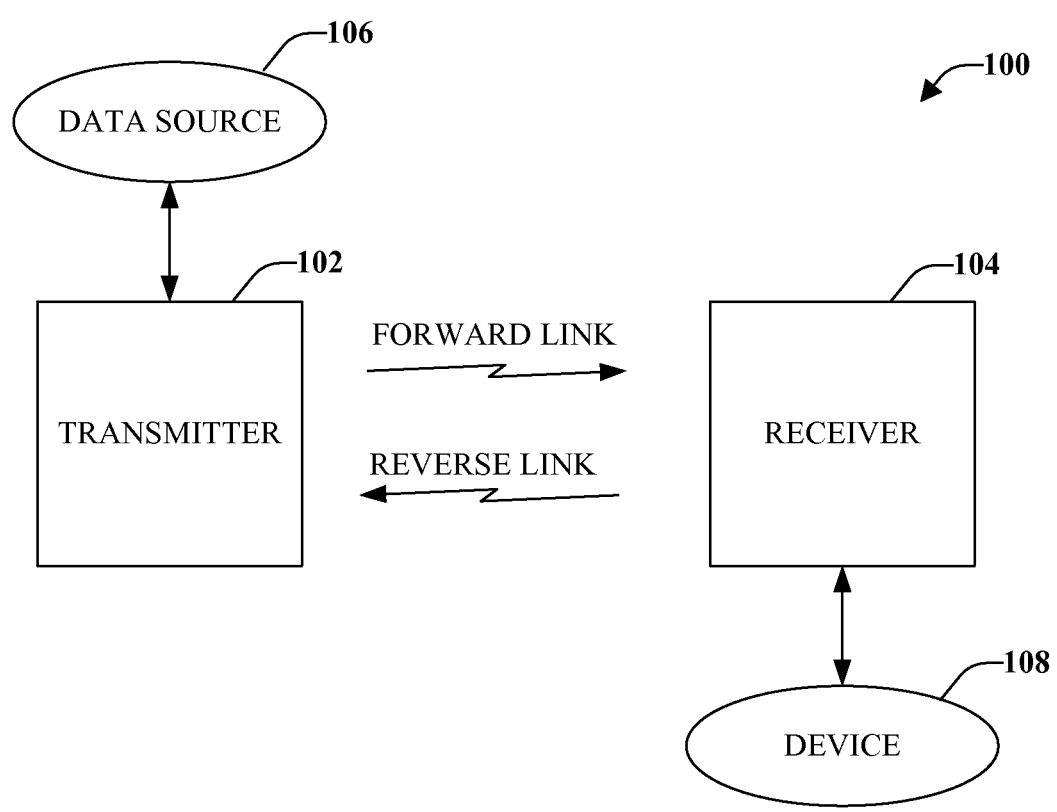
FIG. 1 illustrates a block diagram of a system for enabling a traditional wire-based device to communicate wirelessly.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

With reference now to the drawings, FIG. 1 illustrates a block diagram of a system 100 for enabling a traditional wire-based device to communicate wirelessly. The various aspects disclosed herein can be applied to generic wireless video, distributed MACs, distributed resources, peer-to-peer wireless MACs, and so on. System 100 includes a transmitter 102 in wired and/or wireless communication with a receiver 104. Transmitter 102 and receiver 104 can be components that traditionally communicate over a wire-based protocol. Although a number of transmitter(s) 102 and receiver(s) 104 can be included in system 100, as will be appreciated, a single transmitter 102 that transmits communication data signals to a single receiver 104 is illustrated for purposes of simplicity.

Transmitter 102 and receiver 104 can be Mobile Display Digital Interface (MDDI) devices. In the following detailed description, various aspects are described in the context of MDDI devices and/or Institute of Electrical and Electronics Engineers (IEEE) 802.15.3 medium access control (MAC) layer. Those skilled in the art will readily appreciate that these aspects are likewise applicable for use in various other traditionally wire based protocols. Accordingly, any reference to an MDDI and/or IEEE 802.15.3 MAC is intended only to illustrate the inventive aspects, with the understanding that such inventive aspects have a wide range of applications.

The communication sent from the transmitter 102 to the receiver 104 is referred to as the forward link (e.g., data from the host to the client travels in the forward direction) and the communication sent from receiver 104 to transmitter 102 is referred to as the reverse link (e.g., data from the client to the host travels in the reverse direction).

Information transmitted over the MDDI link (e.g., forward link, reverse link) is grouped into packets. Multiple packets are grouped together into a sub-frame and multiple sub-frames constitute a media frame. Each sub-frame begins with a special packet, referred to as a sub-frame header packet. The reverse link packet transmissions are not controlled by the host. Whenever the w-MDDI receiver intends to transmit packets on the reverse link, the receiver directly sends the packets to the w-MDDI sender through an underlying wireless MAC.

Transmitter 102 can be connected to a data source 106 (e.g., storage, memory, and the like) and receiver 104 can be connected to an interface device 108, such as a display. In accordance with some aspects, a single transmitter 102 can be associated with multiple receivers 104.

In accordance with some aspects, the transmitter is an MDDI-host that desires to associate with one or more MDDI-clients (e.g., receiver(s) 104). The term "host" is used interchangeably herein with the term "sender" and/or "device", depending on the context of how that term is used. Further, the term "client" can be used interchangeably herein with the terms "receiver" and/or "device", depending on the context of how that term is used.

If the MDDI-host desires to associate with an MDDI-receiver to wirelessly communicate data at a high rate between the devices, the host performs a service discovery process. The service discovery process solicits information related to a plurality of wireless MDDI client capable devices in a local area. During the service discovery process, the w-MDDI host receives information related to a multitude of wireless w-MDDI client capable devices. The information includes a string identifier corresponding to a device name, capabilities of the device, and a state indication. This information can be retained locally at the w-MDDI host.

In accordance with some aspects, during the service discovery process the w-MDDI host transmits a message to a lower layer to obtain a list of devices in a local area that support w-MDDI. The lower layer responds with a list of devices and the w-MDDI host sends a packet to each of the devices included in the received list. The devices that desire to participate send a response that contains strings identifiers for each of the responding devices.

After the service discovery process, the w-MDDI host determines security capabilities of each of the wireless w-MDDI client capable devices (e.g., is the client security enabled, does the client require security). The w-MDDI host can present a list of the devices and a user can select one or more of the devices. After receiving the selection, the w-MDDI host selectively performs a (mutual) security association procedure (if needed) and associates with the at least one of the wireless MDDI client capable devices.

In accordance with some aspects, the lower layer supports multicast. If multicast is supported, the w-MDDI host can transmit a service query packet to a multicast group to solicit information from a selected wireless MDDI client capable device, wherein the multicast group is specified by a multicast address.

If the lower layer is wiMedia UWB MAC, the w-MDDI host can receive application specific information elements related to each of the w-MDDI client capable devices. If the lower layer is UDP/IP, the w-MDDI host transmits a service query packet to a multicast group on a UDP port, joins the multicast group on the UDP port and receives a service response from each device that supports w-MDDI.

In accordance with some aspects, the w-MDDI client (e.g., receiver 104) can initiate the association with a w-MDDI host (e.g., transmitter 102) to wirelessly communicate data at a high rate. The w-MDDI client can transmit a neighbor list message to a lower layer. The neighbor list message solicits a list of devices in a local area. According to some aspects, the lower layer can support multicasting. In accordance with some aspects, the lower layer is wiMedia UWB MAC and/or UDP/IP.

Upon receiving a list of devices in the local area (in response to the neighbor list message), the w-MDDI client sends a host query packet to each of the devices. In response to this message, each of the devices transmits a reply that includes string identifiers for the replying device. The reply should be received before expiration of a predetermined interval. The w-MDDI client selectively associates with at least one of the replying devices. If a reply is not received before expiration of a predetermined interval, the association is unsuccessful and the w-MDDI client returns to a previous state (e.g., the state the w-MDDI client was in before starting the association process.

The various aspects disclosed herein can preserve the link and the packet structure of the MDDI so that the beneficial features of MDDI (e.g., partial screen updates, user-data packets, control and status packets, and so forth) can be preserved. Further, the MDDI protocol can run on the top of high speed wireless AMC, which provides peer-to-peer communication. Further, wireless MDDI does not interfere with the functioning of the wireless MAC.

Figure 2:
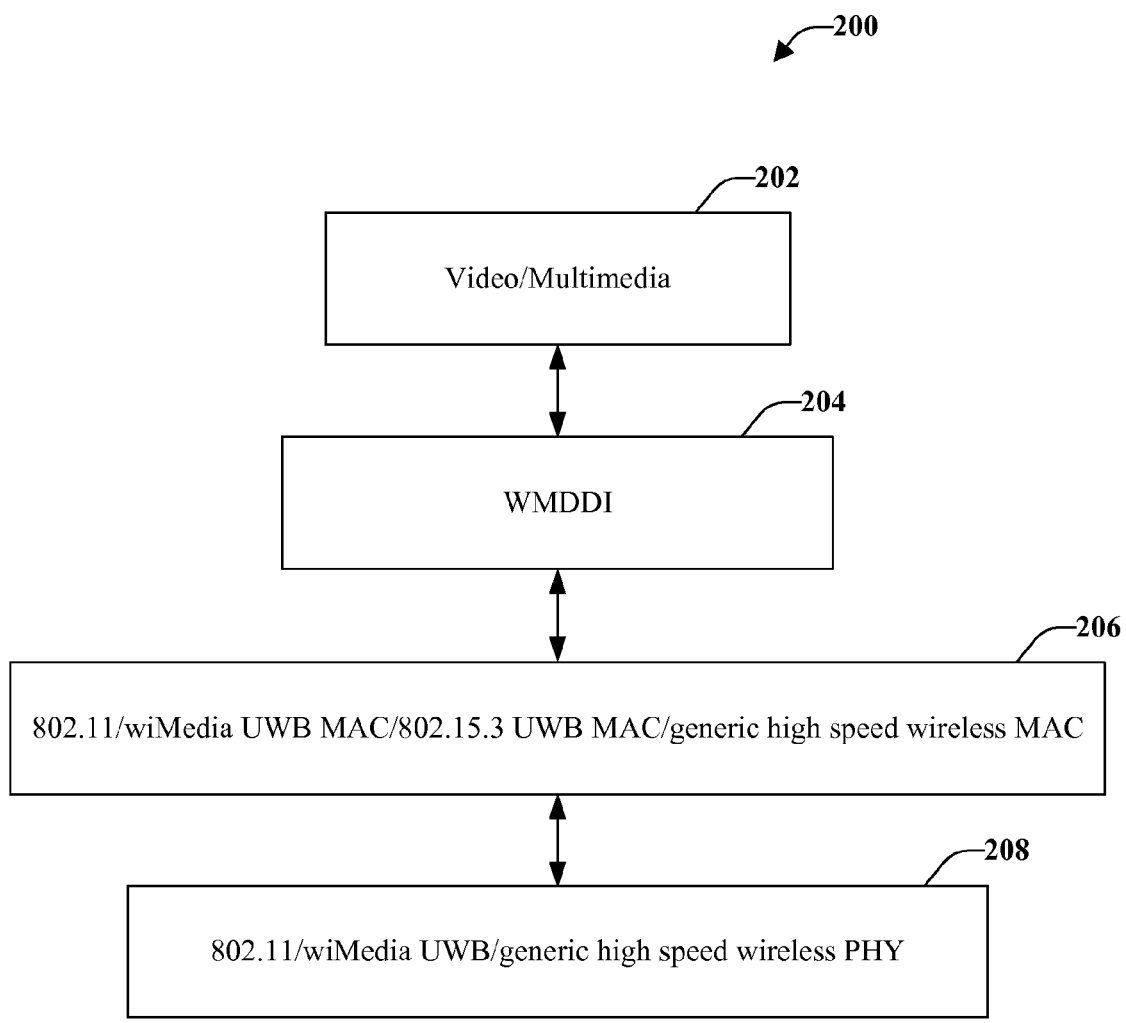
FIG. 2 illustrates a wireless MDDI protocol stack.

FIG. 2 illustrates a wireless MDDI protocol stack 200. Wireless MDDI protocol is generic and can operate on a variety of high-speed wireless technology. Examples of high-speed wireless technology include WiMedia Ultra-Wide Band (UWB), Wifi, 1×EVDO, and so forth. As illustrated in the vertical stack 200, a Video/Multimedia layer 202 can run on top of a Wireless MDDI (w-MDDI) layer 204. Also included is an underlying MAC layer 206, which can be 802.11, wiMedia UWB MAC, 802.15.3 UWB Mac, a generic high speed wireless MAC, and so forth. The MDDI protocol stack 200 also includes a Physical (PHY) layer 208, which can be an 802.11, wiMedia UWB, generic high speed wireless PHY, and so forth.

The MAC layer 206 and corresponding PHY layer 208 can be any generic high-speed interface. The illustrated MDDI protocol stack 200 is operating over a generic high-speed L2, which is a generic term for the MAC and Link Layer in a wireless communication network.

Figure 3:
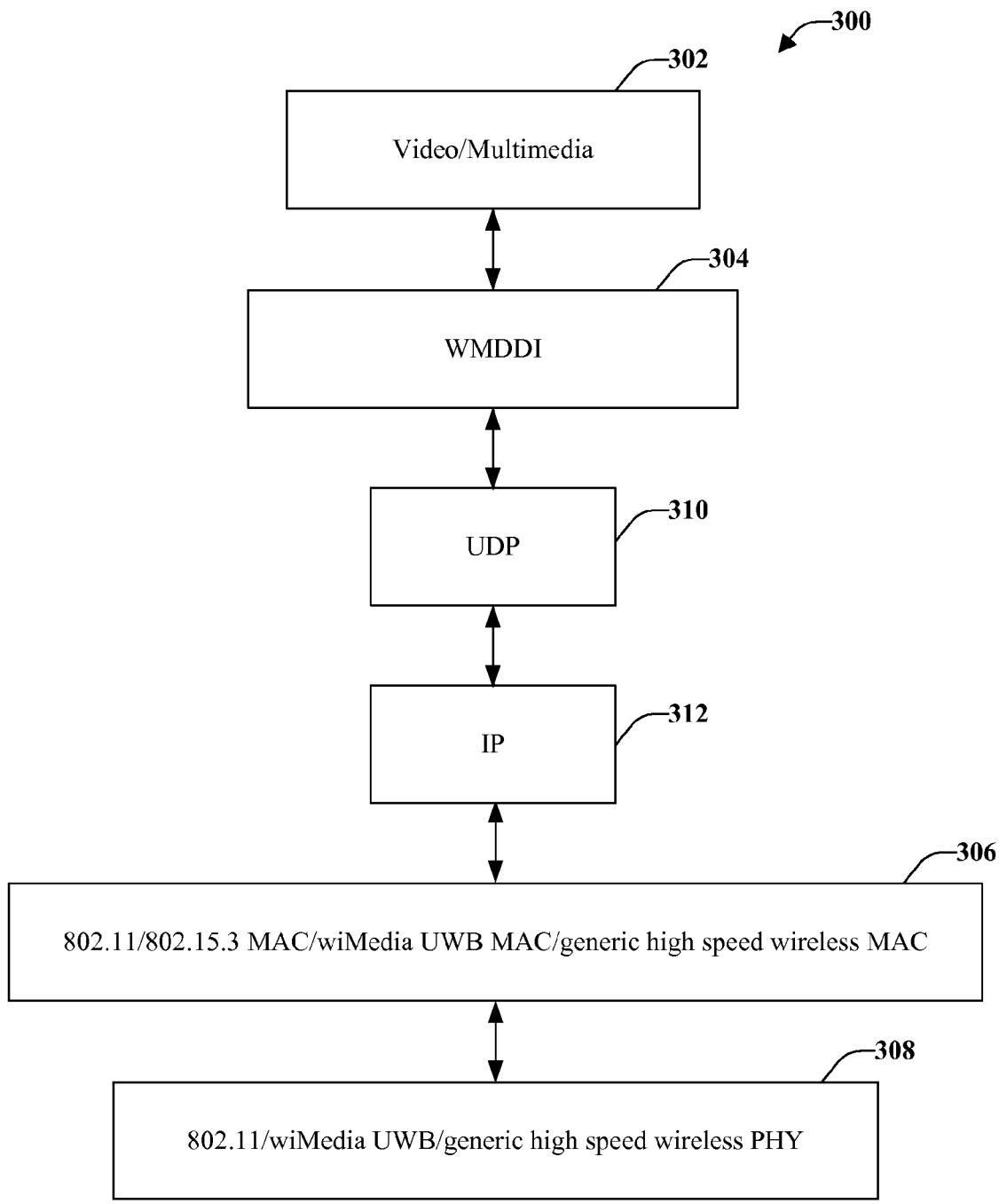
FIG. 3 illustrates another wireless MDDI protocol stack.

FIG. 3 illustrates another wireless MDDI protocol stack 300. This figure illustrates the operation of wireless MDDI (W-MDDI) over User Datagram Protocol (UDP) over Internet Protocol (IP), which is another mode in which W-MDDI can operate. Included in protocol stack 300 is a Video/Multimedia layer 302. Since W-MDDI 304 is generic, it can run over top of L2, which is the MAC layer 306 and the PHY layer 308, or other layers (e.g., L3, L4). As illustrated, the W-MDDI 304 is running similar to an application layer.

In this figure, the W-MDDI 304 is operating on top of UDP 310 and IP 312, which is similar to a media application (e.g., media-player, Voice over Internet Protocol (VoIP), and so forth) or a real-time client protocol. Having a UDP layer 310 and an IP layer 312 can enable a client and a host to reside at disparate locations and connect though an Internet connection or another type of connection. For example, a display can be located in Paris, France and a host can reside in Dallas, Tex. The W-MDDI can be utilized to transport the display (e.g., multi-media data) over the internet to the host (or vice versa). This operation can be similar to a remote desktop application, however, the illustrated protocol 300 can enable the host to drive the communication to the client (e.g., display).

A wireless channel can cause errors in the packets. In the wireless MDDI architecture disclosed herein, an assumption is that the underlying lower layer (e.g., wireless MAC) provides for reliability mechanisms, such as retransmission of packets to mitigate the application packet error rate as experienced by wireless MDDI. Thus, additional reliability mechanisms in the wireless MDDI layer are not discussed herein. However, in accordance with some aspects, there can be reliability mechanisms in the wireless MDDI layer.

In accordance with some aspects, when the underlying lower layer is UDP/IP, w-MDDI is registered on a standard UDP port WMDDI_UDP_CONTROL_PORT. WMDDI also opens a UDP port WMDDI_UDP_DATA_PORT for data traffic. The w-MDDI sender/receiver capable devices can join a WMDDI_CONTROL_MULTICAST group with multicast IP address WMDDI_CONTROL_MULTICAST_IP.

Figure 4:
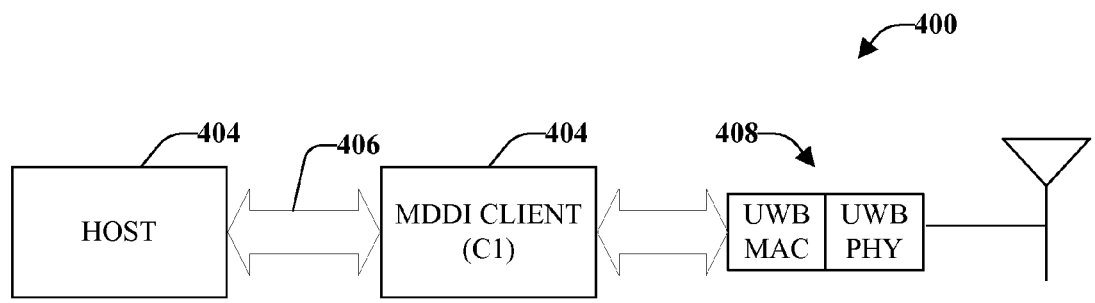
FIG. 4 illustrates a wireless sender in accordance with one or more aspects.

FIG. 4 illustrates a wireless sender 400 in accordance with one or more aspects. Wireless sender 400 can be configured to communicate high rate data, such as digital data. The various wireless systems described herein can include a wireless sender and a wireless receiver. Wireless sender 400 can include a MDDI host 402 and a special MDDI client (C1) 404. The MDDI client(s) is a portion of a traditional MDDI client, not the entire MDDI client. MDDI client (C1) 404 might not be associated with a display or device. Host 402 and Client (C1) 404 can be connected by a traditional high data rate link (e.g., MDDI link) 406. The module containing Client (C1) 404 and can communicate through a wireless modem 408, such as an ultra wide band modem that includes an UWB MAC and an UWB PHY. In accordance with some aspects, the wireless modem 408 can be any high-speed modem. The host 402 and client (C1) 404 can be operatively connected into an existing wired link, such as an MDDI link or a link configured to support high rate data. In accordance with some aspects, if Client (C1) 404 and the modem 408 are connected to a wired link, the host 402 may need upgrading to handle wireless functionalities, which will be described in further detail below. The configuration illustrated in FIG. 4 can be referred to as "type A" wireless MDDI (w-MDDI) sender.

Figure 5:
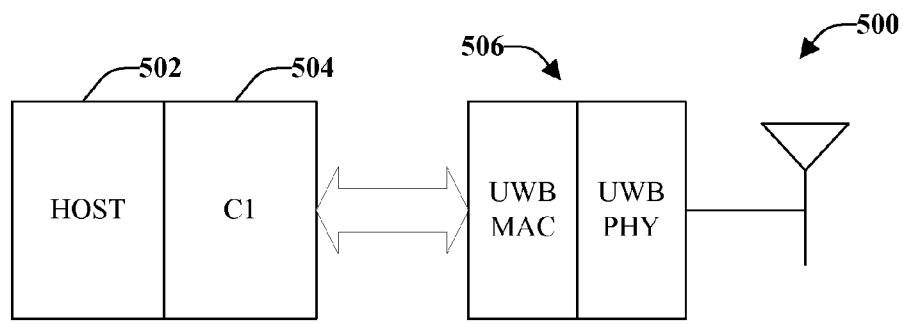
FIG. 5 illustrates another wireless sender that includes a co-located MDDI host and client (C1).

FIG. 5 illustrates another wireless sender 500 that includes a co-located MDDI host 502 and client (C1) 504. In accordance with some aspects, the host 504 and client (C1) 504 can be co-located in the same software and/or hardware module. Host 504 and client (C1) 504 can be connected to a high-speed wireless modem 506. The configuration illustrated in FIG. 5 can be referred to as "type B" w-MDDI sender.

Figure 6:
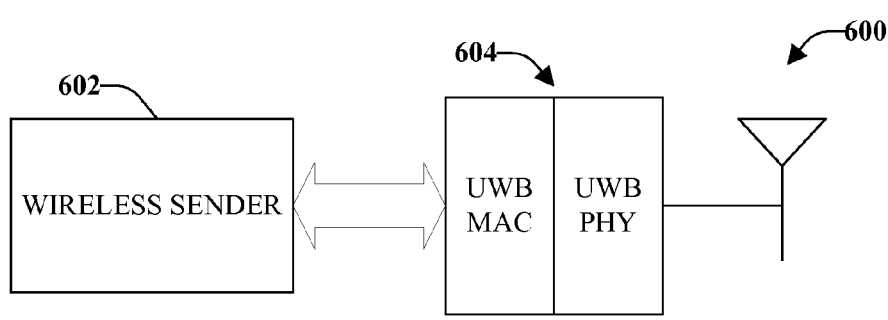
FIG. 6 illustrates another example of a wireless sender.

Another example of a wireless sender 600 is illustrated in FIG. 6, wherein the host and C1 are consolidated (or collapsed) into a single hardware and/or software entity (w-MDDI Sender) 602. A high-speed wireless modem 604 is included to facilitate wireless communication. The configuration illustrated in FIG. 6 can be referred to as "type C" w-MDDI sender.

Figure 7:
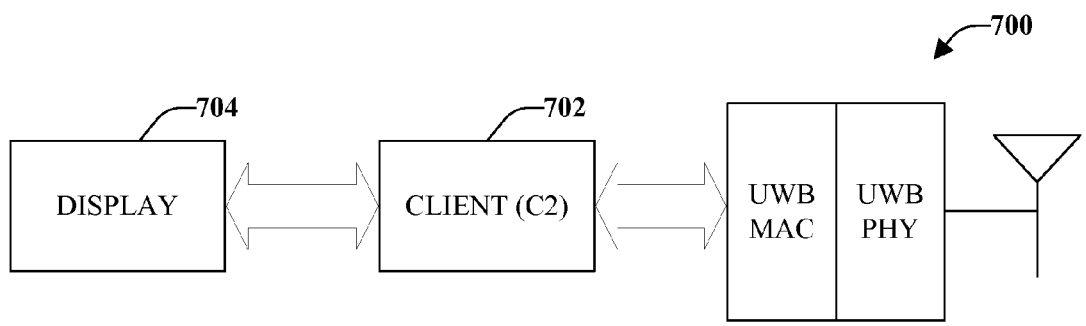
FIG. 7 illustrates a wireless receiver in accordance with the disclosed aspects.

With reference now to FIG. 7, illustrated is a wireless receiver 700 in accordance with the disclosed aspects. Wireless receiver 700 includes MDDI client processing (C2) 702, which can be connected to several device(s) and display(s) 704 (only one display is shown for purposes of simplicity). Client (C2) 702 can be configured to process and generate high rate digital data packets. In accordance with some aspects, client (C2) 702 does not have a physical layer of an MDDI stack. According to various aspects, a single MDDI sender can be connected to several MDDI receivers.

On the reverse link, MDDI data packets can be generated by the receiver (C2) 700. The MDDI data packets can be transmitted to the sender (e.g., Type A w-MDDI sender 400, Type B w-MDDI sender 500, and/or Type C w-MDDI sender 600) through a UWB modem.

The w-MDDI host/sender can periodically query the underlying lower layer (e.g., MAC layer) by transmitting a lower layer query packet (e.g., MAC Query packet) to obtain the lower layer information (e.g., MAC information such as MAC retransmissions, frame error rate, and so forth). The host can feed this information back to the application so that the application can step up/step down its data rate.

A MAC Query is a query to determine the rate supported by the MAC and retransmission statistics. The MAC Query message includes a message ID that is two bytes that contain a 16 bit unsigned integer. A message id of 0x0 indicates the packet as a MAC query message. Also included is a MAC Query Parameters that is two bytes.

Figure 8:
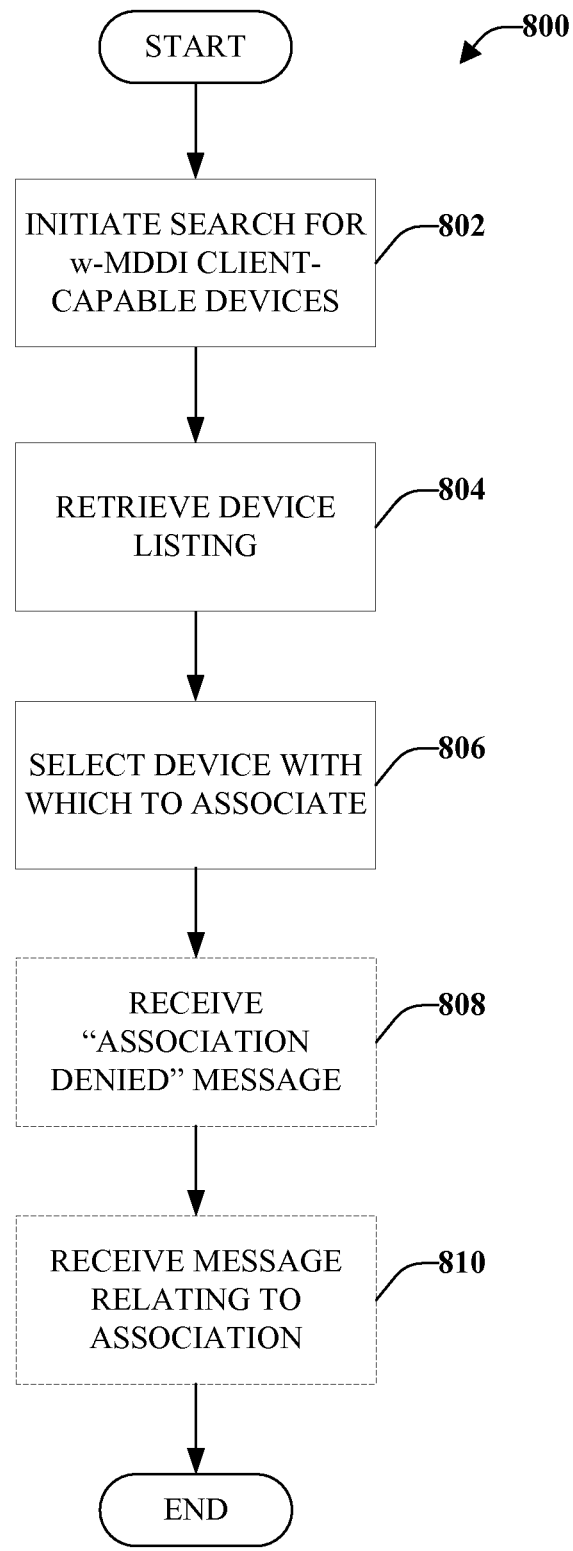
FIG. 8 illustrates a method for w-MDDI association.

FIG. 8 illustrates a method 800 for w-MDDI association. Methodologies that may be implemented in accordance with the disclosed subject matter, will be better appreciated with reference to various flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Method 800 is described from the perspective of a user (e.g., user device, mobile phone, laptop, and so forth). Method 800 starts, at 802, when a user with a host device initiates a search for w-MDDI client-capable devices. The search can be initialized when a user enters an area (e.g., room, building, and so forth) and begins to search for w-MDDI client-capable devices. A variety of mechanisms can be utilized to allow the user to initiate the search. For example, a user interface can provide functionality (e.g., button on the device, icon on a display screen, and so on) to request the search.

At 804, the host retrieves a listing of w-MDDI client-capable devices. In accordance with some aspects, the client-capable devices have string identifiers corresponding to their names, their capabilities (e.g., screen resolution, whether compressed and/or uncompressed packets can be accepted, security capability, and so forth), a state indication, as well as other information. Examples of the appearance of the device information include, "Room L-601 Projector Display Unassociated/Available", "Living room Home Theater Plasma display Associated/Unavailable", "ABC PC Keyboard Unassociated/Unavailable", and so forth. In accordance with some aspects, the w-MDDI sender can maintain a list of w-MDDI receivers that have responded to the search request (e.g., in a computer-readable storage media).

A device with which to associate is selected, at 806. Various techniques can be utilized, such as presenting the listing of devices on a display and allowing the user to select the device (e.g., highlighting the device name and pressing enter), providing a verbal command (e.g., speaking the device name or other identifier associated with the desired device). In another example, the user can press a button on a user interface of the host to trigger the device selection.

At 808, an "Association Denied" message can be received. It should be noted that this message is received only if the association could not be successfully completed, as denoted by the dashed line. The message can be displayed on a user interface (e.g., screen) or though other means (e.g., audibly though a speaker). This message can be received if the desired device is already associated with another host, and therefore denies the association.

The "Association Denied" message might be received if the device is already connected to another host. In accordance with some aspects, the message can be received if the device is "stuck" or cannot disassociate from its previous host. In this situation, if the user is in control of the device and is a genuine user (e.g., if this display is not being used by any other user), the user can force the device to dissociate from its previous host through various techniques (e.g., reset the device). For example, the user can press a button on the user-interface of the device and retry to initiate the association.

Once the association process is successfully completed, both the host and the w-MDDI client-capable device can provide various means of confirming the association. The host/client authentication can include a key exchange or other type of security procedure. For example, both the host and the w-MDDI client-capable device can render a common (short) number on their respective displays.

At 810, a message relating to the association can be optionally received, as indicated by the dashed line. Various scenarios can occur relating to the association. For example, if the association has been unsuccessful, a host display or the device display (or other means of proving the information (e.g., visual, audio)) can render a message corresponding to "Association Unsuccessful". In this situation, a timer associated with the association procedure expires. When the timer times out, the devices return to the state that the devices were in before the association process was initiated (e.g., as if the association attempt was not made).

Another type of message can relate to security-capability. For example, either or both the host and device are not security-capable but it is acceptable by both devices to continue with the unsecure communication. This might occur if one of the devices does not have security capability. In this situation, a message can be provided that displays on either or both devices (host and client) that indicates that the communication is not secure. In accordance with some aspects, the information relating to proceeding with the unsecure communication can be negotiated during initial capability exchange (e.g., at 804 when device listing is received). In this situation, if the user wishes to confirm the association (e.g., override the unsecure communication message), the user can press a button on the host or perform an equivalent action to confirm the association.

In another example, if both devices have security capability and desire to communicate over a secure link and the security check (authentication) is not successful, a message relating to this can be rendered on a display or through other means. If one of the devices desires to utilize security, but the other device does not have security capability, a message such as "Security Hardware not Available" can be rendered.

In another example, the message relating to the association can be a value (e.g., numeric association) or other means of confirming the association. If a value is utilized and the displays of both the w-MDDI host and the w-MDDI client-capable device match, it indicates a successful and secure association. In this situation, if the user wishes to confirm the association, the user can press a button on the host or take a similar action to confirm the association.

If the values do not match, this indicates that the host and the device have not been able to authenticate each other and there can be a "man in the middle". In this situation, the host and device might time out (e.g., a timer associated with the association procedure expires). When the devices time out, the devices return to the state that the devices were in before the association process was initiated.

Figure 9:
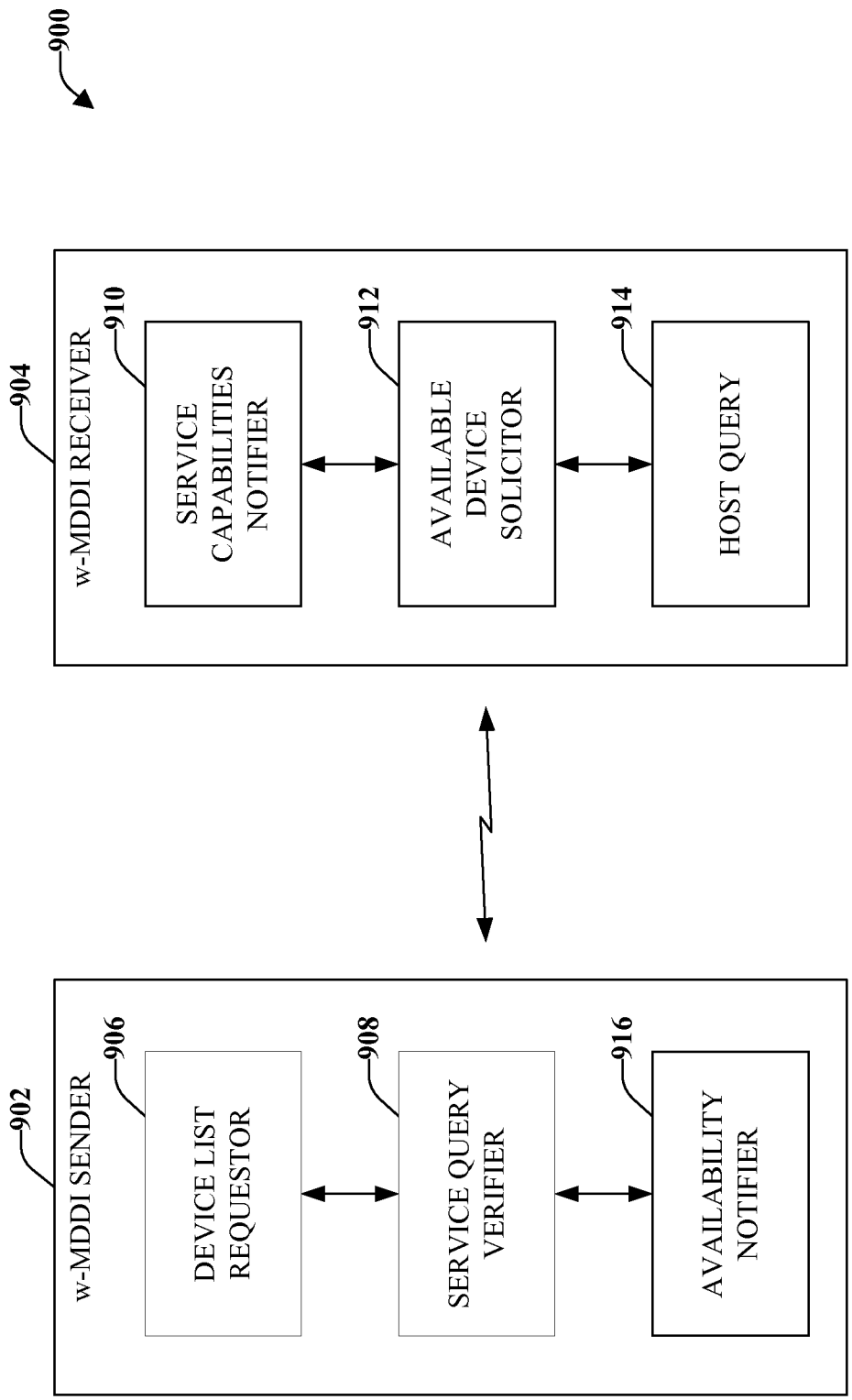
FIG. 9 illustrates a system for service discovery in accordance with the disclosed aspects.

The w-MDDI protocol of the disclosed aspects relate to dynamic association and dissociation and/or a provision for a single w-MDDI sender to associate and communication with multiple w-MDDI receivers. FIG. 9 illustrates a system 900 for service discovery in accordance with the disclosed aspects. A w-MDDI sender 902 should obtain a list of w-MDDI receivers 904 (only one receiver is illustrated for purposes of simplicity) with which the w-MDDI sender 902 can associate. This association procedure is performed though a service discovery procedure.

The w-MDDI sender 902 can be configured to initiate a service discovery process to search for w-MDDI receivers 904 (e.g. receiver service discovery). The discovery process service can be initiated though user-interaction or automatically (e.g., when sender 902 recognized a new location (e.g., room) has been entered).

Included in w-MDDI sender 902 is a device list requestor 906 that is configured to transmit a request to discover receivers 904 in the area. For example, a "Get Neighbor List" message can be transmitted to the lower layer to obtain a list of the devices (e.g., receivers 904) that are in the wireless (or wired) neighborhood (e.g., communication area) of the w-MDDI sender 902. At substantially the same time as receiving the message, the lower layer can reply with a "Lower Layer Neighbor List Response" Message that includes a list of devices that are in the neighborhood of the requesting device (w-MDDI sender 902).

The Lower Layer Neighbor List Response Message includes a Message ID that is two bytes that contain a 16 bit unsigned integer. A message ID of 0×7 identifies the packet as a MAC Address Response message. Also included are a number of neighbors, which is two bytes that specify the number of neighbors for the current device (sender/receiver). Also included is a Lower Layer (MAC layer) address of neighbor-1-Lower layer address (MAC layer address).

Also included in w-MDDI sender 902 is a service query identifier 908 that is configured to transmit a "w-MDDI Service Query" packet to each neighbor (e.g., to each individual receiver in accordance with some aspects). The w-MDDI receiver 904 can include a services capabilities notifier 910 that responds with a "w-MDDI Service Response" packet that can include the availability and the string identifiers for the w-MDDI receiver. The packet length of the w-MDDI Service Response Packet can be two bytes that contains a 16 bit unsigned integer that specifies the total number of bytes in the packet, not including the packet length field. A packet type filed can be two bytes and can contain a 16 bit unsigned integer. A packet type of 163 identifies the packet as a w-MDDI service response packet. Also included is a receiver MAC Address field that includes a six-byte MAC address of the w-MDDI receiver. A sender MAC address field includes a six-byte MAC address of the w-MDDI sender, which can be a broadcast or a multicast address, if multicast/broadcast services are used. A Receiver Parameters field can include a 256-byte string identifier of the w-MDDI receiver and its capabilities. Further, the w-MDDI service response packet includes a CRC field that is two bytes and contains a 16-bit CRC of all bytes in the packet, including the Packet Length field.

The w-MDDI sender 902 can wait for the "w-MDDI Service Response" packet until expiration of a timer (e.g., a value of a service_discovery timer). If the response is not received before expiration of the timer, the association has failed. A user of the w-MDDI sender 902 can select a w-MDDI receiver 904 with which to associate, if the response is received prior to expiration of the timer.

In accordance with some aspects, either the w-MDDI sender 902 or the w-MDDI receiver 904 can initiate the association process. For example, if the w-MDDI sender 902 is a phone and the w-MDDI receiver is a projector/display, the phone (e.g., the w-MDDI sender) might initiate the association process.

According to some aspects, the w-MDDI receiver 904 can search for w-MDDI senders 902 (e.g., sender service discovery). The w-MDDI receiver 904 can include an available device solicitor 912 that is configured to convey a message (e.g., "Get Neighbor List") to the lower layer to obtain a list of the devices that are in the wireless (or wired) neighborhood of the w-MDDI receiver. The lower layer can respond with a "Lower Layer Neighbor List Response" that provides a list of devices that are in the neighborhood.

A Get Neighbor List is a message sent to the lower layer (e.g., MAC layer) to obtain the list of neighbors that are wirelessly connected to the current node. This message includes a message ID that is two bytes that contain a 16 bit unsigned integer. A message ID number of 0×3 identifies the packet as a Get Neighbor List message.

A Get Lower Layer Address (Get MAC Address) message is sent to the lower layer to obtain the lower layer address (e.g., MAC Address) of the w-MDDI node (e.g., UWB modem). This message includes a message ID that is two bytes that contains a 16 bit unsigned integer. A message ID number of 0×2 identifies the packet as a Get Lower Layer Address (Get MAC Address) message.

A host query 914, included in w-MDDI receiver 904, can be configured to transmit a "w-MDDI Host Query" packet to the neighbors. The w-MDDI sender(s) 902 can include an availability notifier 916 that is configured to transmit a "w-MDDI Host Response" packet to the w-MDDI receiver 904 in response to the query. The w-MDDI Host Response" packet can contain the availability and string identifiers for the various devices. A user of the w-MDDI receiver 904 can select which w-MDDI sender to associate with. If a timer (e.g., service_discovery timer) associated with the w-MDDI receiver 904 expires before receiving a "w-MDDI Host Response", the association fails.

In accordance with some aspects, if multicast service is supported by the lower layer, the multicast service can be utilized to transmit "w-MDDI Service Query"and "w-MDDI Service Response" packets in the case of "Receiver Service Discovery" and to send the "w-MDDI Host Query" and "w-MDDI Host Response" packets in the case of "Sender Service Discovery". The operation when using multicast will be described in further detail below. If multicast service is not available, broadcast be used. If broadcast facility is not present, unicast can be utilized.

The w-MDDI sender can maintain a list of w-MDDI receivers that have responded with a w-MDDI service response packet and the receiver parameters corresponding to each one of the w-MDDI receivers. The w-MDDI receiver can maintain a list of w-MDDI senders that have responded with a w-MDDI service response packet and the sender parameters corresponding to each one of them. These lists can be maintained in respective storage medias associated with the devices 902 and 904.

In accordance with some aspects, the underlying layer can support multicasting. Multicasting can provide efficiency because the messages are transmitted to a subset of devices (e.g., identified devices), rather than to all the devices in the neighborhood. For service discovery when the w-MDDI sender 902 is searching for w-MDDI receivers 904 (e.g., Receiver Service discovery) and the underlying lower layer supports multicast, the w-MDDI capable devices can join a multicast group WMDDI_CONTROL_MULTICAST group specified by WMDDI_CONTROL_MULTICAST_ADDRESS. The w-MDDI receivers can advertise their "w-MDDI service response" packets periodically on this multicast address. The w-MDDI sender that desires to perform service discovery can choose the w-MDDI receiver with which it desires to associate with from these "w-MDDI service responses". The w-MDDI sender can also explicitly solicit the "w-MDDI service response" packets from the individual receivers by sending a "w-MDDI service query" packet to the WMDDI_CONTROL_MULTICAST group.

For service discovery when the w-MDDI receiver 904 is searching for w-MDDI sender 902 (e.g., Sender Service discovery) and the underlying lower layer supports multicast, the hosts (e.g., w-MDDI senders) willing to associate with receivers can join the WMDDI_CONTROL_MULTICAST group specified by the WMDDI_CONTROL_MULTICAST ADDRESS. The w-MDDI senders can advertise (e.g., periodically) their "w-MDDI host response" packets on this multicast address. The w-MDDI receiver wishing to perform host discovery can choose the w-MDDI sender that it wants to associate with from these "w-MDDI host responses". The w-MDDI receiver can also explicitly solicit the "w-MDDI host response" packets from the individual w-MDDI senders by transmitting a "w-MDDI host query" packet to the WMDDI_CONTROL_MULTICAST group.

In accordance with some aspects, service discovery can be enabled when the underlying layer is a wiMedia UWB MAC. If the underlying lower layer is wiMedia UWB MAC, the following can be enabled during service discovery. Wi-Media receiver-capable devices include an Application Specific IE (ASIE) containing the w-MDDI service response. Similarly, "w-MDDI sender-capable" devices can include an ASIE in their beacons containing the w-MDDI host response packet.

Figure 10:
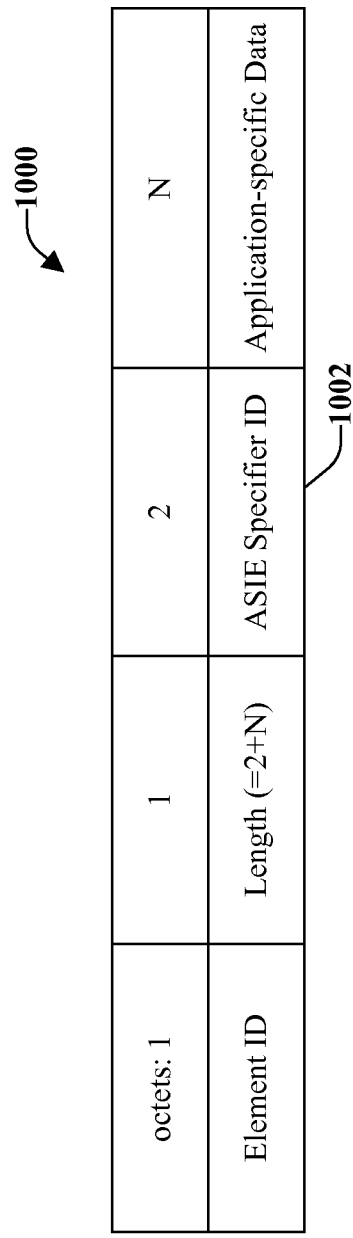
FIG. 10 illustrates an Application Specific IE (ASIE) format.

FIG. 10 illustrates an Application Specific IE (ASIE) format 100 in WiMedia MAC. In accordance with some aspects, if the underlying layer is wiMedia UWB MAC the following can occur during service discovery. For example, a "w-MDDI receiver-capable" wi-Media device can include an Application Specific IE (ASIE) containing the w-MDDI service response. In a similar manner, "w-MDDI sender-capable" devices can include an ASIE in their beacons containing the w-MDDI host response packet.

An Application Specifier ID 1002 can be set to wMDDI_wiMedia_ASIESpecifierID. In the case of the w-MDDI receiver, the Application-specific Data information is set to the "w-MDDI Service Response Packet". Similarly, in the case of the w-MDDI senders, the Application-specific Data information is set to the "w-MDDI host response packet".

The w-MDDI Host Response Packet responds to the w-MDDI Service Query packet sent by the w-MDDI sender. The Host Response Packet provides the availability and the "string identifier" of the w-MDDI receiver. Included in the packet is a Packet Length that is two bytes that contains a 16 bit unsigned integer that specifies the total number of bytes in the packet, not including the packet length field. A Packet Type that is two bytes contains a 16 bit unsigned integer. A packet type of 167 identifies the packet as a w-MDDI service response packet. A Receiver MAC address is a six-byte MAC address of the w-MDDI receiver. This can be a multicast or a broadcast address, depending on whether multicast or broadcast services are utilized. Also included is a Sender MAC Address that is a 6-byte MAC address of the W-MDDI sender. A Sender Parameters field is a 256-byte string identifier of the w-MDDI sender and its capabilities. A CRC field is two bytes that contain a 16-bit CRC of all bytes in the packet including the Packet Length.

Figure 11:
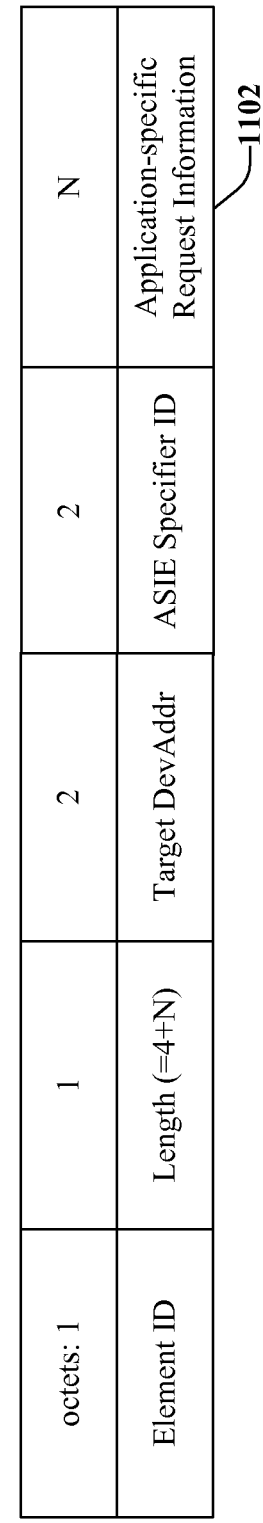
FIG. 11 illustrates an application specific probe information element (AS probe IE) in wiMedia MAC.

FIG. 11 illustrates an application specific probe information element (AS probe IE) in wiMedia MAC 1100. When a w-MDDI sender searches for receivers (e.g., receiver service discovery), a "w-MDDI Service Discover" message is sent to the lower layer (wiMedia MAC). The w-MDDI Service Discover message is sent to the lower layer (e.g. wiMedia MAC layer) to obtain the w-MDDI service information. The payload of this message is the "w-MDDI service Query" packet. This is placed in the Application-specific Request information field of the Application-specific probe IE 1100 when the underlying layer is wiMedia UWB MAC. The contents of this message include a Message ID that is two bytes that contain a 16 bit unsigned integer. A packet type of 0×4 identifies the packet as a Service Discover. A Packet Type is two bytes that contain a 16 bit unsigned integer. A packet type of 162 identifies the packet as a Service query packet. Also included is a Sender Parameters field that is two bytes that contain information about the w-MDDI sender. A Sender MAC address is a six-byte MAC address of the w-MDDI sender and a Receiver MAC address, which can be the broadcast address. Also included is a Service Query Options, which is two bytes of service query options and a CRC, which is two bytes that contain a 16-bit CRC of all bytes in the packet including the Packet Length.

At substantially the same time as receiving the "w-MDDI Service Discover" message from the w-MDDI layer, the wiMedia MAC on the w-MDDI sender can determine if it has valid (un-expired) Application Specific IE (ASIE) information for w-MDDI receivers from all its neighbors. If there is not valid (or an expired) ASIE information, the MAC on the w-MDDI sender reviews the Application Specific ILEs (ASIEs) from its neighbors. If there are some neighbors of the w-MDDI sender that do not have ASIE information corresponding to w-MDDI, it sends Application specific Probe ILEs to each of those neighbors. The Application Specific Probe ILEs are defined as shown in FIG. 11. The "Application-specific request Information" field 1102 is set to the "w-MDDI service Query" packet.

The w-MDDI sender waits for a time corresponding to service_discovery_timer for the reception of Application Specific ILEs. The wiMedia MAC can send a "w-MDDI service information" packet to the w-MDDI layer for every ASIE received.

A "w-MDDI service information" packet is a message sent by the lower layer (e.g., wiMedia MAC) to w-MDDI providing the w-MDDI sender the service response information that it has received from the w-MDDI receiver capable neighbors. In wiMedia MAC, the application-specific data in the ASIE (Application specific IE) contains the w-MDDI Service Response information. This message includes a Message ID, which is two bytes that contain a 16 bit unsigned integer. A message ID of 0×8 identifies the packet as a w-MDDI service information message. Another field is the number of w-MDDI receivers, which indicates the number of w-MDDI receivers. This message contains the "number of w-MDDI receivers" instances of the following fields. Packet Length, which is two bytes that contain a 16 bit unsigned integer that specifies the total number of bytes in the packet, not including the packet length field. A Packet Type is 2 bytes that contain a 16 bit unsigned integer. A packet type of 163 identifies the packet as a w-MDDI service response packet. A Receiver MAC address is six-byte MAC address of the w-MDDI receiver. A Receiver Parameters is a 256-byte string identifier of the w-MDDI receiver and its capabilities. A CRC is two bytes that contain a 16-bit CRC of all bytes in the packet including the Packet Length.

A w-MDDI receiver that desires to initiate a service discovery to find the w-MDDI senders (e.g., Sender Service Discovery) sends a "w-MDDI Host Discover" message to the lower layer (wimedia MAC). At substantially the same time as receiving the message from the w-MDDI layer, the wiMedia MAC on the w-MDDI receiver can determine if it has any valid (un-expired) Application Specific IE (ASIE) information for the w-MDDI senders from its neighbors. If there are some neighbors for which the w-MDDI receiver does not have the ASIE information, it sends Application specific Probe ILEs to each of those neighbors. The Application Specific Probe ILEs are defined as shown in FIG. 11. The "Application-specific request Information" field 1102 is set to the "w-MDDI Host Query" packet. The w-MDDI receiver waits for time corresponding to host_discovery_timer for the reception of Application Specific IEs. The iMedia MAC can send a "w-MDDI host information" packet to the w-MDDI layer for every ASIE received.

The following will describe service discovery when the underlying layer is UDP/IP. For Receiver Service discovery (e.g., sender searching for receivers) and the underlying layer is UDP/IP, the w-MDDI sender/receiver capable devices can join a WMDDI_CONTROL_MULTICAST group specified by the WMDDI_CONTROL_MULTICAST_IP multicast address. The w-MDDI receiver capable devices can advertise their capabilities by sending (e.g., periodically) w-MDDI service response packet to the WMDDI_CONTROL_MULTICAST group. When a w-MDDI sender intends to discover a w-MDDI receiver, it sends a "w-MDDI service query packet" to the WMDDI_CONTROL_MULTICAST multicast group on UDP port # WMDDI_UDP_CONTROL_PORT.

The w-MDDI Service Query Packet queries a wireless device to determine if the device supports w-MDDI receiver functionality. The w-MDDI Service Query Packet contents include a packet length that is two bytes that contains a 16 bit unsigned integer that specifies the total number of bytes in the packet not including the packet length field. A Packet Type 162 is two bytes that contain a 16 bit unsigned integer. A packet type of 162 identifies the packet as a Service query packet. Also included is a Sender Parameters field that is two bytes that contain information about the w-MDDI sender. Also included is a sender MAC address that is a six-byte MAC address of the w-MDDI sender and a Receiver MAC address that is a six-byte MAC address of the w-MDDI receiver. This can be a multicast or a broadcast address if multicast or broadcast services are utilized. Also included is a Service Query Options that is two bytes of service query options. A CRC field is two bytes that contain a 16-bit CRC of all bytes in the packet including the Packet Length.

At about the same time as receiving the "w-MDDI service Query" packet, all the w-MDDI receiver capable devices send back the "w-MDDI service response" packets to the w-MDDI sender which joins the WMDDI_CONTROL_MULTICAST multicast group on UDP port # WMDDITUDP_CONTROL_PORT. The sender can wait for service-discovery timer duration of time for w-MDDI service responses packets.

For Sender Service discovery (e.g., receiver searching for senders) and the underlying layer is UDP/IP, the w-MDDI sender/receiver capable devices can join WMDDI_CONTROL_MULTICAST group specified by the WMDDI_CONTROL_MULTICAST_IP multicast address. The w-MDDI sender capable devices can advertise their capabilities by periodically sending w-MDDI service response packet to the WMDDI_CONTROL_MULTICAST group. When a w-MDDI receiver intends to discover a w-MDDI sender, it sends a "w-MDDI host query packet" to the WMDDI_CONTROL_MULTICAST multicast group on UDP port # WMDDITUDP_CONTROL_PORT. The w-MDDI Host Query Packet is utilized to query a wireless device to determine if that device supports w-MDDI receiver functionality.

The packet contents of the w-MDDI Host Query Packet include a packet length field, a packet type field, receiver parameters field, Sender MAC address field, Receiver MAC address field, a Service Query Options field, and a CRC field. The packet length field is two bytes that contains a 16 bit unsigned integer that specifies the total number of bytes in the packet, not including the packet length field. The packet type field is two bytes that contain a 16 bit unsigned integer. A packet type of 166 identifies the packet as a Host query packet. The receiver parameters field is two bytes that contains information about the w-MDDI sender. The Sender MAC address field is the six-byte MAC address of the w-MDDI sender. This can be a multicast or a broadcast address, if multicast or broadcast services are utilized. The Receiver MAC address field is the six-byte MAC address of the w-MDDI receiver. The Service Query Options field includes two bytes of service query options. The CRC field is two bytes that contain a 16-bit CRC of all bytes in the packet, including the packet length.

At about the same time as receiving the "w-MDDI host Query" packet, all the w-MDDI sender capable devices send back the "w-MDDI host response" packets to the w-MDDI receivers which join the WMDDI_CONTROL_MULTICAST multicast group on UDP port # WMDDITUDP_CONTROL_PORT. The receiver can wait for host_discovery_timer duration of time for w-MDDI host responses packets.

In accordance with some aspects, an optional secure operation can be enabled. If the w-MDDI sender and/or the w-MDDI receiver are not security-capable, the resultant operation is unsecure. If both the w-MDDI sender and w-MDDI receiver are security capable and if either of them wants security operation, the resultant operation will be secure. The following table lists the different possibilities with regard to the host and device security capabilities in which the association proceeds. With the reminder of the possibilities, the association will not proceed.

TABLE 1

| Host | | Device | | | |
|---|---|---|---|---|---|
| Security Mandatory | Security Capable | Security Mandatory | Security Capable | Secure communication | Proceed with association |
| Don't Care | Yes | Don't care | Yes | Yes | Yes |
| No | Don't care | No | No | No | Yes |
| No | No | No | Don't Care | No | Yes |
| Remainder of the cases | | | | | No |

If secure operation is desired, after the association process is completed, a mutual authentication procedure takes place. For the secure operation, the w-MDDI sender and w-MDDI receiver share a Master key. The Master key can be exchanged after the association process is completed. The Master key can be used as the connection key for the entire life time of association; or pair-wise temporal keys (PTKs) can be derived from the master key and can be used. If the underlying lower layer is wiMedia UWB MAC, a four-way handshake can be used to derive the pair-wise temporal keys.

Figure 12:
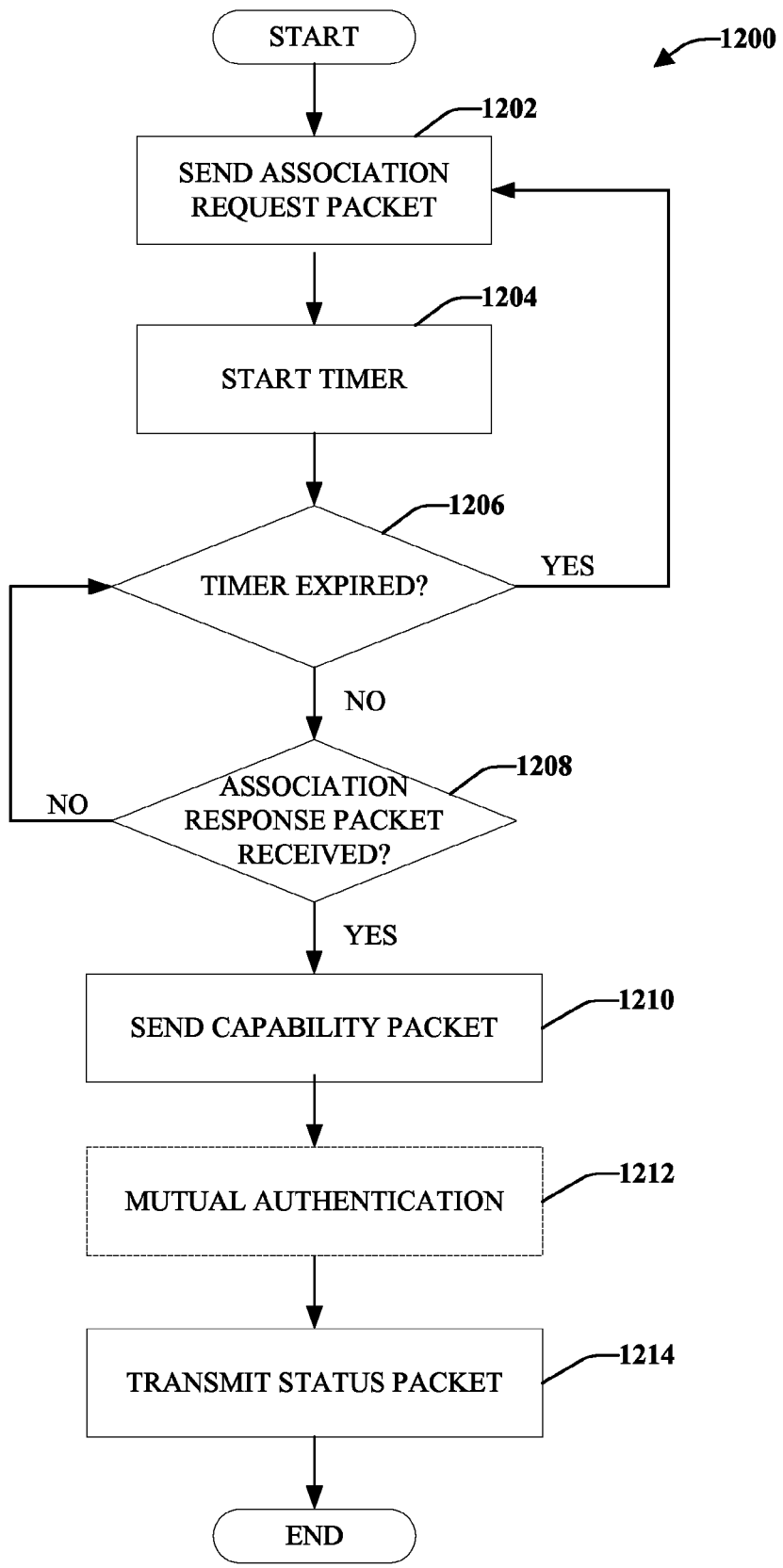
FIG. 12 illustrates a method for communicating high rate digital data wirelessly utilizing receiver-initiated association.

FIG. 12 illustrates a method 1200 for communicating high rate digital data wirelessly utilizing receiver-initiated association. To associate the device (e.g., w-MDDI receiver) with a host entity (e.g., w-MDDI sender), an Association Request Packet is sent, at 1202, by the w-MDDI receiver. In accordance with some aspects, the Association Request Packet can be sent for an association request by C2 when it desires to associate with the MDDI sender after power up of the device. The Association Request Packet can include a Packet Length, Packet Type, Device Parameters, Sender MAC Address, Receiver MAC Address, Association/Security Options, and CRC fields. The Association Request Packet is sent for association request by C2 when C2 desires to associate with the MDDI sender (e.g., after power up). The packet length can be two bytes that contains a 16 bit unsigned integer that specifies the total number of bytes in the packet, not including the packet length field. The Packet Type can be two bytes in length and contain a 16 bit unsigned integer. A packet type of 154 identifies the packet as an association request packet. Device parameters can be two bytes for device specific parameters. The sender MAC Address can be a six-byte MAC Address of the w-MDDI sender and the Receiver MAC Address is a 6 byte MAC Address of the w-MDDI receiver. Association/Security Options is two bytes (Bit 0 and Bit 1). Bit 0 is Security Capability and is "1" if security capability is present in the receiver; otherwise it is "0". Bit 1 is Security Mandatory and is "1" if security is mandatory for the receiver; otherwise it is "0". The CRC can be two bytes that contain a 16-bit CRC of all bytes in the packet including the Packet Length.

At substantially the same time as the association request packet is sent, the device can enter a "Sent Association Request" state and an association timer can be started, at 1204. In accordance with some aspects, the Association Request can contain information related to whether the w-MDDI receiver is security capable and/or if security is mandatory for the w-MDDI receiver.

The w-MDDI sender should acknowledge the Association Request Packet and reply with an Association Response Packet before the association timer reaches a predetermined interval (e.g., times out, expires). The Association Response Packet can include a Client ID that identifies the w-MDDI receiver. In accordance with some aspects, the Association Request Packet includes information related to whether the w-MDDI sender is security-capable and/or if security is mandatory for the w-MDDI sender. After transmitting the Association Response Packet, the w-MDDI sender can enter a "Sent Association Response" state and start an Association Response Timer.

The Association Response Packet is sent in response to the Association Request Packet sent by C1. This packet provides C2 the Client ID and Display/device ID. This is part of the three-way handshake association. The packet includes a Packet Length that is two bytes that contain a 16 bit unsigned integer that specifies the total number of bytes in the packet not including the packet length field. A Packet Type field is two bytes that contain a 16 bit unsigned integer. A packet type of 155 identifies the packet as an association response packet. Also included are a Client ID that is two bytes allocated for client ID of C2 and an Association/security Options that is two bytes (Bit "0", Bit "1", and Bit "2"). Bit 0 indicates Security Capability and is set to "1" if security capability is present in the sender; and set to "0" otherwise. Bit 1 indicates Security Mandatory and is set to "1" if security is mandatory for the sender; and set to "0" otherwise. Bit 2 indicates if a Multicast Address is included. This bit is set to "1" if multicast address is included along with the Association Response packet. A CRC field is two bytes that contain a 16-bit CRC of all bytes in the packet including the Packet Length.

The w-MDDI sender and receiver are able to negotiate their security capability and mandatory options with the "Association Request Packet" and "Association Response Packet". The association process can proceed or be stopped based on the possibilities listed in Table 1, described above. If the secure communication option is enabled as the result of the above negotiations, the Client ID provided by the w-MDDI sender is unauthenticated at this point and will be trusted only after the mutual authentication process is completed.

A determination is made, at 1206, whether the timer has expired. Since the underlying wireless medium may be unreliable, it is possible that the Association Response Packet or other packets can be lost. Therefore, if the Association Response Packet has not been received ("NO") before expiration of the timer, method 1200 continues, at 1206, with a determination whether the timer has expired. If, at 1206, it was determined that the timer had expired, method 1200 continues, at 1202 with a subsequent association request packet being resent. This can be recursive wherein a number of subsequent Association Request Packets can be sent up to a maximum number of times.

In accordance with some aspects, upon expiration of the Association Response Timer, the w-MDDI sender can resend the Association Response Packet. According to some aspects, the w-MDDI sender can sends an Association Response Packet whenever it is receives an Association Request Packet from the w-MDDI receiver.

If the timer has not expired ("NO"), a determination is made, at 1208, whether the Association Response Packet has been received. If the determination, at 1208, is that the Association Response Packet has been received ("YES"), method 1200 continues, at 1210, and a Client Capability Packet is sent to the w-MDDI sender acknowledging the Association Request Packet.

A status packet or Client Capability Packet can be transmitted, at 1212. The Client Capability Packet can be sent when the w-MDDI receiver receives an Association Response Packet from a w-MDDI sender.

If the security option is enabled, the Client Capability Packet is still un-authenticated at this point. The contents of the Client Capability Packet are only trusted after mutual authentication is completed, at 1212, which is optional as denoted by the dashed line. Further information related to mutual authentication will be provided below.

After sending the Client Capability Packet, the w-MDDI receiver can enter an associated state (if the security option is not enabled) and the associated w-MDDI receiver can enter an associated state (if the security option is not enabled). If the security option is enabled, the mutual authentication process (described below) should be completed before the w-MDDI sender and w-MDDI receiver enter an Associated State. In such a manner there is a three-way handshake association established. In accordance with some aspects, if the Association Request Packet, Association Response Packet and/or Client Capability Packets are lost, they can be retransmitted if the wireless link is stable. Otherwise, the w-MDDI sender and w-MDDI receiver do not become associated (e.g., they can remain in a dissociated state). In accordance with some aspects, the w-MDDI receiver can send an Alternate Display Capability Packet if it has any associated alternate displays.

After being associated with a particular w-MDDI sender, the w-MDDI receiver can store the lower layer address (MAC address) of the sender. After entering the associated state, the w-MDDI receiver should send (e.g., periodically such as once in mac_response_msec) Link Status Packets (MAC Response Packets) to the host, at 1214. The Link Status Packet provides the MAC statistics on the w-MDDI receiver MAC (e.g., average number of re-transmissions, packet error rate, and so forth), to the w-MDDI sender. Fields included in the Link Status Packet are packet length, packet type, cCLient ID, average number of retransmissions, Frame Error Rate, Physical Layer Rate, and CRC. The packet length is two bytes that contain a 16 bit unsigned integer that specifies the total number of bytes in the packet, not including the packet length field. The packet type is two bytes that contain a 16 bit unsigned integer. A packet type of 150 identifies the packet as a MAC Response packet. The cCLient ID is two bytes that contain a 16 bit unsigned integer. This is the Client ID of C1/C2, depending on the identity of the pack originator. The average number of retransmissions is the average number of retransmissions for every MAC frame transmitted in the reverse direction. The Frame Error Rate is the packet error rate seen in the forward direction. The Physical Layer Rate is the transmission rate on the physical layer. The CRC is two bytes that contain a 16-bit CRC of all bytes in the packet, including the Packet Length.

At substantially the same time as receiving a Link Status Packet (MAC Response Packet) from the w-MDDI receiver, the w-MDDI sender can respond with a Sender Link Status Packet (MAC Response Packet). This packet acknowledges the reception of the Link Status Packet (MAC Response Packet) which had been sent by the w-MDDI receiver. It can also provide the statistics and parameters of the receiver MAC to the w-MDDI sender.

If the w-MDDI receiver does not receive a Sender Link Status Packet (Sender MAC Response Packet) from the w-MDDI sender in response to a Lower layer Response Packet (MAC Response Packet) that it had sent out for mac_response_fail_time msec duration, the w-MDDI receiver can realize that it has been dissociated from the sender. It then stops sending the Link Status Packet (MAC Response Packets). If the sender does not receive a Link Status Packet (MAC Response Packet) for mac_response_fail_time msec duration, the sender enters the dissociated state. When either the sender or receiver enters a dissociated state, it does not respond to the Link Status Packets/Sender Link Status Packets (MAC Response Packets/Sender MAC Response Packets) sent by the receiver and sender respectively.

A lower layer response (MAC Response) is a message from the lower layer (e.g., MAC layer) to the w-MDDI sender/receiver. This message indicates the rate supported by the lower layer (e.g., MAC), retransmission statistics, and so forth. The message includes a Message ID that is two bytes that contain a 16 bit unsigned integer. A message ID of 0x5 identifies the packet as a MAC Response message. The packet also includes an average number of retransmissions, which is the average number of retransmissions for every MAC frame transmitted on the reverse direction. A Frame Error Rate indicates the packet error rate seen in the forward direction and a Physical Layer Rate, which is the transmission rate on the physical layer.

A lower layer address response (MAC address response) provides the lower layer address (e.g., MAC Address) of the lower layer (e.g., UWB modem). This message includes a Message ID, which is two bytes that contain a 16 bit unsigned integer. A message ID of 0×6 identifies the packet as a MAC Address Response message. Also included is a Lower Layer (MAC layer) address, which is the Lower layer address (MAC layer address) of the underlying layer.

After being dissociated, the w-MDDI sender and receiver need to re-associate before they can start the wireless MDDI transfers again. After w-MDDI receiver has been dissociated from a particular sender, it is allowed to associate with any other sender. Further information related to dissociation is described below.

In accordance with some aspects, the w-MDDI receiver also sends a Link Status Packet (MAC Response Packet) when the w-MDDI sender requests for it explicitly through a Link Query Packet (MAC query packet).

The Link Query Packet is sent by the host to query MAC information on the sender/receiver side. Contents of the Link Query Packet include Packet Length, which is two bytes that contain a 16 bit unsigned integer that specifies the total number of bytes in the packet, not including the packet length field. Packet Type is two bytes that contain a 16 bit unsigned integer. A packet type of 151 identifies the packet as a MAC query packet. A cClientID field is two bytes that contain a 16 bit unsigned integer reserved for ID of the destination client (C2). A MAC Query Parameters is two bytes and a CRC field is two bytes that contain a 16-bit CRC of all bytes in the packet including the Packet Length.

If the underlying wireless link is 802.15.3 UWB MAC, after being associated with a w-MDDI receiver, the w-MDDI sender can set up CTAs for the transfer using CTA setup packet in the forward and reverse directions if the mode of operation is the low-latency mode (which will be described in further detail below).

Figure 13:
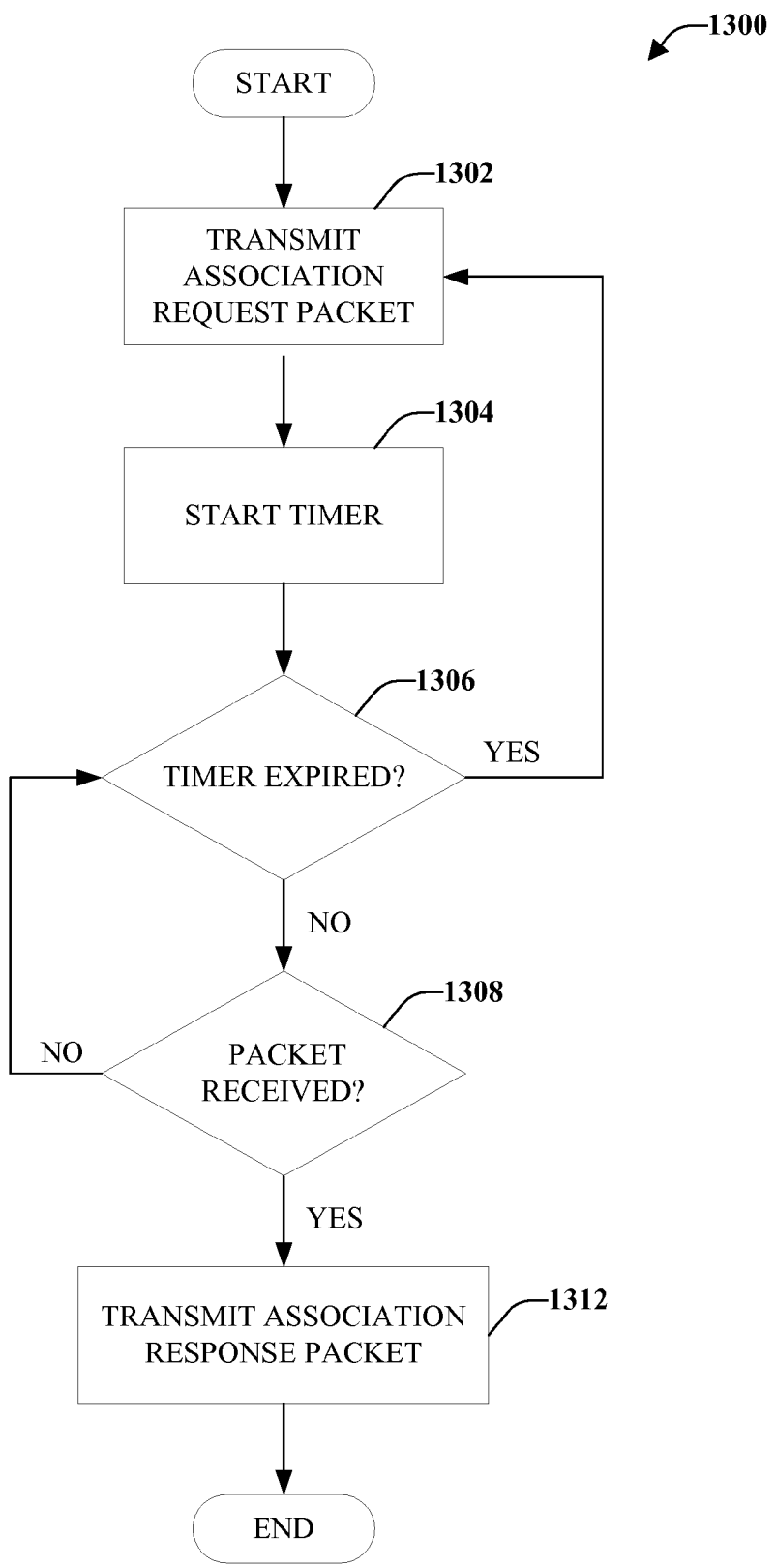
FIG. 13 illustrates a method for high rate wireless data communication between a sender and a remote receiver.

FIG. 13 illustrates a method 1300 for high rate wireless data communication between a sender and a remote receiver. Method 1300 can be utilized when a w-MDDI sender desires to associate with a w-MDDI receiver. For example, if the w-MDDI sender is a phone and the w-MDDI receiver is a projector, the w-MDDI sender (e.g., phone) can initiate the association process.

Method 1300 illustrates a sender initiated association and starts, at 1302, with transmission of a Sender Association Request Packet to a remote receiver. The Sender Association Request Packet is sent for association request by the sender when it wants to associate with a particular MDDI Receiver (e.g., after power up). The Sender Association Request Packet includes a Packet Length of two bytes that contain a 16 bit unsigned integer that specifies the total number of bytes in the packet not including the packet length field and a Packet Type of two bytes that contain a 16 bit unsigned integer. A packet type of 158 identifies the packet as an association request packet. Also included are a Receiver MAC Address that is six bytes and includes the receiver MAC address and a Sender MAC Address that is bytes of the sender MAC address. Association/Security Options include two bytes (bit "0" and bit "1"). Bit "0" indicates security capability and is set to "1" if security capability is present in the receiver or is set to "0" otherwise. Bit "1" indicates whether security is mandatory. If set to "1" security is mandatory for the receiver, otherwise it is set to "0". A CRC field is two bytes that contain a 16-bit CRC of all bytes in the packet including the Packet Length. In accordance with some aspects, the Sender Association Request Packet includes information on whether the w_MDDI sender is security capable and/or if security is mandatory for the w-MDDI sender.

At substantially the same time as the first association request packet is sent, the sender enters a "Sent Sender Association Request Packet" state and a timer (e.g., Association timer) or other tracking means can be initiated, at 1304. The interval of time between the transmission of the first association request packet and receipt of a response from the remote receiver, such as an Association Request Packet, is tracked and, at 1306, a determination is made whether a predefined interval of time has been exceeded (e.g., the timer has expired). If the timer has expired ("YES"), it indicates that the Association Request Packet was not received from the remote sender and method 1300 continues, at 1302, where a subsequent association request packet is sent. Any number of subsequent Sender Association Request packets can be sent up to a maximum number (e.g., max_sender_association_retry) number of times. If the timer has not expired ("NO"), a determination is made, at 1308, whether an Association Request Packet is received.

If the determination, at 1308, is that the Association Request Packet has not been received ("NO"), the method 1300 continues, at 1306, until either the timer expires or the Association Request Packet is received. If the Association Request Packet has been received ("YES"), an Association Response Packet can be sent that provides a Client ID to the remote device.

The Association Response Packet is sent in response to the Association Request Packet sent by C1. At substantially the same time as transmitting the Association Response Packet, the w-MDDI receiver can enter a "Sent Association Request" state and start an Association Timer. The Association Response Packet can be resent up to a maximum of max-association retry number of times. In accordance with some aspects, the Association Response Packet includes information related to whether the w-MDDI receiver is security capable and/or if security is mandatory for the receiver.

This packet provides C2 the Client ID and Display/device ID. This is part of the three-way handshake association. The Association Response Packet contains a Packet Length, a Packet Type, a Client ID, and a CRC. The Packet Length is two bytes that contain a 16 bit unsigned integer that specifies the total number of bytes in the packet not including the packet length field. The Packet Type is two bytes that contain a 16 bit unsigned integer. A packet type of 155 identifies the packet as an association response packet. The Client ID is two bytes allocated for client ID of C2 and the CRC is two bytes that contain a 16-bit CRC of all bytes in the packet including the Packet Length.

If the determination at 1308 is that the packet is received ("YES"), at 1312, the w-MDDI sender responds with an Association Response Packet providing a client ID to the w-MDDI receiver (similar to the receiver initiated association case described above). In accordance with some aspects, the Association Response Packet also contains the security capability and security mandatory information for the transfer, confirming the information that had been sent originally.

The sender may also start a timer, such as an Association_Response timer, at substantially the same time as sending the Association Response Packet. The receiver should reply with a Client Capability Packet and/or link quality information. Every Association Response received by the receiver should be responded with a Client Capability packet.

If the Association-Response timer expires, the wireless sender resends the Association Response packet a maximum (e.g., association-retry) number of times. The Sender Association Request, Association Request, Association Response and Client Capability can constitute a four-way handshake procedure.

Method 1300 enables the w-MDDI sender and receiver to negotiate their security capability and mandatory options. The association process can proceed or be stopped based on the possibilities in Table 1, as described above. If the secure communication option is enabled as the result of the above negotiations, the Client ID provided by the w-MDDI sender is unauthenticated at this point and will be trusted only after the mutual authentication process is completed.

If the security option is turned on, mutual authentication can be performed, which will be described below. In accordance with some aspects, a receiver that is associated with a particular sender will not accept association requests from any other sender. In this situation, the w-MDDI receiver may send an Association Denied Packet to the sender.

Figure 14:
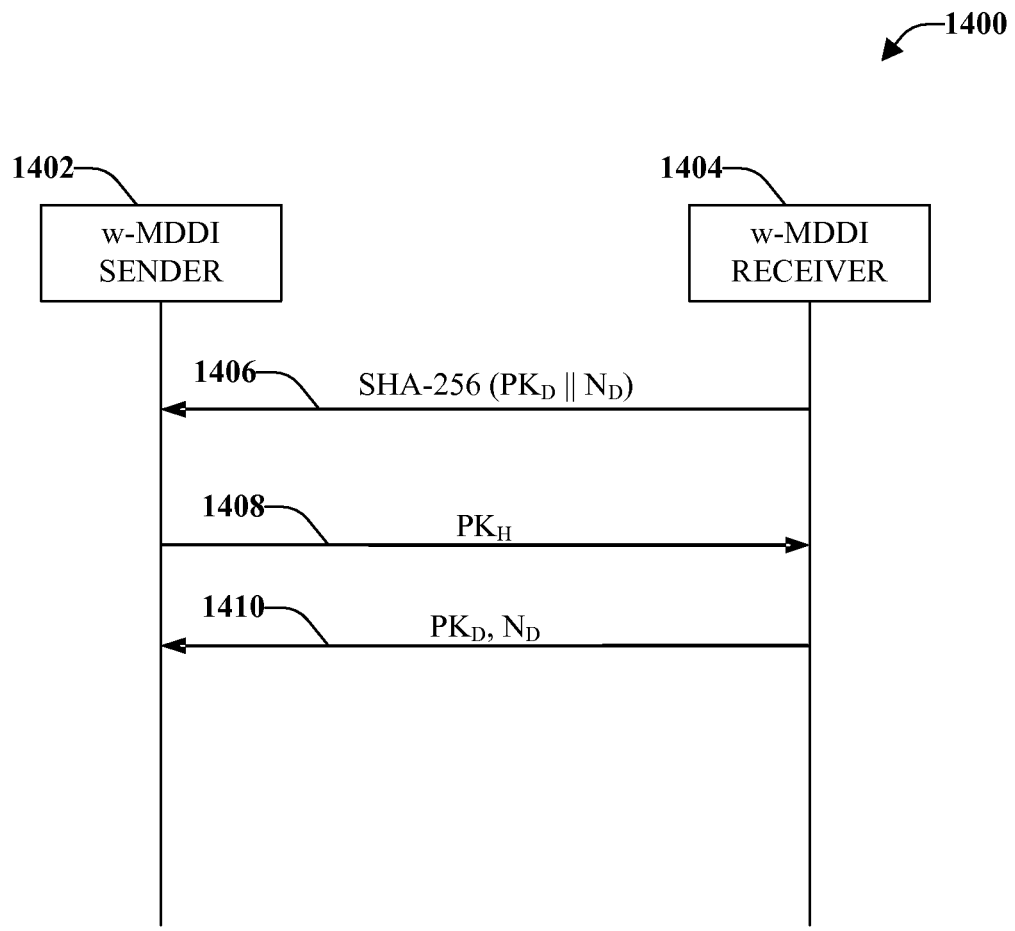
FIG. 14 illustrates a procedure for mutual authentication and key exchange.

FIG. 14 illustrates a procedure 1400 for mutual authentication and key exchange. In accordance with this example, the procedure 1400 is based on a numeric association model of Wireless USB. If a security operation is required, the mutual authentication and key exchange takes place between the w-MDDI sender 1402 and the w-MDDI receiver 1404. This procedure is similar to the "numeric association procedure" in wireless USB. A Diffie-Hellman protocol can be utilized to establish a temporary secure channel. To guard against a man-in-the-middle attack, the host and the device can each display a value that is derived from the Diffie-Hellman keys and the user is asked to verify that the two values match.

The w-MDDI receiver 1404 can generate a fresh random secret A and computes $PK_D=g^A \mod p$. The A and $PK_D$ values can be prohibited from being hard coded in the device at manufacture time. The w-MDDI receiver 1404 can compute the hash SHA-256($PK_D \| N_D$) and sends the hash, at 1406, to the w-MDDI sender 1402. $N_D$ is the number of digits that the device is capable of displaying. This hash commits the device to the $PK_D$ and $N_D$ values, without revealing the values until later, after the w-MDDI sender's public key is revealed.

The w-MDDI sender 1402 can generate a fresh random secret B and computes $PKH=g^B \mod p$. The B and $PK_H$ values can be prohibited from being hard coded into the w-MDDI sender at manufacture time. The w-MDDI sender 1402 sends PKH to the device, at 1408. The device aborts the association if $PK_H$ equals 1 or p−1.

The w-MDDI receiver 1404 sends $PK_D$ and $N_D$ to the w-MDDI sender, at 1410. W-MDDI sender 1402 aborts the association if $PK_D$ equals 1 or p−1. The W-MDDI sender 1402 computes SHA-256($PK_D \| N_D$) and verifies the result with the hash commitment received from the device previously. The W-MDDDI sender 1402 aborts the association if the values do not match. Further, the W-MDDDI sender 1402 computes the shared secret DHKey=SHA-256(PKDB mod p). The w-MDDI sender 1402 computes the shared secret DHKey=SHA-256($PK_H^A \mod p$).

In order to protect against man-in-the-middle attacks, both sides compute a common value V=SHA-256($PK_D \| PK_H \|$ "displayed digest") and display a few digits (e.g., two digits, three digits, four digits, and so on) of this number to the user on their respective displays.

A user can manually verify that the numbers shown on the w-MDDI sender and device match (e.g., reviewing both displays) and presses "ok" (or takes some equivalent action) on both the w-MDDDI sender and the device. If the user selects "does not match" or user confirmation is not received on both the w-MDDDI sender and the device within a timeout period, then the association is aborted and a failure indication is displayed to the user. The timeout period can be at least 20 seconds with no maximum timeout period.

If the user approves the association, the w-MDDDI sender and device both compute the Master Key (PMK)=the first 128 bits of HMAC-SHA-256DHKey("Pairwise Master Key"). The w-MDDDI sender also sends to the device any remaining non-private information that it needs to complete the association.

If any other applications need additional keys for whatever purpose, then a key derivation key KDK is computed as KDK=HMAC-SHA-256-DHKey ("key derivation key"). The KDK value can then be used immediately or stored away for later use as the keying material for any other purposes.

In accordance with some aspects, dissociation can occur. For example, if the w-MDDI sender does not receive a Link Status Packet (MAC Response packet) from a receiver in mac_response_fail_time msec time, it can declare the receiver as dissociated. The sender, then removes the entry corresponding to the receiver from the device association table. After entering the dissociated state, the w-MDDI sender/receiver does not respond to the Link Status Packet (MAC Response Packet) and Sender Link Status Packet (Sender MAC Response packet) respectively.

According to some aspects, if the w-MDDI receiver does not receive Sender MAC Response packets in response to max_MAC_Response_retries packets, the w-MDDI receiver enters the dissociated state. If a Link Status Packet (MAC Response Packet) appears from a receiver after it has been marked as dissociated in the sender's device association table, the association process needs to be reinitiated by the sender (e.g., the sender performs a sender-initiated association).

Figure 15:
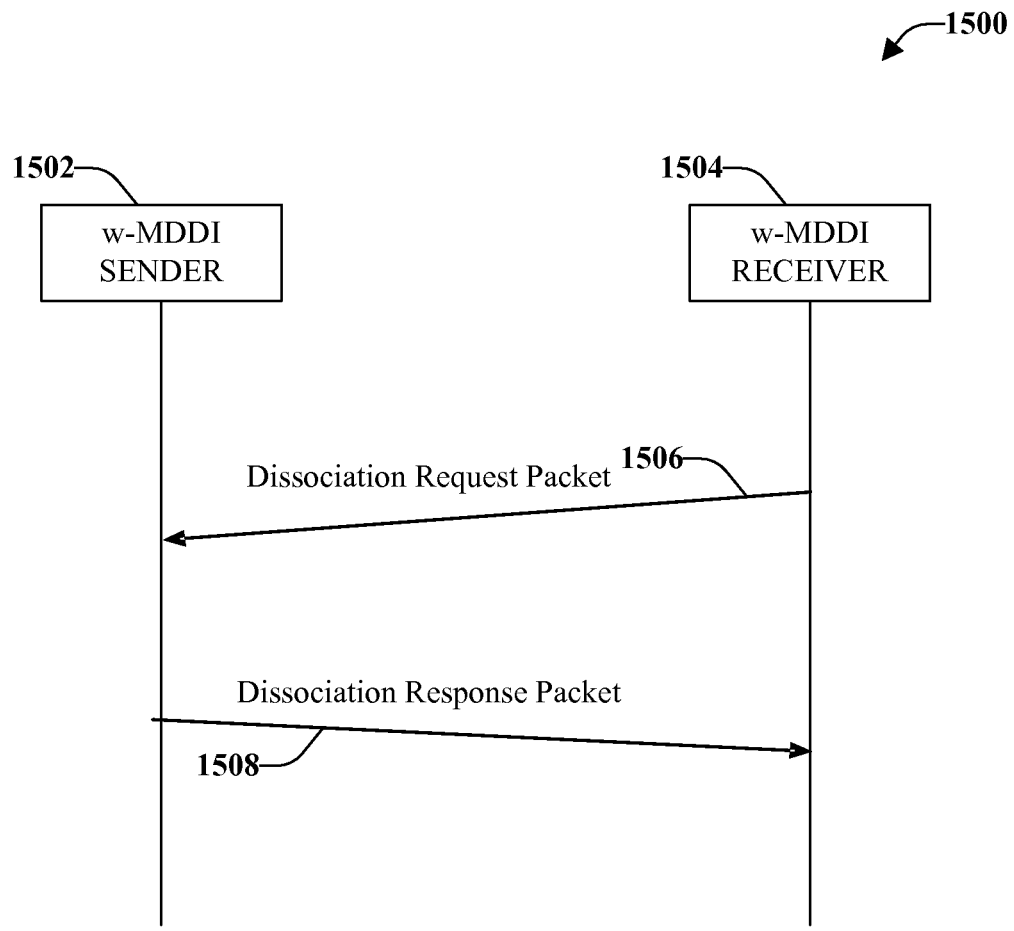
FIG. 15 illustrates a receiver-initiated dissociation procedure.

FIG. 15 illustrates a receiver-initiated dissociation procedure 1500. The w-MDDI receiver 1504 can also dissociate by sending an explicit Dissociation Request Packet 1506 to the w-MDDI sender 1502. The w-MDDI sender 1502 responds with a Dissociation Response Packet 1508. After receiving this packet, the w-MDDI receiver 1504 enters a dissociated state. The w-MDDI sender 1502, then removes the entry corresponding to the w-MDDI receiver 1504 in the device association table.

Figure 16:
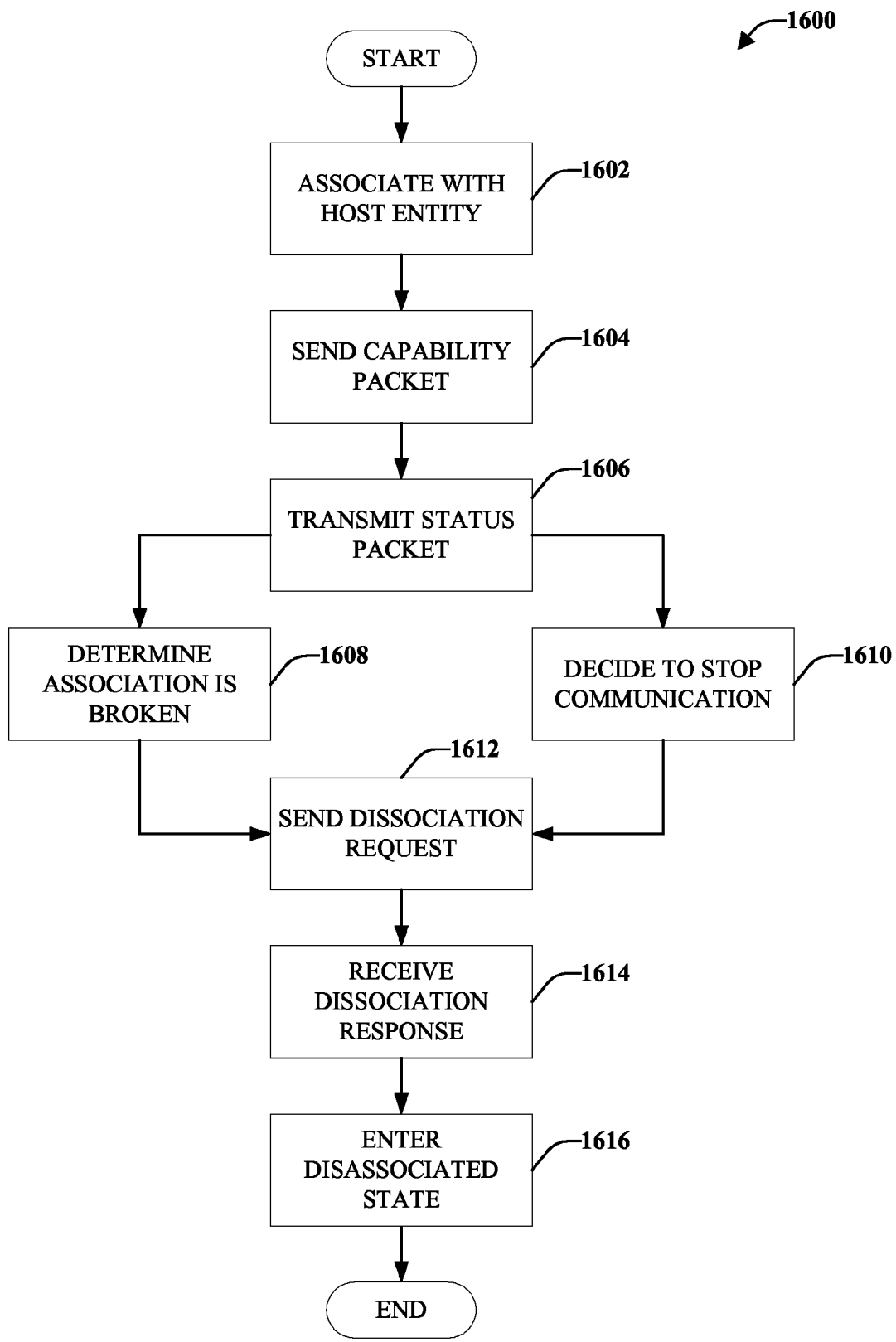
FIG. 16 illustrates a method for receiver-initiated dissociation between a user device and a host entity.

FIG. 16 illustrates a method 1600 for receiver initiated dissociation between a user device (e.g., receiver) and a host entity (e.g., sender). The method 1600 starts, at 1602, with associating the user device with a host entity. At substantially the same time as association with the host entity is established, a capability packet is sent, at 1604. The capability packet can include one or more capabilities of the user device. A status packet can be transmitted, at 1606. Such transmission of the status packet can be based on a request for the packet from the host entity, periodically, or when a status changes.

At 1608, a determination may be made that the association is broken and/or, at 1610, it may be decided to stop communication with the host entity. For example, the determination can be made if the wireless receiver does not receive a Sender MAC Response Packet from the wireless sender in a predetermined amount of time. A MAC Response Packet provides MAC statistics on the wireless receiver MAC, such as average number of retransmissions, packet error rate, and so forth. The packet contents can include a packet length, packet type, Client ID, average number of transmissions, frame error rate, physical layer rate, CRC. The MAC Response Packet can be two bytes in length that contains a sixteen bit unsigned integer that specifies the total number of bytes in the packet, not including the packet length field. The packet type is two bytes that contains a sixteen bit unsigned integer. A packet type of 150 identifies the packet as a MAC Response Packet. The client ID is two bytes that contains a sixteen bit unsigned integer. This is the Client ID of C1/C2 depending on which client is the originator of the packet. The average number of retransmissions can be two bytes and for each MAC frame transmitted in the reverse direction. The frame error rate can be two bytes and is the packet error rate seen in the forward direction. A physical layer rate can be two bytes and is the transmission rate on the physical layer. The CRC is two bytes that contains a sixteen bit CRC of all bytes in the packet including the packet length.

The Sender MAC Response Packet provides the MAC statistics on the w-MDDI sender MAC, such as average number of re-transmissions, packet error rate and so forth to the w-MDDI receiver. This packet is sent by the wireless sender acknowledging the MAC response Packet sent by the wireless receiver. The packet contains a Packet Length field of two bytes that contain a 16 bit unsigned integer that specifies the total number of bytes in the packet, not including the packet length field. Also included is a Packet Type field of two bytes that contain a 16 bit unsigned integer. A packet type of 159 identifies the packet as a Sender MAC Response Packet. A cClient ID is two bytes that contain a 16 bit unsigned integer. This is the Client ID of C2, the destination client. The Average number of retransmissions is the average number of retransmissions for every MAC frame transmitted on the reverse direction. A Frame Error Rate is the packet error rate seen in the forward direction. A Physical Layer Rate is the transmission rate on the physical layer. Also included in the packet is a CRC that is two bytes in length that contain a 16 bit CRC of all bytes in the packet including the Packet Length.

If either or both the association is broken or communication should be stopped, the user device should be dissociated from the host entity. Such dissociation can include, sending an explicit Dissociation Request Packet, at 1612, to the wireless sender. If there is still a communication link between the host entity and the user device (e.g., all communication has been lost), a Dissociation Response Packet is received from the wireless sender, at 1614. At substantially the same time as the dissociation response is received, the user device enters a dissociation state, at 1616.

The Dissociation Request Packet can be sent by C2 when it wants to dissociate with the wireless sender and to make a graceful exit. Included in the Dissociation Request Packet is a Packet Length field that is two 2 bytes in length that contain a 16 bit unsigned integer that specifies the total number of bytes in the packet not including the packet length field. A Packet Type field is two bytes that contain a 16 bit unsigned integer. A packet type of 156 identifies the packet as a dissociation request packet. A Client ID field is two bytes allocated for client ID of C2. The CRC field is two 2 bytes that contain a 16 bit CRC of all bytes in the packet including the Packet Length.

The Dissociation Response Packet is sent in response to the dissociation request packet. It has a Packet Length of two bytes that contain a 16 bit unsigned integer that specifies the total number of bytes in the packet not including the packet length field. A Packet Type is two bytes that contain a 16 bit unsigned integer. A packet type of 157 identifies the packet as a dissociation response packet. A Client ID is two bytes allocated for client ID of C2 and a CRC field is two bytes that contain a 16 bit CRC of all bytes in the packet including the Packet Length.

Figure 17:
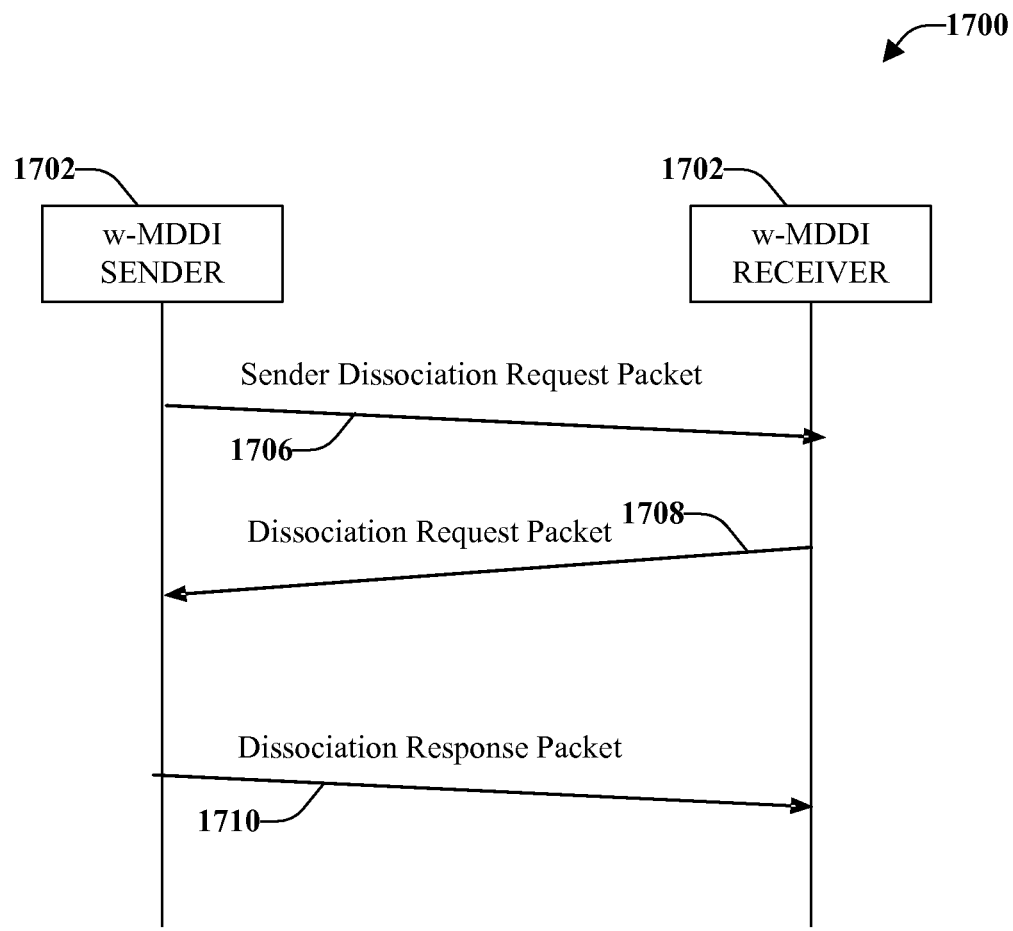
FIG. 17 illustrates a sender-initiated dissociation procedure.

With reference now to FIG. 17, illustrated is a sender-initiated dissociation procedure 1700. The sender 1702 can dissociate by sending a Sender Dissociation Request Packet 1706 to the receiver 1704. The receiver 1704 then sends a Dissociation Request 1708. The sender 1702 acknowledges by sending a Dissociation Response 1710, which completes the dissociation procedure.

Figure 18:
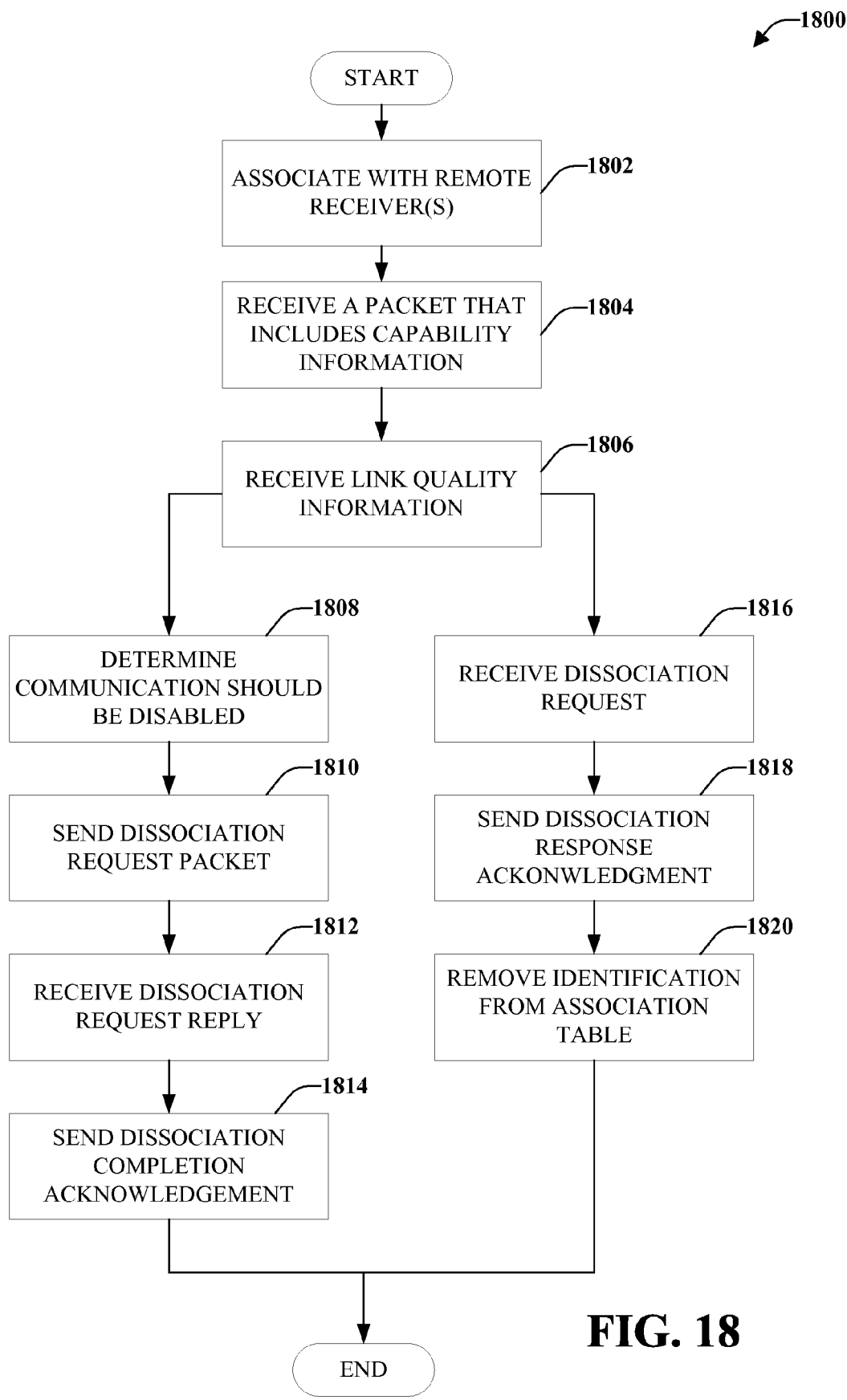
FIG. 18 illustrates a method for selective disassociation between a sender and a remote receiver.

FIG. 18 illustrates a method 1800 for selective disassociation between a sender and a remote receiver. At 1802, an association between a sender and a remote receiver can be established. A packet that includes capability of the remote receiver can be received, at 1804, and link quality information can be received, at 1806. In addition, a MAC address of the sender and an identification of the remote receiver can be included in a device association table associated with the sender.

In some situations, it might be necessary to discontinue the association between the remote receiver and the sender and a determination can be made, at 1808, that the communication between the sender and the remote receiver should be disabled. For example, if a wireless sender does not receive a MAC Response Packet from a receiver in a predetermined interval (e.g., mac_response_fail_time) msec, it can declare the receiver as dissociated and at 1810, a Sender Dissociation Request Packet is sent to the receiver. A reply to the dissociation request (e.g., Dissociation Request) is received from the receiver, at 1812. A dissociation completion acknowledgment (e.g., Dissociation Response) can be sent, at 1814, to complete the dissociation procedure.

In some aspects, a dissociation request can be explicitly received, at 1816, from a remote receiver. At 1818, a dissociation response acknowledgement e.g., Dissociation Response) is sent. At 1820, an identification of the dissociated device is removed from an association table.

The Sender Dissociation Request Packet is sent by the wireless sender initiating the Dissociation. It includes a Packet Length field of two bytes that contain a 16 bit unsigned integer that specifies the total number of bytes in the packet not including the packet length field. A Packet Type field of two bytes that contain a 16 bit unsigned integer. A packet type of 161 identifies the packet as a dissociation request packet. A Client ID is two 2 bytes allocated for client ID of C2. A CRC field is two bytes that contain a 16 bit CRC of all bytes in the packet including the Packet Length.

In accordance with some aspects, all the W-MDDI receivers periodically send a Link Status Packet (MAC Response packet) once in mac_response_time msec. The host obtains the w-MDDI receiver link statistics (receiver-MAC statistics) from these packets. The sender also periodically queries the sender-MAC to obtain the sender side link statistics (MAC statistics.). The sender can determine the lower layer rate (MAC rate) based on this information. This rate information can be passed on to the application. This can help the application to scale up/scale down its data rate. The sender sends a Sender Link Status Packet (Sender MAC Response Packet) to the individual receivers in response to the Link Status Packet (MAC Response Packet) that it receives from each of the individual w-MDDI receivers.

According to some aspects, Client ID's are given out by the w-MDDI sender to the w-MDDI receiver during the association process through the Association Response Packet. The clientID's denote the addressing identifiers with respect to a particular w-MDDI sender. The client ID pool is unique for a sender. A new receiver can be allocated any clientID from the free pool. In accordance with some aspects, the clientID that unused for the largest amount of time be assigned to a w-MDDI receiver. (e.g., association contexts using the same clientID are spaced apart by a long time). This is to make sure that the clientIDs be reused as less frequently as possible.

Figures 19, 20:
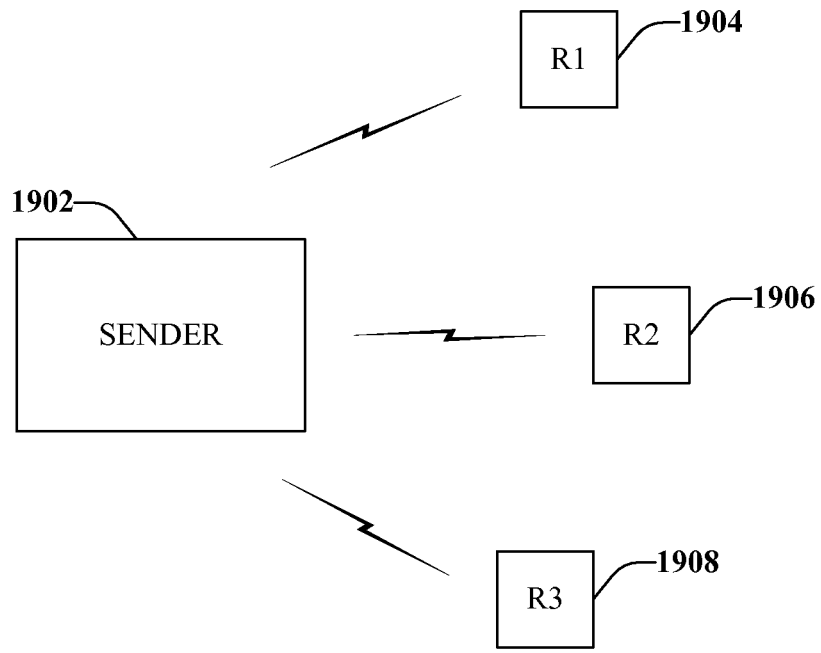
FIG. 19 illustrates a single wireless sender associating with multiple wireless receivers in accordance with the disclosed aspects.
FIG. 20 illustrates an example device association table.

FIG. 19 illustrates a single wireless sender associating with multiple wireless receivers in accordance with the disclosed aspects. To fully appreciate the disclosed aspects, various wired packets and their behavior in the wireless techniques will now be described. Filler packets are not generated in wireless communication of high rate data because filler packets were designed to maintain synchronization on the wired link and are, therefore, unnecessary with a wireless link.

A Client Capability Packet informs the host of the capabilities of the client. In MDDI, the client should send this packet after forward link synchronization. The client can also send the client capability packet when requested by the host through reverse link flags in a reverse link encapsulation packet. The client capability packet can contain fields that pertain to the link such as pre-calibration data rate capability, interface type capability, post-calibration data rate capability, and the like. This packet can also contain fields pertaining to external devices, such as a display device attached to the client. Such fields can include the number of alternate displays, a bitmap width, a bitmap height, display window width, display window height, color map size, and so forth.

During an association procedure in wireless MDDI, the receiver can send the Client Capability Packet as a response to an Association Response Packet sent by the wireless sender. The wireless receiver (C2) can also send an alternate display capability packet if it is associated with any alternate displays. The wireless receiver (C2) can send a Client Capability Packet to the sender when there is a change in status and/or capabilities of the external devices (e.g., a new device being added, an existing device being removed, change of parameters of an existing device, and so on). Alternatively or additionally, the client capability packet can be sent periodically to assist in reliability of client capability packets. In accordance with some aspects, a w-MDDI receiver can send a client capability packet to a w-MDDI sender when the w-MDDI sender request it though C2 flags field of a C2 Request Packet.

A client request and status packet can be used to send information from a client to a host to allow the host to configure the host-to-client link in a more optimum fashion. In a wired MDDI configuration, the client can send this packet to the host as a first packet in a reverse link encapsulation packet. The client can, alternatively or additionally, send this packet to the host when the host requests it explicitly through a reverse link flags in a reverse link encapsulation packet.

In wireless MDDI, the wireless receiver may periodically send a Client Request and Status Packet to the wireless sender to indicate its CRC Error Count and also when there is a change in status of the external devices. The wireless receiver may also send a Client Request and Status Packet to the wireless sender requests it through the C2 flags field of a C2 request packet.

With reference again to FIG. 19, each wireless sender 1902 (of which only one is illustrated) can associate or communicate with multiple wireless receivers, illustrates as receiver 1 (R1) 1904, receiver 2 (R2) 1906, and receiver 3 (R3) 1908. The sender 1902 and receivers 1904, 1906, 1908 can be MDDI sender(s) and/or MDDI receivers or other senders and receivers that can communicate high rate digital data wirelessly. Each receiver 1904, 1906, 1908 can have multiple displays (not shown) and devices (not shown). For example, each receiver can have sixteen displays, although more or less than sixteen can be associated with a single receiver. Each receiver can have a w-MDDI client entity C2.

For example, wireless devices, such as a wireless display, wireless mouse, wireless keyboard, and so forth, can have a w-MDDI receiver, and each wireless device can be identified as a separate client. From the perspective of a host (e.g., sender 1902), each of these clients can be identified by a unique client identification (Client ID). Therefore, Client C1 can have a Client ID of "0". Wireless receiver, such as receiver (R2) 1906, can send a client capability packet to the wireless (C2) sender 1902 when there is a change in the capabilities of the external devices connected to receiver (R2) 1906. Additionally or alternatively, each receiver can send a client capability packet periodically to ensure reliability.

Sender 1902 should maintain a device association table, such as table 2000 shown in FIG. 20. Table 2000 illustrates an association of a single wireless sender with multiple wireless receivers (e.g., client).

The packets intended for a different receiver clients can be forwarded to the respective devices based on the table. Table 2000 illustrates two clients (1 and 2). Associated with Client #1 is the MAC address X:Y:Z:P:Q:R, and a Client ID "C21". Associated with Client #2 is the MAC address U:V:W:L:M:N and the Client ID "C22". In such a manner, the sender can communicate with the appropriate receiver by accessing the look-up table 2000.

In order for a sender to communicate with a receiver, there should be device association. Either device (sender or receiver) can initiate the association process. For example, if a wireless sender is a phone and a wireless receiver is a projector/display, the phone (e.g., sender) would typically initiate the communication. However, there are situations where a receiver would initiate the communication. Thus, there can be receiver initiated association or sender initiated association.

In accordance with some aspects, if the underlying lower layer supports multicasting, the multicast support can be utilized with a single w-MDDI sender communicating with multiple w-MDDI receivers. The w-MDDI receivers and senders can join the WMDDI_CONTROL_MULTICAST group.

The w-MDDI sender that desires to use the multicast facility should form a multicast group. If there is a centralized server which provides lower layer multicast addresses (e.g., a DHCP server) in the case of IP, the w-MDDI sender can obtain a multicast address on a lease. This can be performed either before the service discovery procedure or after the service discovery procedure. The duration for the lease can be short term (limited to the duration of the association) or it can be longer term (much larger than the association life time).

For example, when there is a centralized server, the centralized server should be utilized to assign the addresses. In the absence of a centralized server, each individual sender can choose a multicast address individually. In this case, there could be addresses colliding (e.g., two senders choosing the same address). Thus, there should be an algorithm to mitigate multiple senders choosing the same address.

According to various aspects, operation with miMedia UWB Mac can be enabled. As previously mentioned, w-MDDI can operate on any underlying high-speed wireless link. As an example, the following describes the operation of w-MDDI with the wiMedia MAC. When the underlying lower layer is wiMedia UWB MAC, the following can be utilized for sending the control packets (for association, dissociation and so forth.)

An Application Specific IE can be utilized in the beacons to carry the control packets in w-MDDI. For example, the Application Specific Data field in the ASIE can be set to the control packets (for association, dissociation, etc). The ASIE packet is shown in FIG. 10. The ASIE specifier ID is set to: wMDDI_wiMedia_ASIESpecifierID.

If Application Specific IE cannot be utilized, the control packets for association and dissociation can be sent using the PCA mode if it is available and if it is not feasible to use ASIE elements in the beacons. If using PCA mode, they should use user priority=7 i.e. AC=AC_VO.

If Application Specific IE and PCA cannot be utilized, DRP can be utilized. When using DRP, soft DRPs can be used. If using PCA mode, they should use user priority=7 i.e. AC=AC_VO. The MAC header for an Association Request packet in the case of Receiver-Initiated Association can be the following:
Frame Control:
Retry: 0
Frame subtype/Delivery ID:
When using PCA,
b12=0
user priority (b11–b9)=7 (corresponding to voice; e.g., AC=AC_VO)
When using DRP,
b12=1
Stream Index (b11–b9)=(between 8 and 15)
Frame Type (b8–b6): Data
ACK policy: 1 (Imm-ACK)
Secure:?
Protocol Version: 0 (currently)
Access Information:
Access method: 0 (if PCA is used)
:1 (if DRP is uses)
More Frames: set accordingly
Duration: set accordingly
Dest Addr: Dev Addr of the sender
Src Addr: Dev Addr of the receiver
When using DRP, soft DRP can be utilized.

The data packets (e.g. audio stream packets, video stream packets, and so forth) can use DRP reservations on the forward and reverse links. The traditional MDDI control packets can use PCA mode if available. Otherwise, they should use DRP reservations.

Figure 21:
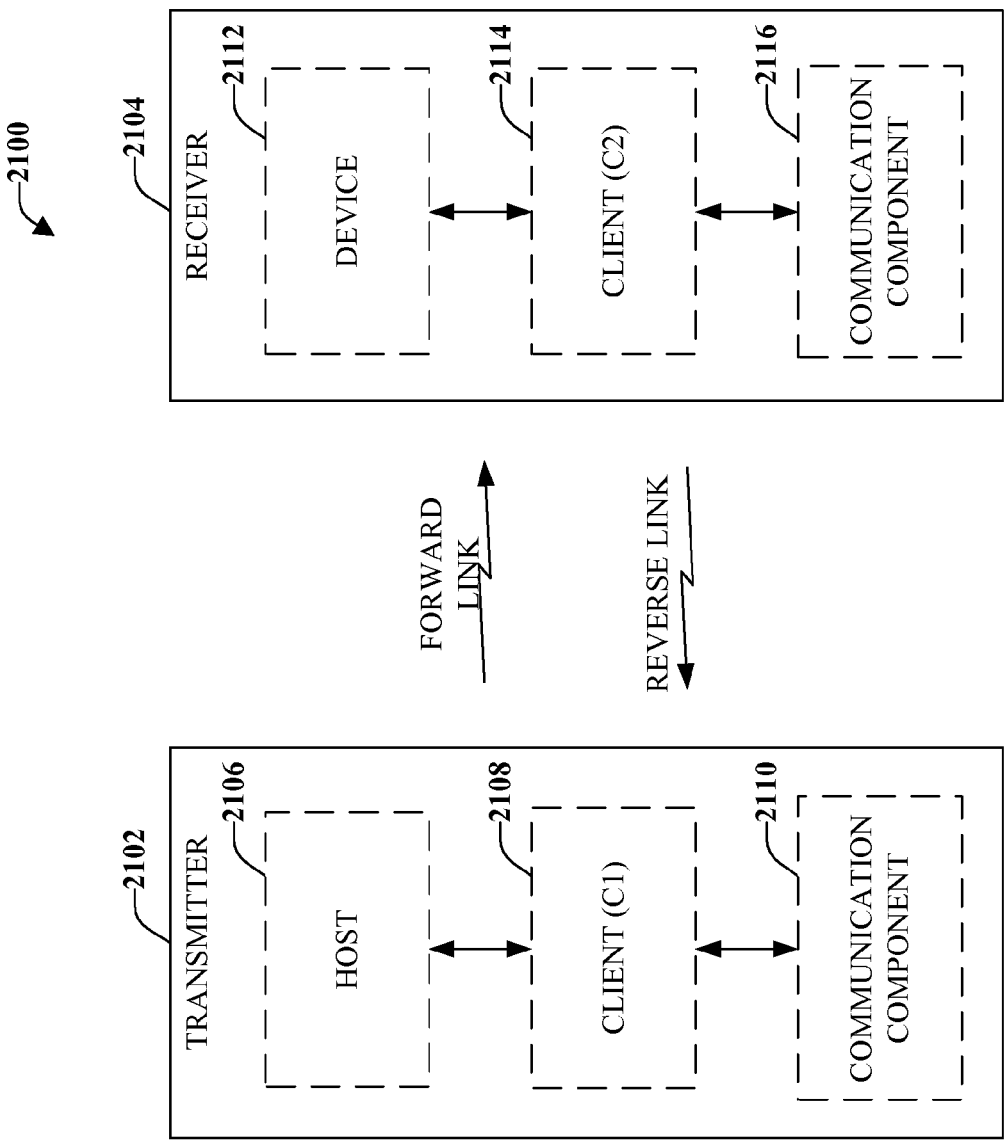
FIG. 21 illustrates a system for extending the capabilities of a traditionally wired configuration to allow communication over a wireless link.

FIG. 21 illustrates a system 2100 for extending the capabilities of a traditionally wired configuration to allow communication over a wireless link. System 2100 includes a transmitter 2102 that communicates with a receiver 2104 over a forward link. Receiver 2104 communicates with the transmitter 2102 over a reverse link. Transmitter 2102 and receiver 2104 can be devices that generally communicate over a wired protocol, however, system 2100 allows such devices to communicate over the wired protocol and/or over a wireless protocol, such as over a high-speed wireless link. Although a number of transmitter(s) 2102 and receiver(s) 2104 can be included in system 2100, as will be appreciated, a single transmitter 2102 that transmits communication data signals to a single receiver 2104 is illustrated for purposes of simplicity.

Transmitter 2102 can include a host 2106, a portion of a client (C1) 2108, and a communication component 21 10. Host 2106 can be an MDDI host, for example. In accordance with some aspects, host 2106 can be a component separate from transmitter 2102 and connected to transmitter 2102 through a wired link. A portion of client (C1) 2108 is kept on or in communication with host 2106 for clock synchronization. Client (C1) 2108 can be connected to host 2106 through a traditional wired link (e.g., MDDI link), for example. Host 2106 can be configured to send or communicate packets of data to client (C1) 2108. These packets can be communicated to receiver 2104 through communication component 2110, which can include a modem, such as an ultra wide band (UWB) modem. Some packets (e.g., MDDI round-trip delay measurement packet) are processed by client (C1) 2108 and communicated to receiver 2104. Other packets (e.g., filler packets) should be dropped by client (C1) 2108 and not communicated to receiver 2104. That is to say, some packets should not be transmitted on either the forward wireless link or the reverse wireless link. A filler packet, for example, maintains timing between transmitter 2102 and receiver 2104. Such packets can be generated by either transmitter 2102 or receiver 2104 through respective client portions.

Receiver 2104 can include an interface device 2112 (e.g., display), a portion of client (C2) 2114, and a communication component 2116. In accordance with some aspects, the device 2112 can be a component separate from the receiver 2104 and connected to the receiver 2104 through, for example, a wired link. Client (C2) 2114 can be connected to device 2112 through a wired link. Client (C2) 2114 can be configured to process a packet received from transmitter 2102. Receiver 2104 can receive the communication from transmitter 2102 through communication component 2116 that can include, for example, an UWB modem.

System 2100 can be configured to operate in one of two modes of operation. These modes include a low overhead mode and a low latency mode. In low overhead mode, client (C1) 2108 places the data to be sent (excluding for example, fill packets and round trip delay packets), in a buffer that can be included on the communication component 2110 (e.g., UWB modem). The communication component 2110, through a UWB MAC, for example, can periodically request unidirectional channel time allocations (CTA) from transmitter 2102 to receiver 2104 based on the size of the buffer. In a reverse direction (e.g., reverse link), client (C2) 2114 can place the reverse link data that is to be sent (excluding filler packets, for example), in a buffer associated with communication component 2116 (e.g., UWB modem). In the reverse direction, the communication component 2116 can request reverse-direction CTAs.

For low latency mode, during an initialization phase, communication component 2110 (e.g., UWB modem) can request a CTA for m msec in the forward direction and a CTA for n msec in the reverse direction. The expected ratio of traffic in the forward and reverse directions is m: n and m sec is the duration corresponding to the MDDI forward link transfer rate of $R_{f\text{-}mddi}$. $T_{CTAP}$ is the duration of the CTA period and T is a superframe duration, which is determined by the latency constraints of the application where:

$$(m+n) < T_{CTAP} < T$$

Figure 22:
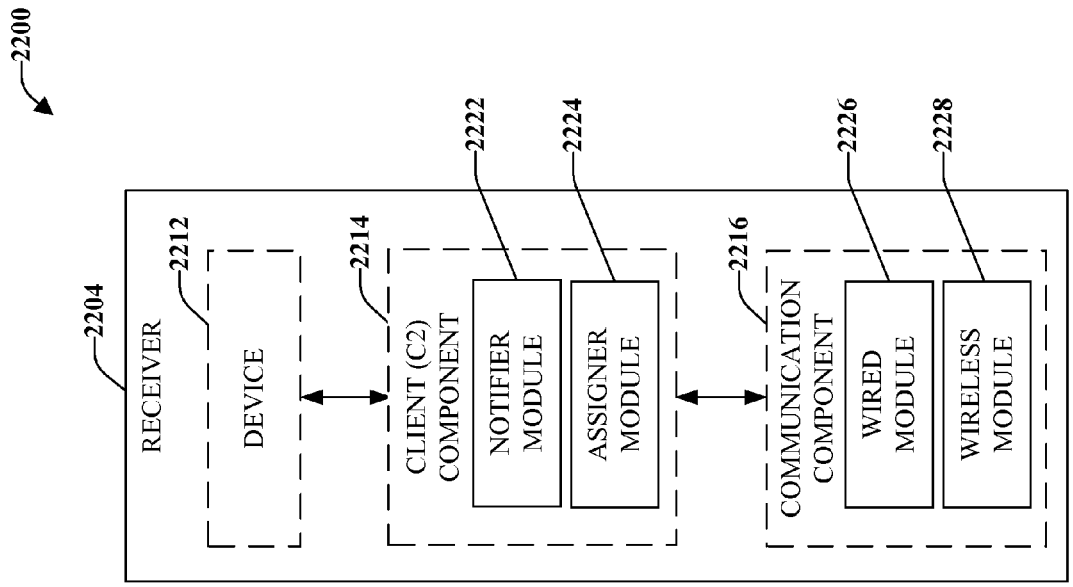
FIG. 22 illustrates a system for communicating through wired and/or wireless architectures.
Figure 22:
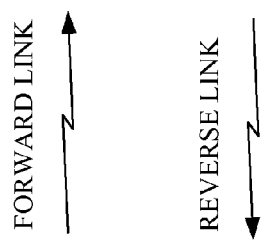
Figure 22:
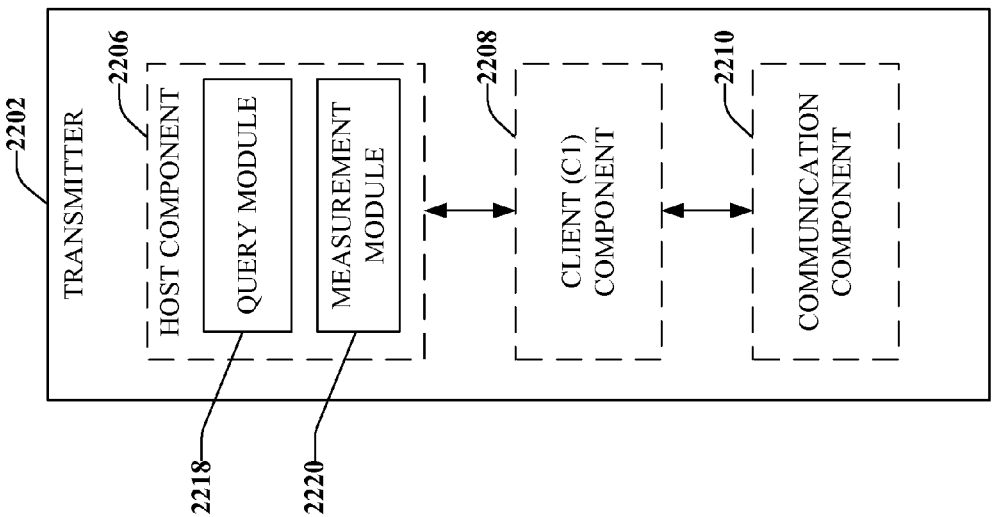

With reference now to FIG. 22, illustrated is a system 2200 for communicating through wired and/or wireless architectures. System 2200 includes a transmitter 2202 and a receiver 2204 that communicate over a forward link (from transmitter 2202) and/or a reverse link (from receiver 2204). The communication over the forward link and/or reverse link can be over a wired protocol and/or over a wireless protocol depending on the particular situation (e.g., data to be transmitted, data rates, quality of communication link, status of each device, . . . ). Although a number of transmitter(s) 2202 and receiver(s) 2204 can be included in system 2200, as will be appreciated, a single transmitter 2202 that transmits communication data signals to a single receiver 2206 is illustrated for purposes of simplicity.

Transmitter 2202 can include a host component 2206 connected to a client (C1) component 2208 and a communication component 2210. Receiver 2204 can include a device 2212 connected to a client (C2) component 2214 and a communication component 2216. Client (C1) component 2208 and client (C2) component 2214 are respective portions of a client.

It will be understood by persons having ordinary skill in the art that transmitter 2202 and/or receiver 2204 can include additional components. For example, transmitter 2202 can include an encoder component (not shown) that can modulate and/or encode signals in accordance with a suitable wireless communication protocol which signals can then be transmitted to receiver 2204. According to some aspects, encoder component can be a voice coder (vocoder) that utilizes a speech analyzer to convert analog waveforms into digital signals or another type of encoder. Suitable wireless communication protocols can include, but are not limited to, Orthogonal Frequency Division Multiplexing (OFDM), Orthogonal Frequency Division Multiplexing Access (OFDMA), Code Division Multiple Access (CDMA), Time Division Multiple Access (TDMA), Global System for Mobile Communications (GSM), High-Speed Downlink Packet Access (HSDPA), and the like.

Receiver 2204 can include a decoder component (not shown) that can decode a received signal and/or data packet therein for processing. Upon successful decode of a data packet, an acknowledgment component (not shown) can generate an acknowledgment that indicates successful decode of the data packet, which can be sent to transmitter 2202 to inform transmitter 2202 that the data packet was received and decoded, and therefore need not be retransmitted.

Host component 2206 can include a query module 2218 and a measurement module 2220. Query module 2218 can be configured to query a host medium access control (MAC) for an application data rate that the MAC provides. For wireless communication, the operation rate may depend upon the rate of the wireless link. Measurement module 2220 can be configured to determine the forward link rate and the reverse link rate based on, for example, a round trip delay measurement, which may be specified in the wireless protocol. In accordance with some aspects, the wireless operation rate can be determined by the minimum of the two rates (forward link rate and reverse link rate), the maximum capacity of host 2206, and the maximum capacity of client (C I) 2208. There should be a minimum allowable rate $R_{min}$. If the measured operation rate is below this minimum allowable rate, the operation rate can be adjusted by transmitter 2202 and/or receiver 2204 through respective components (e.g., communication components 2210 and/or 2216). Transmitter 2202 can notify receiver 2204 the rate at which the communication will be processed.

Client (C2) component 2214 can include a notifier module 2222 that can be configured to notify transmitter 2202 the application data rate that the MAC provides. Such notification can be based on a query received from transmitter 2202 (e.g., a query sent by query module 2218). For reverse link packets, notifier module 2222 can specify the number of bytes needed by receiver 2204 to send on the reverse link in the current frame. Client (C2) component can also include an assigner module 2224 that can be configured to assign a communication to a wired protocol or a wireless protocol depending on various parameters associated with a communication (e.g., communication type, rate of communication, sender, receiver, and the like).

Communication component 2216 can include a wired module 2226 and a wireless module 2228. The wired module 2226 can be configured to provide wired functionality and the wireless module 2228 can be configured to provide wireless functionality. A determination can be made whether to communicate wirelessly utilizing the wireless module 2228 or to communicate utilizing the wired module 2226. Such a determination can be based on a variety of factors including the operation rate, the type of data being transmitted (e.g., voice, text, image, . . . ), the size of the data or files being transmitted, if the data is typically communicated over a wired link or a wireless link, etc. Wired module 2226 and/or wireless module 2228 can include a buffer for storing content so that if a change is made during a communication from one module to the other module (e.g., wireless to wired, wired to wireless) communication is not lost due to switchover issues.

Information about whether the receiver 2204 is communicating over a wired link or wireless link does not need to be communicated to transmitter 2202. Transmitter 2202 performs its functions in substantially the same way regardless of the communication method (wired or wireless).

According to some aspects, transmitter 2202 can include a component configured to fragment a sub-frame (not shown) and receiver 2204 can include a component configured to reassemble the sub-frame (not shown). The maximum length of a MDDI sub-frame, for example, can be about 65,536 bytes, although it is generally smaller. The maximum size of an 802.15.3 MAC frame can be approximately 4,096 or around 8,192 bytes, if the underlying rate is about 480 Mbps. The size can be around 2,048 bytes if the underlying physical layer rate is approximately 200 Mbps. Thus, the sub-frame may need to be fragmented on the transmitter 2202 side and reassembled on the receiver 2204 side to accommodate the size of the frame. Such fragmenting and reassembly can be performed by respective communication components 2210 and 2216 and/or other components associated with transmitter 2202 and receiver 2204.

Figure 23:
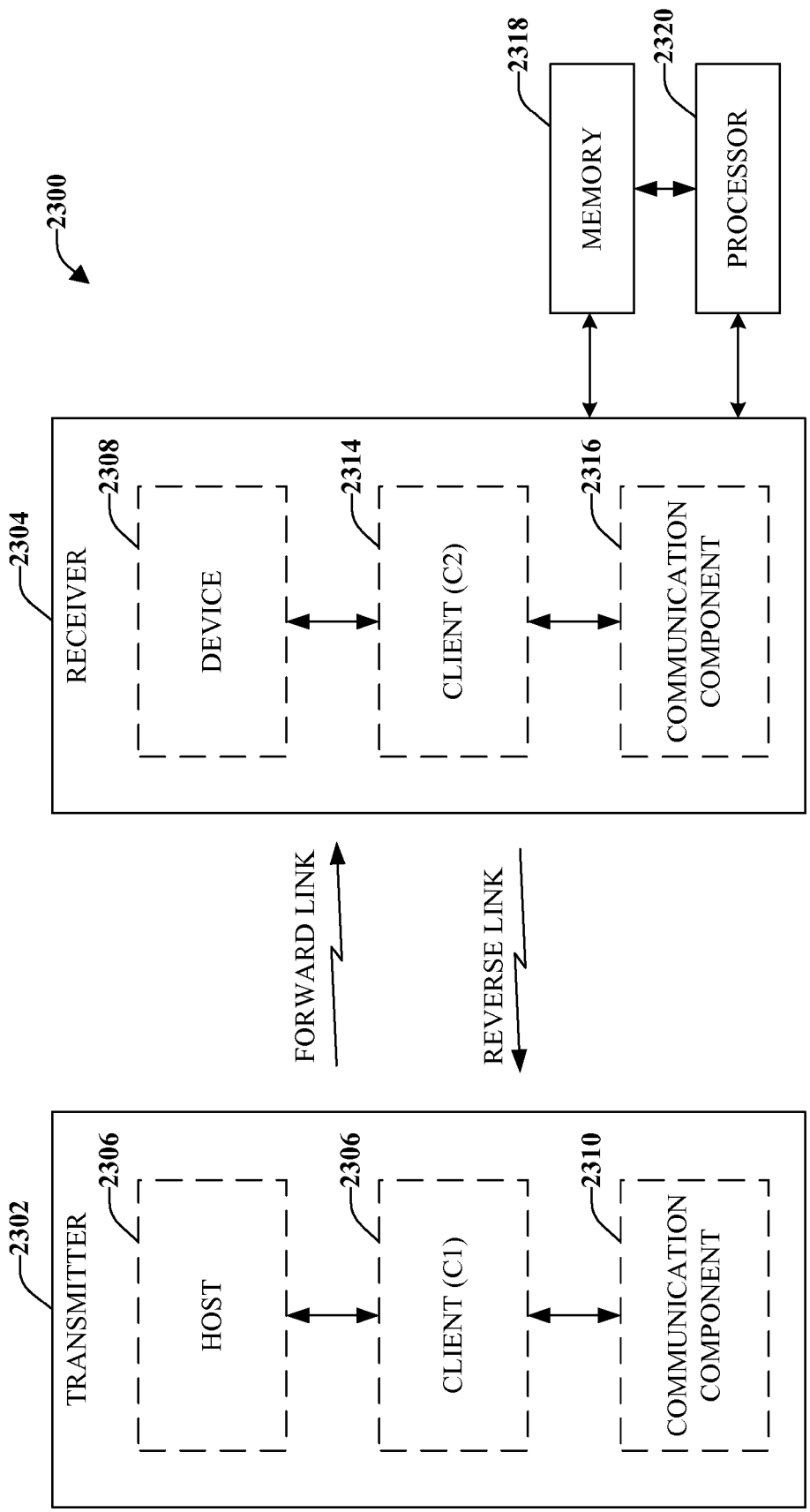
FIG. 23 illustrates another aspect of a system for extending traditionally wired configurations to allow communication over a wireless link.

FIG. 23 illustrates another aspect of a system 2300 for extending traditionally wired configurations to allow communication over a wireless link. System 2300 can include a transmitter 2302 that includes a host 2306, a portion of a client (C1) 2308, and a communication component 2310. System 2300 can also include a receiver 2304 that includes a device 2312, a portion of a client (C2) 2314, and a communication component 2316. Transmitter 2302 communicates to receiver 2304 over a forward link and receiver 2304 communicates to transmitter 2302 over a reverse link. As noted previously with regard to the above figures, although a number of transmitter(s) 2302 and receiver(s) 2304 can be included in system 2300, a single transmitter 2302 that transmits communication data signals to a single receiver 2304 is illustrated for purposes of simplicity.

System 2300 can include a memory 2318 operatively coupled to receiver 2304. Memory 2318 can store information related to a data rate for a packet and/or a packet type (e.g., application data rate provided by MAC, operation rate of the wireless link, . . . ), mode of operation for a packet and/or packet type, and/or other parameters associated with transmitting data over a wireless protocol, over a wired protocol, or a combination of these protocols. For example, a wired protocol can be used for a communication and a decision can be made to switch to a wireless protocol during the communication, or vice versa, without interruption or termination.

A processor 2320 can be operatively connected to receiver 2304 (and/or memory 2318) to facilitate analysis of information related to ascertaining whether a particular communication should be sent over a wired protocol or a wireless protocol. Processor 2320 can be a processor dedicated to analyzing and/or generating information communicated to receiver 2304, a processor that controls one or more components of system 2300, and/or a processor that both analyzes and generates information received by receiver 2304 and controls one or more components of system 2300.

Memory 2318 can store protocols associated with data communication rates, operation rates, taking action to control communication between receiver 2304 and transmitter 2302, etc., such that system 2300 can employ stored protocols and/or algorithms to achieve improved communication in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 2318 of the disclosed aspects are intended to comprise, without being limited to, these and other suitable types of memory.

Figure 24:
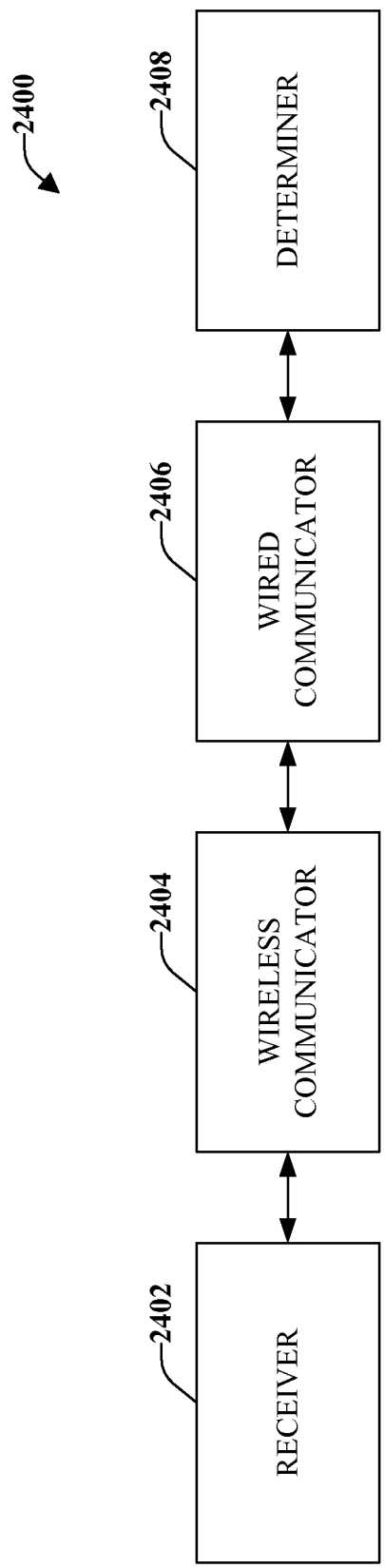
FIG. 24 illustrates a system for communicating over a wired link or a wireless link with a traditional wired device.

FIG. 24 illustrates a system 2400 for communicating over a wired link or a wireless link with a traditional wired device. System 2400 is represented as functional blocks, which can be functional blocks that represent functions implemented by a processor, software or combination thereof (e.g., firmware). System 2400 includes a receiver 2402 that can be configured to receive an operation rate for a communication. This operation rate can be received from, for example, a sender or a sender host. The operation rate can set up or establish the rate of communication in both a forward direction and a reverse direction. System 2400 also includes a wireless communicator 2404 that can be configured to send and/or receive a communication over a wireless protocol. A wired communicator 2406 can be configured to send and/or receive a communication over a wired protocol.

It should be noted that in a forward and/or a reverse direction there may be packet extensions and/or new packets. For example, in a forward direction MDDI sender information can be added to a packet. This packet extension can provide an MDDI client on the receiver end with MDDI sender side information. This information can include the rate at which the MDDI host and client should operate on the sender side. In the reverse direction, extensions to a client capability packet can include about four bytes for MDDI receiver MAC information and around two bytes for MDDI receiver client information, however other extensions are also possible.

Also included in system 2400 is a determiner that can selectively determine whether to utilize the wireless communicator to communicate over the wireless protocol or whether to utilize the wired communicator to communicate over the wired protocol. Such a determination can be selectively made based on various parameters, such as the communication operation rate. Other parameters can also be analyzed to make the determination. For example, the determination can be made based on how the particular communication has been traditionally sent and/or received (e.g., historical analysis), the type of communication (e.g., voice, image, text, . . . ), as well as other parameters relating to the communication, the sender, and/or the receiver.

Figure 25:
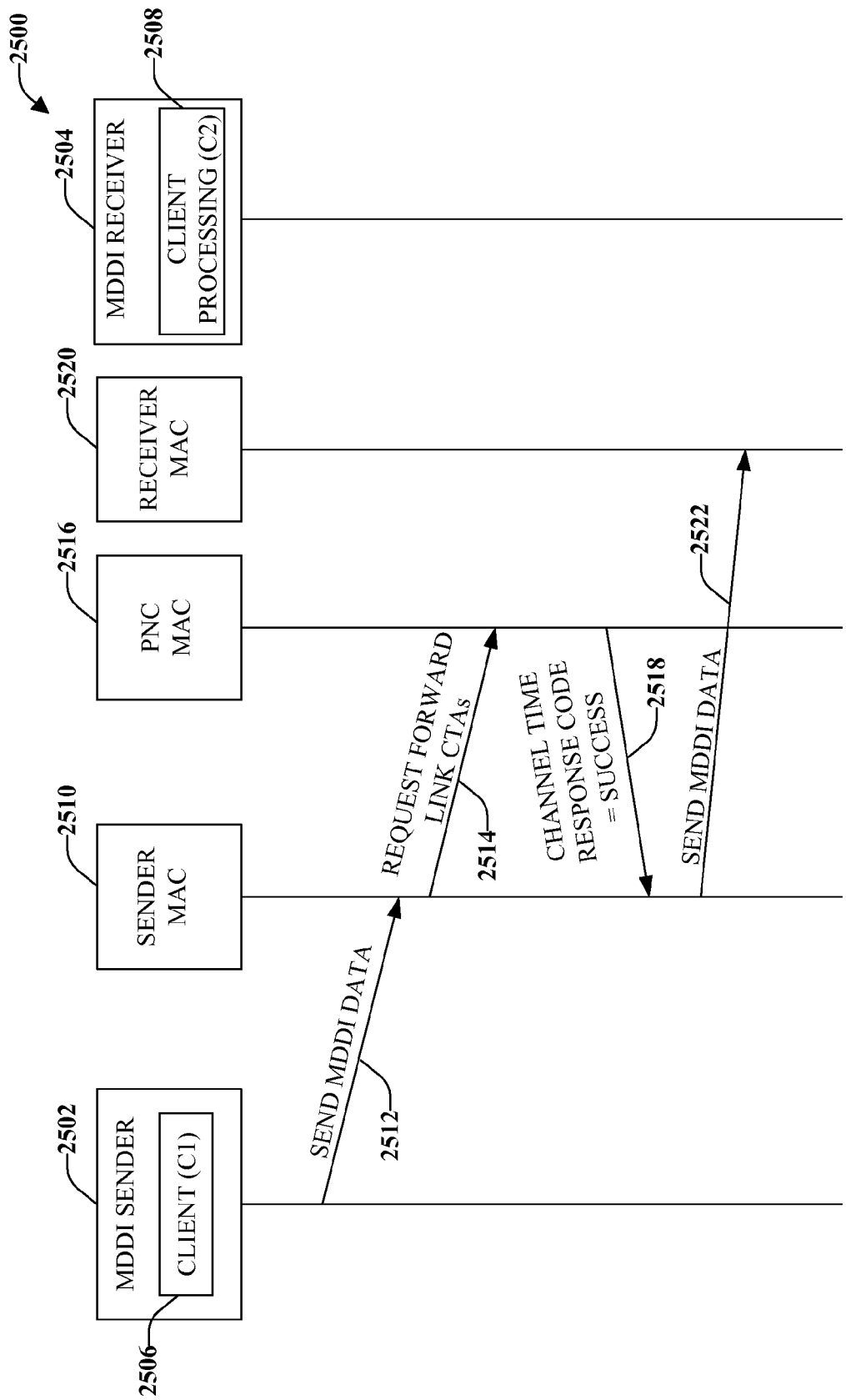
FIG. 25 illustrates an exemplary forward link MDDI data transfer in low-overhead mode in accordance with the various aspects presented herein.

FIG. 25 illustrates an exemplary forward link MDDI data transfer 2500 in low-overhead mode in accordance with the various aspects presented herein. One type of mode for an MDDI sender 2502 to send data to an MDDI receiver 2504 can be a low overhead mode. In this mode, a packet sent wirelessly is optimized for channel allocation time, which is the time it takes for data to be sent from either direction (e.g., forward or reverse). MDDI sender 2502 can include a portion of a client (C1) 2506 and MDDI receiver 2504 can include a portion of the client processing (C2) 2508.

An MDDI client (C1) 2506 can place the data to be sent in a buffer, such as on a UWB modem. The data to be sent should exclude unnecessary packets, such as fill packets and round trip delay packets, for example. The MDDI data is sent to a sender MAC 2510, as illustrated at 2512. Sender MAC 2510 (or UWB MAC) may periodically or continuously request at least one CTA from MDDI sender 2502 to MDDI receiver 2504 based on, for example, the size of the buffer.

Sender MAC 2510 can request, at 2514, forward link CTAs (e.g., periodically or continuously) from a piconet controller (PNC) MAC 2516. PNC MAC 2516 can respond to sender MAC 2510 with a channel time response code at 2518. This response code can indicate whether the data has been communicated successfully. After a successful channel time response code is received, sender MAC 2510 can send the MDDI data to a receiver MAC 2520, as indicated at 2522.

Figure 26:
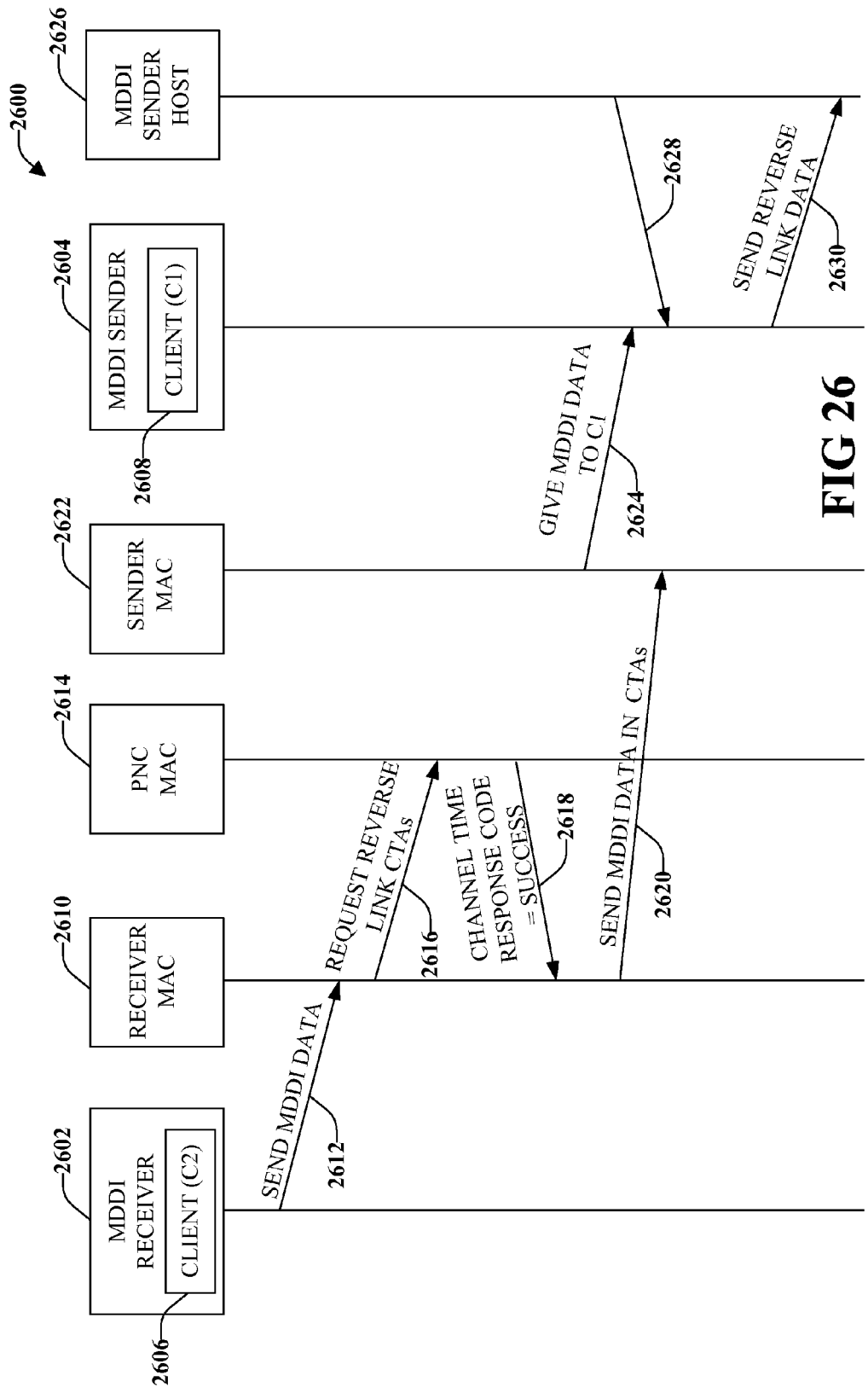
FIG. 26 illustrates an exemplary reverse link MDDI data transfer in low-overhead mode in accordance with the various aspects presented herein.

FIG. 26 illustrates an exemplary reverse link MDDI data transfer 2600 in low-overhead mode in accordance with the various aspects presented herein. An MDDI receiver 2602 can initiate, over a reverse link, communication intended for an MDDI sender 2604. MDDI receiver 2602 can include a portion of client (C2) 2606 and MDDI sender 2604 can include a portion of client (C1) 2608.

MDDI receiver 2602 can send MDDI data to a receiver MAC 2610, as indicated at 2612. Receiver MAC 2610 can request from a PNC MAC 2614 reverse link CTAs, at 2616. The request can correspond to the data that should be sent in the reverse direction. PNC MAC 2614 can respond, at 2618, with a channel time response code. Receiver MAC 2610 can, at 2620, send MDDI data in CTAs to sender MAC 2622. As indicated at 2624, sender MAC 2622 may have sent or given MDDI data to client (C1) 2608, at 2624, at some time before or at substantially the same time as receiving the MDDI data from receiver MAC 2610. A MDDI sender host 2626 can send and/or receive at least one reverse link encapsulation every frame, as indicated at 2628 and 2630. The reverse link data can be sent proactively, without waiting for a data request. The client can specify the number of bytes it needs to send on the reverse link in the current frame. The host 2626 can correspondingly allocate the request in the reverse link encapsulation packet.

Figure 27:
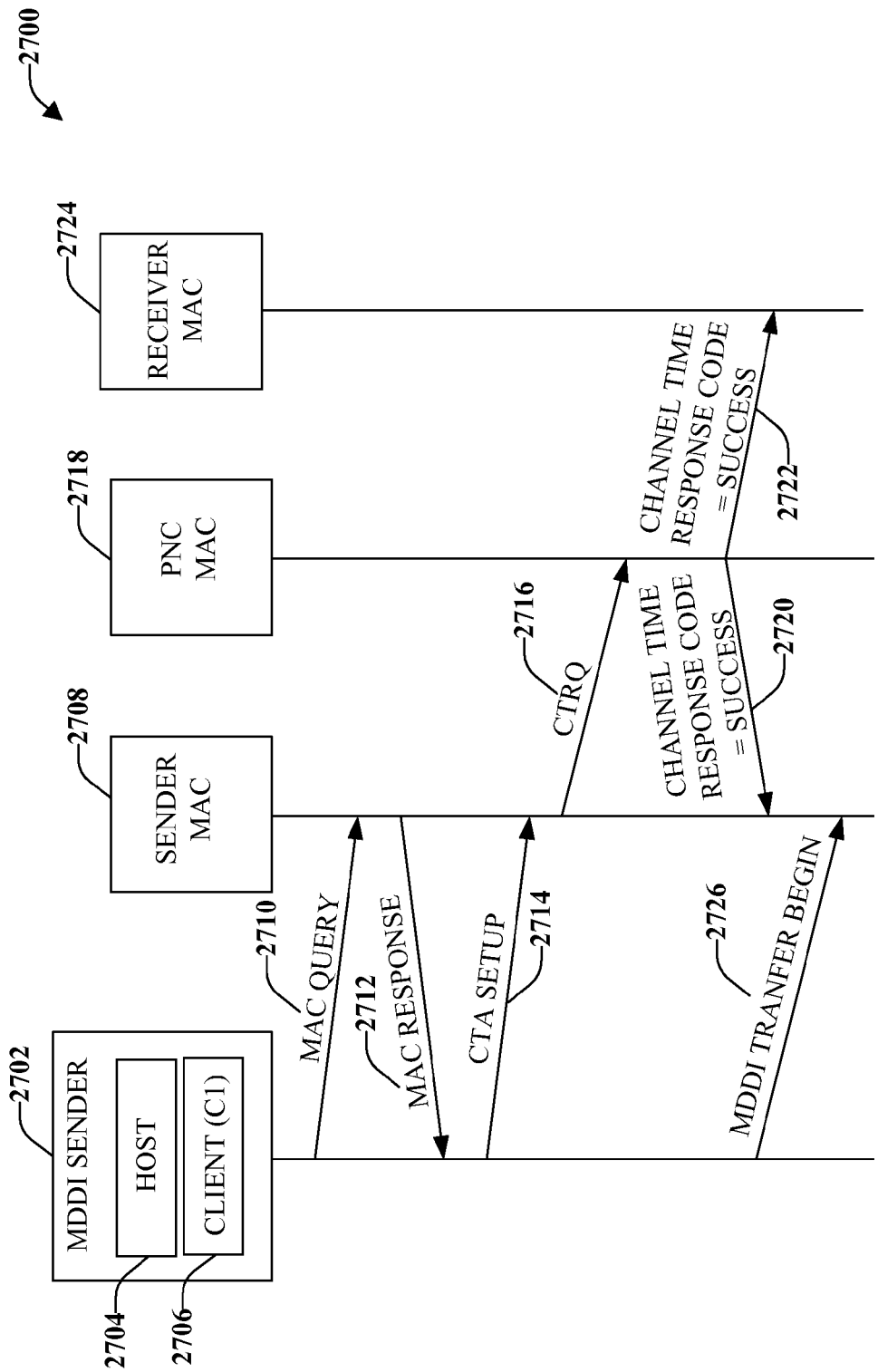
FIG. 27 illustrates a low-latency mode MDDI connection setup in accordance with the various aspects presented herein.

FIG. 27 illustrates a low-latency mode MDDI connection setup 2700 in accordance with the various aspects presented herein. In low-latency mode, channel allocation time can be ascertained based on an inference derived from data contained in packets in both the forward direction and the reverse direction. A MDDI sender 2702 can include a host 2704 and a portion of a client (C1) 2706. During an initialization phase, a UWB modem on the sender 2702 can send a MAC query, at 2710, to a sender MAC 2708. A MAC query is a query sent to find out the rate supported by the MAC and retransmission statistics. Sender MAC 2708 can respond to the query at 2712. This response can be a MAC response that indicates the rate supported by the MAC retransmission statistics.

A MAC Query Packet is sent by the host to query MAC information on the sender/receiver side. A Packet Length field is two bytes that contain a 16 bit unsigned integer that specifies the total number of bytes in the packet not including the packet length field. A Packet Type field is two 2 bytes that contain a 16 bit unsigned integer. A packet type of 151 identifies the packet as a MAC query packet. A ClientID is bytes that contain a 16 bit unsigned integer reserved for ID of the destination client (C2). The MAC Query Parameters field is two bytes and a CRC field is two bytes that contain a 16 bit CRC of all bytes in the packet including the Packet Length.

Sender 2702 requests a CTA setup 2714 for m msec in the forward direction and a CTA for n msec in the reverse direction. The expected ratio of traffic in the forward and reverse directions should be m: n. At 2716, a channel time request (CTRq) is sent to a PNC Mac 2718. A channel time response code can be sent in the reverse direction, shown at 2720, and in the forward direction, shown at 2722 and sent to a receiver MAC 2724. MDDI sender 2702 can begin an MDDI transfer, as illustrated at 2726.

The duration corresponding to the MDDI forward link transfer rate of $R_{f-mddi}$ is m sec, and when T is the super-frame duration determined by the latency constraints of the application, the following formula applies:

$$m+n<T_{CTAP}<T$$

In the low latency mode, the reverse link data can be sent during the CTAs reserved in the reverse direction. Depending on the time of arrival of reverse link data in relation to the MAC super frame, the transfer can have a maximum latency expressed as:

$$T_{rl}=\text{ceil}[\{k*(N/R_1+\text{RIFS}+H/R_2)+\text{SIFS}+T_{ACK}\}/n]*T$$

where k is the average number of retransmissions experienced by a MAC frame. N is the size of the reverse link packet that should be sent and n is the reverse link CTA duration in each super frame. $R_1$ is the physical layer transmission rate of the MDDI data (MAC payload). $R_2$ is the physical layer transmission rate of the PHY, MAC headers and the preamble. H is the size of the MAC plus the size of PHY header plus the size of preamble. SIFS is the short inter-frame spacing duration. RIFS is the retransmission inter-frame spacing duration. $T_{ACK}$ is the duration of transmission of the ACK. T is the super-frame duration. For explanation purposes, it is assumed that the ACK policy is Imm-ACK. The latency of the forward link packets, $T_{fl}$, can be determined accordingly. Given the application latency constraints in forward and reverse links, the time duration of the MAC frame can be derived accordingly. For example, various algorithms, methods, and/or techniques can be employed to derive the time duration of the MAC frame and/or the latency of the forward link packets.

In view of the exemplary systems shown and described, methodologies, which may be implemented in accordance with one or more aspects are provided. While, for purposes of simplicity of explanation, the methodologies are shown and described as a series of acts (or function blocks), it is to be understood and appreciated that the methodologies are not limited by the order of acts, as some acts may, in accordance with these methodologies, occur in different orders and/or concurrently with other acts from that shown and described herein. Moreover, not all illustrated acts may be required to implement the following methodologies. It is to be appreciated that the various acts may be implemented by software, hardware, a combination thereof or any other suitable means (e.g. device, system, process, component) for carrying out the functionality associated with the acts. It is also to be appreciated that the acts are merely to illustrate certain aspects presented herein in a simplified form and that these aspects may be illustrated by a lesser and/or greater number of acts. Those skilled in the art will understand and appreciate that a methodology could alternatively be represented as a series of interrelated states or events, such as in a state diagram.

Figure 28:
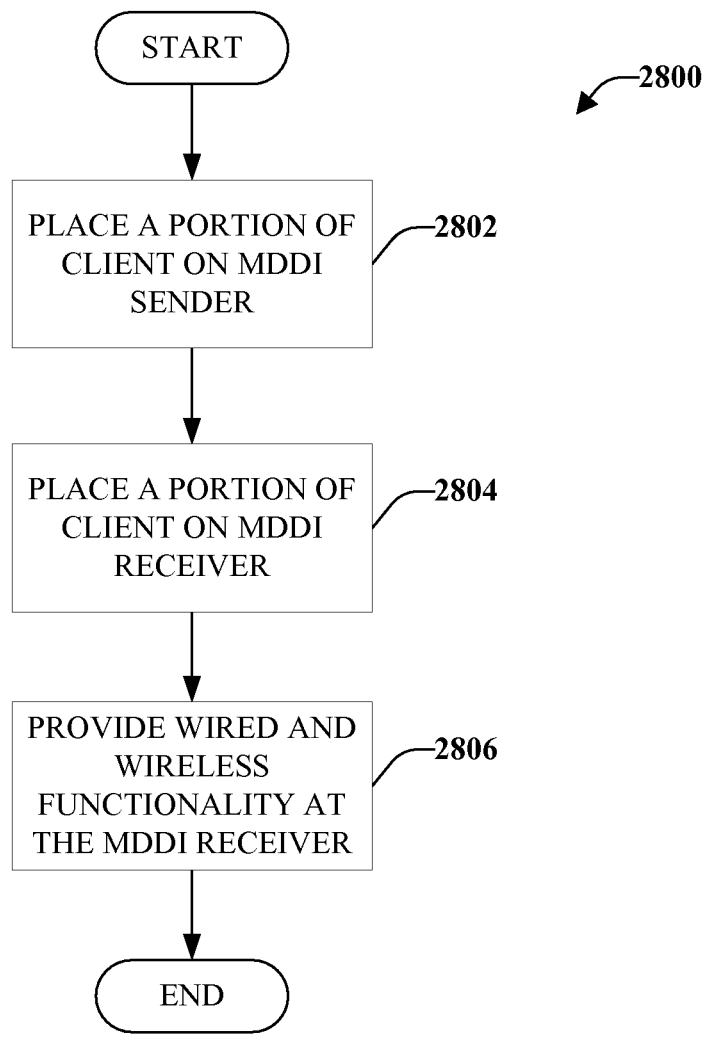
FIG. 28 illustrates a methodology for configuring a traditionally wired device to communicate through a wired protocol and/or a wireless protocol.

With reference now to FIG. 28, illustrated is a methodology 2800 for configuring a traditionally wired device to communicate through a wired protocol and/or a wireless protocol. At 2802, a first portion of a client is placed on an MDDI sender. The MDDI sender can be wireless and can be connected to a data source. The MDDI sender can also include an MDDI host connected or interfaced to the client portion by, for example, a traditional wired MDDI link.

At 2804, a second portion of the client is placed on an MDDI receiver, which can be a wireless MDDI receiver. The MDDI receiver can be connected to a device, which can be, for example, a display. The portion of the client placed on the MDDI sender and the portion of the client placed on the MDDI receiver are distinct portions of the same client. It should be noted that the respective portions of the client can be portions implemented by a processor, software or combination thereof (e.g., firmware).

Both a wired functionality and a wireless functionality are provided, at 2806. This functionality is included on the MDDI receiver, enabling the MDDI receiver to communicate through the wired functionality, the wireless functionality, or both functionalities.

By way of example and not limitation, an MDDI receiver can be a mobile device that may receive a communication, such as a movie that is displayed on a CRT screen or display. The mobile device may also be connected to a wall-mounted display, allowing the movie to be displayed on the wall so that others can view the imagery. If the mobile device is multifunctional, it can broadcast the movie on the display and can at substantially the same time receive or send a voice communication, different from the voice communication associated with the movie. Thus, a user of the mobile device may conduct a communication separate from the movie. An example where this might be utilized is when a user's children are watching a movie and the user wants to answer the phone and walk away. Thus, the movie can be displayed through a wired functionality and at substantially the same time the user can communicate through the wireless functionality.

Figure 29:
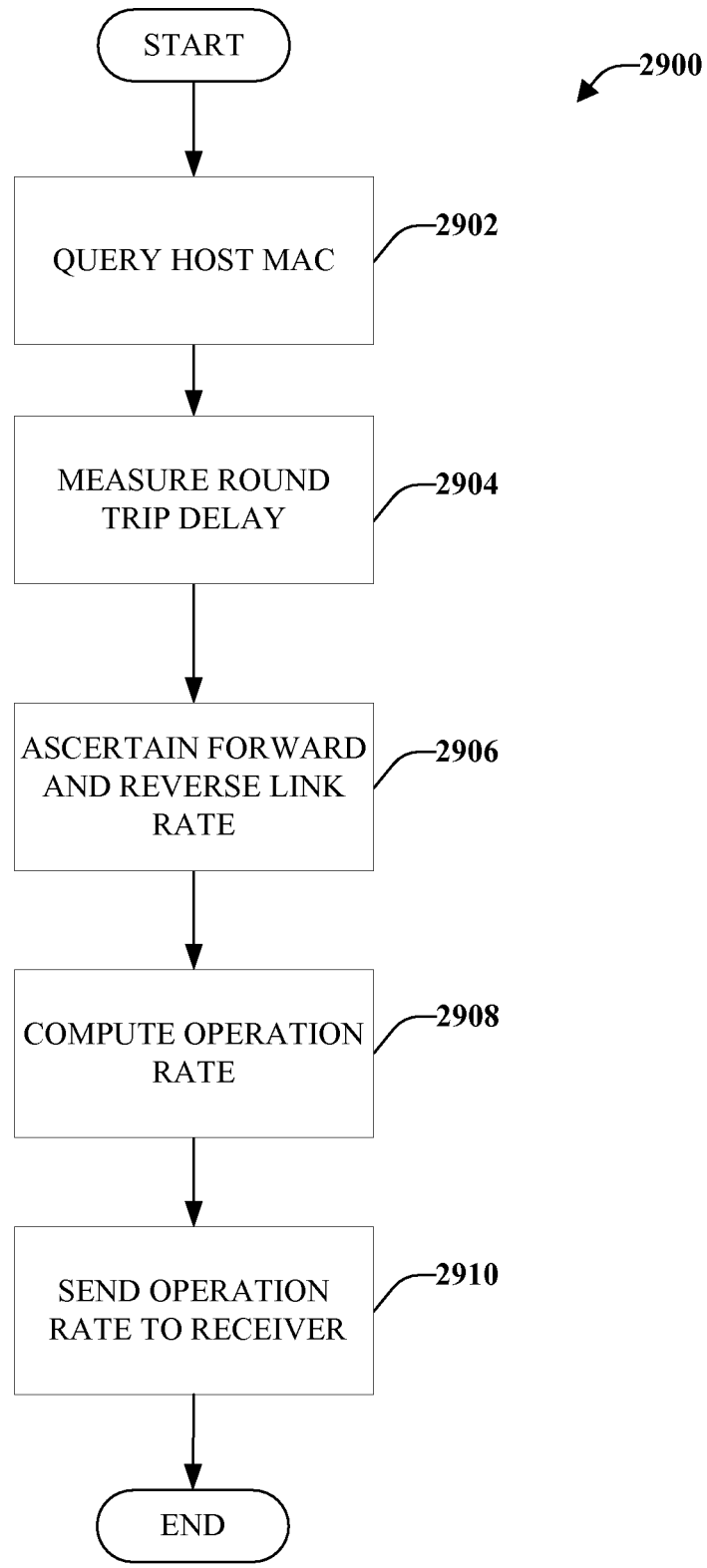
FIG. 29 illustrates a methodology for determining an operation rate according to the one or more disclosed aspects.

FIG. 29 illustrates a methodology 2900 for determining an operation rate according to the one or more disclosed aspects. In a wireless MDDI, for example, the MDDI operation rate depends, in part, on the rate of the wireless link. The method 2900 for determining an operation rate begins, at 2902, where a host MAC is queried for an available application data rate (e.g., the application data rate that the MAC provides). The query can be requested by an MDDI host, for example.

At 2904, a round trip delay is measured. The round trip delay measurement can be utilized, at 2906, to determine or ascertain a forward link rate and a reverse link rate. According to some aspects, the round trip delay measurement can be specified in a wired MDDI protocol that should be used.

An operation rate is computed at 2908. The operation rate can be computed based in part by comparing the forward link rate and the reverse link rate and determining which is the minimum of the two rates. The minimum of these two rates can be designated as the operation rate. In some aspects, the minimum of these two rates (forward link rate and reverse link rate) can further be compared to both the maximum capacity of an MDDI host and the maximum capacity of an MDDI client (C1). The minimum or lowest rate based on this comparison is assigned as the operation rate.

There should be a minimum allowable rate $R_{min}$, which can be established or predetermined based on communication parameters. If the computed operation rate is lower than the minimum allowable rate, adjustments can be made to increase the rate. At 2910, the operation rate is communicated or sent to a receiver (e.g., MDDI receiver) to notify the receiver the rate at which the communication will proceed.

In the above methodology 2900, for example, a transmitter can query the host MAC through a query module. The transmitter can further measure the round trip delay, ascertain forward and reverse link rate, and compute the operation rate utilizing a measurement module. The transmitter can also send the operation rate to the receiver utilizing a communication component. It should be understood that the above are for example purposes only and other components can be utilized in connection with the one or more aspects presented herein.

Figure 30:
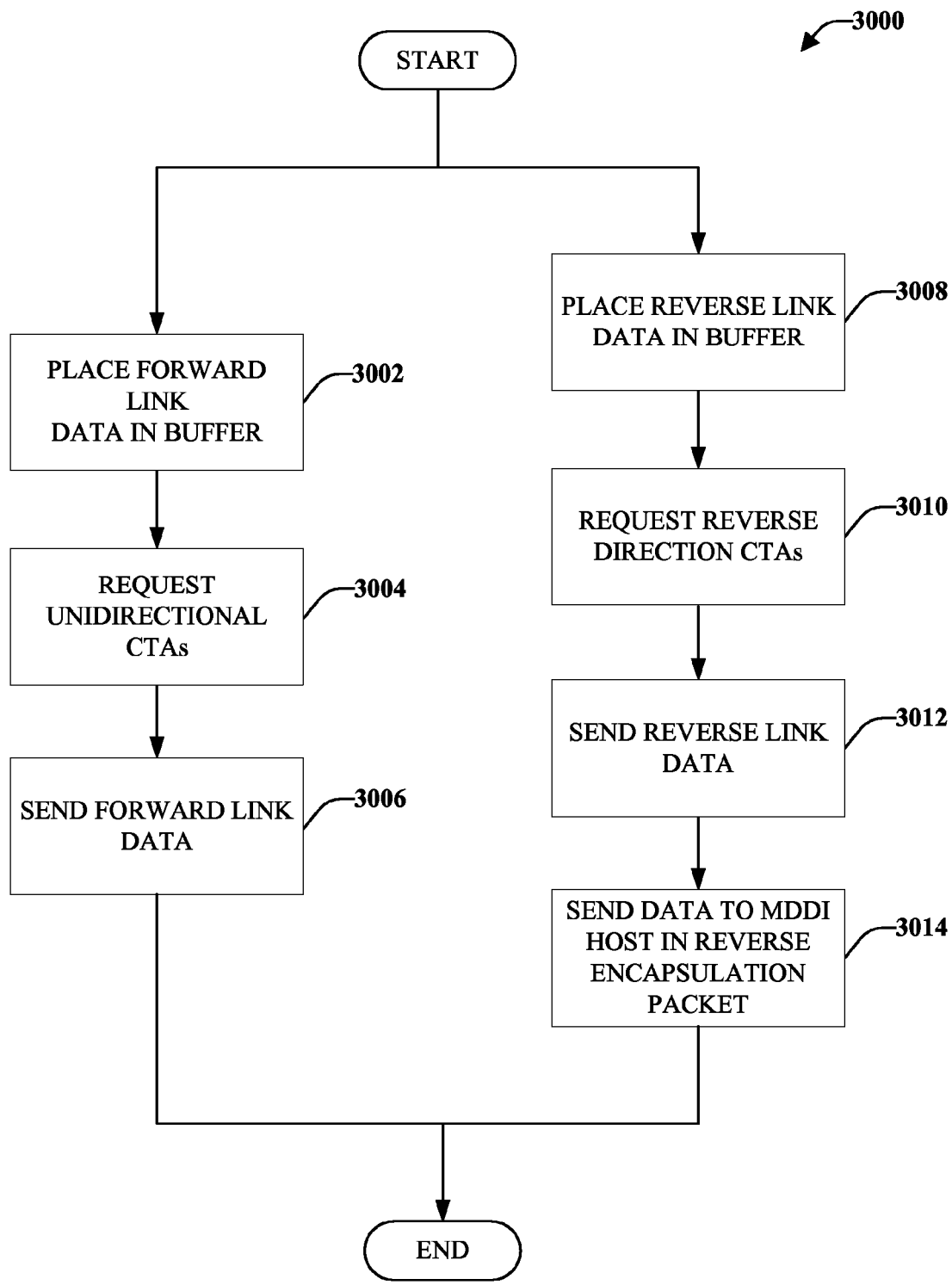
FIG. 30 illustrates a methodology for communicating in low overhead mode according to the various aspects presented herein.

Referring now to FIG. 30, illustrated is a methodology 3000 for communicating in low overhead mode according to the various aspects presented herein. The forward link is shown on the left side of the figure and the reverse link is shown on the right side of the figure.

At 3002, forward link data is placed in a buffer. Excluded from the data placed in the buffer can be unnecessary data such as fill packets and/or round trip delay packets. This data can be placed in the buffer by an MDDI client (C1) on an MDDI sender, for example. At 3004, unidirectional CTAs are requested (e.g., periodically or continuously). An UWB MAC can request this information from the MDDI sender to a receiver based on, for example, the size of the buffer. The forward link data can be sent, at 3006.

In the reverse direction, a host sends at least one reverse link encapsulation packet every frame. A client (e.g., receiver) can specify the number of bytes that should be sent on the reverse link in the current frame. The host (e.g., sender) can allocate the request in a reverse link encapsulation packet. At 3008, reverse link data that should be sent is placed in a buffer by, for example, an MDDI client (C2). The buffer can be located on a UWB modem of an MDDI receiver. A request for reverse direction CTAs is sent, at 3010, by, for example, an UWB modem on the MDDI receiver side. The request can be for those CTAs in the reverse direction corresponding to the data that should be sent in the reverse direction.

An MDDI client on the receiver (C2) can send reverse link data to the client on the sender (C1) proactively, at 3012. As illustrated, at 3014, an MDDI client on the sender (C1) sends the data it has to the MDDI host in the reverse encapsulation packet.

Figure 31:
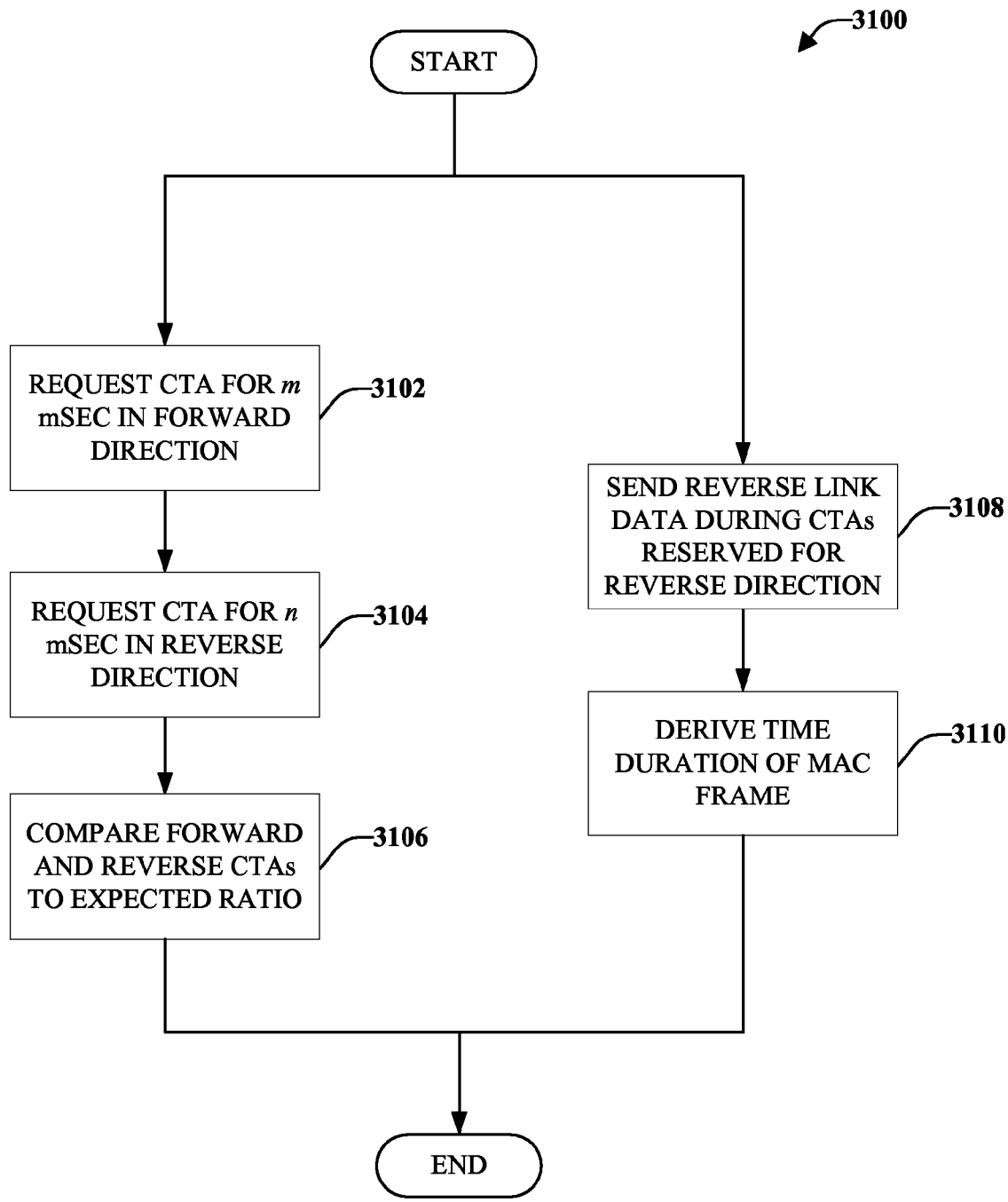
FIG. 31 illustrates a methodology for communicating in low latency mode according to the various aspects presented herein.

FIG. 31 illustrates a methodology 3100 for communicating in low latency mode according to the various aspects presented herein. The forward link is shown on the left side of the figure and the reverse link is shown on the right side of the figure. During an initialization phase in low latency mode, a UWB modem on the sender, for example, requests, at 3102, a CTA form m msec in the forward direction. At 3104, a CTA request for n msec is sent in the reverse direction. A comparison of the forward and reverse CTAs received in response to the requests is made, at 3106. The expected ratio of traffic in the forward and reverse directions is m:n. It should be noted that m msec is the duration corresponding to the MDDI forward link transfer rate of $R_{f\text{-}mddi}$ and:

$$(m+n) < T_{CTAP} < T$$

where T is the super-frame duration, which can be determined by the latency constraints of the application.

In the reverse direction during a low latency mode, the reverse link data is sent, at 3108, during the CTAs reserved in the reverse direction. At 3110, a time duration of the MAC frame can be derived from the application latency constraints in the forward and reverse links. In the following equation, k is the average number of retransmissions experienced by a MAC frame. N is the size of the reverse link packet that should be sent and n is the reverse link CTA duration in each super frame. $R_1$ is the physical layer transmission rate of the MDDI data (MAC payload). $R_2$ is the physical layer transmission rate of the PHY, MAC headers and the preamble. H is the size of the MAC and the size of PHY header and the size of the preamble. SIFS is the short inter-frame spacing duration. RIFS is the retransmission inter-frame spacing duration. $T_{ACK}$ is the duration of transmission of the ACK and T is the super-frame duration. For explanation purposes, it is assumed that the ACK policy is Imm-ACK. The latency of the forward link packets, $T_{fl}$, can be determined accordingly utilizing various algorithms, methods, and/or techniques. Depending on the time of arrival of reverse link data in relation to the MAC super frame, the transfer can have a maximum latency expressed as:

$$T_{rl} = \text{ceil}[\{k*(N/R_1 + \text{RIFS} + H/R_2) + \text{SIFS} + T_{ACK}\}/n]*T$$

Figure 32:
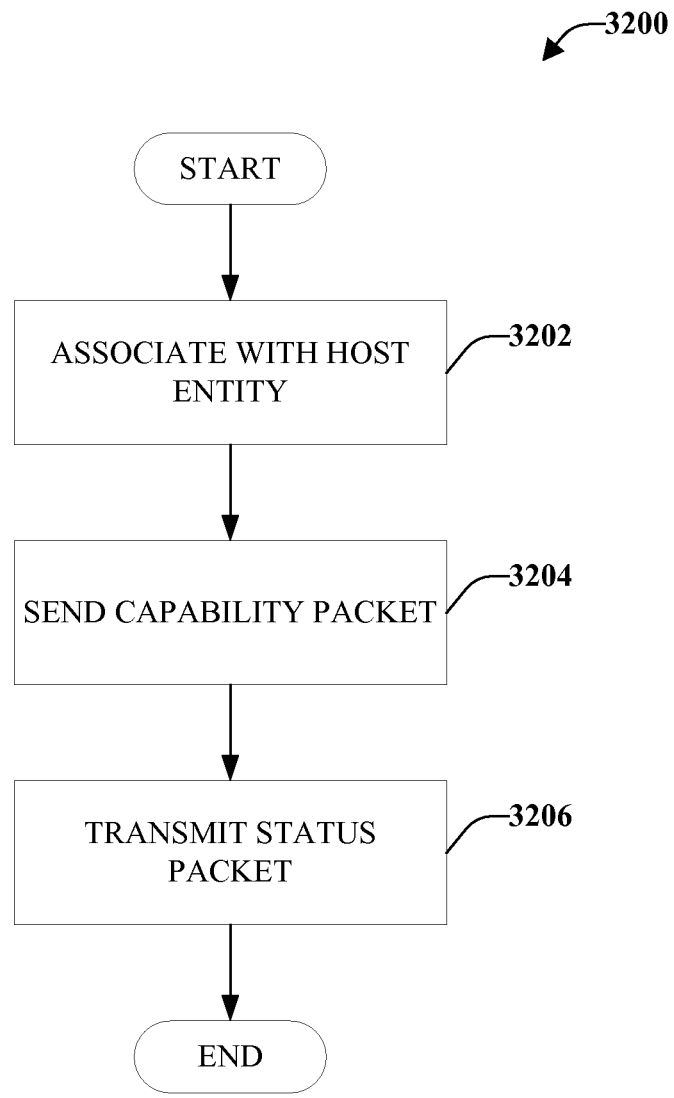
FIG. 32 illustrates a method for wirelessly communicating digital data at a high rate, which can be initiated by a receiver.

With reference now to the drawings, FIG. 32 illustrates a method 3200 for wirelessly communicating digital data at a high rate, which can be initiated by a receiver. The method 3200 can facilitate wireless communication between a host entity (e.g., sender) and one or more remote user interface client devices (e.g., receivers). The wireless communication can include user interface data or other data.

When one or more remote user interface client devices (e.g., wireless receiver) wishes to associate with a wireless sender (e.g., host entity) method 3200 starts, at 3202, by associating with the host entity. Such association can include sending a packet requesting the association. The host entity can communicate wirelessly with more than one remote user interface client device at substantially the same time. Once association is established with the host entity, a capability packet is sent to the host entity, at 3204. The capability packet can include one or more capabilities of the remote user interface client device. At 3206, a status packet is sent to the host entity. The status packet can include link quality information.

In accordance with some aspects, a request is received from the host entity for an updated status packet. At substantially the same time as the response is received, the status packet can be updated and sent to the host entity in reply to the request. In other aspects, the updated status packet can be automatically sent either periodically or when a status change is detected.

The association between one or more remote user interface client devices and the host entity may be broken due to a communication failure, the devices moving out of range, or based on other factors. It may be determined that an association is broken if a host entity status packet is not received within a predetermined period. For example, at substantially the same time as a host entity status packet is requested, a timer can be started. The timer can be set up to track an interval from the time the request is sent. The interval can be predetermined and should be long enough to allow the request to be received at the host entity and for the host entity to respond. If the timer expires (e.g., the response is not received within the predetermined interval), the one or more remote user interface client devices can be disassociated from the host entity.

Disassociation from the host entity can also occur if a communication between the devices should be stopped. If so, the one or more remote user interface client devices can disassociate from the host entity and enter a disassociation state. Disassociation can include sending a dissociation request to the host entity and receiving a dissociation response from the host entity. In accordance with some aspects, the dissociation response might not be received from the host entity, such as when there is a communication failure or if a link or association between the devices has been broken.

Figure 33:
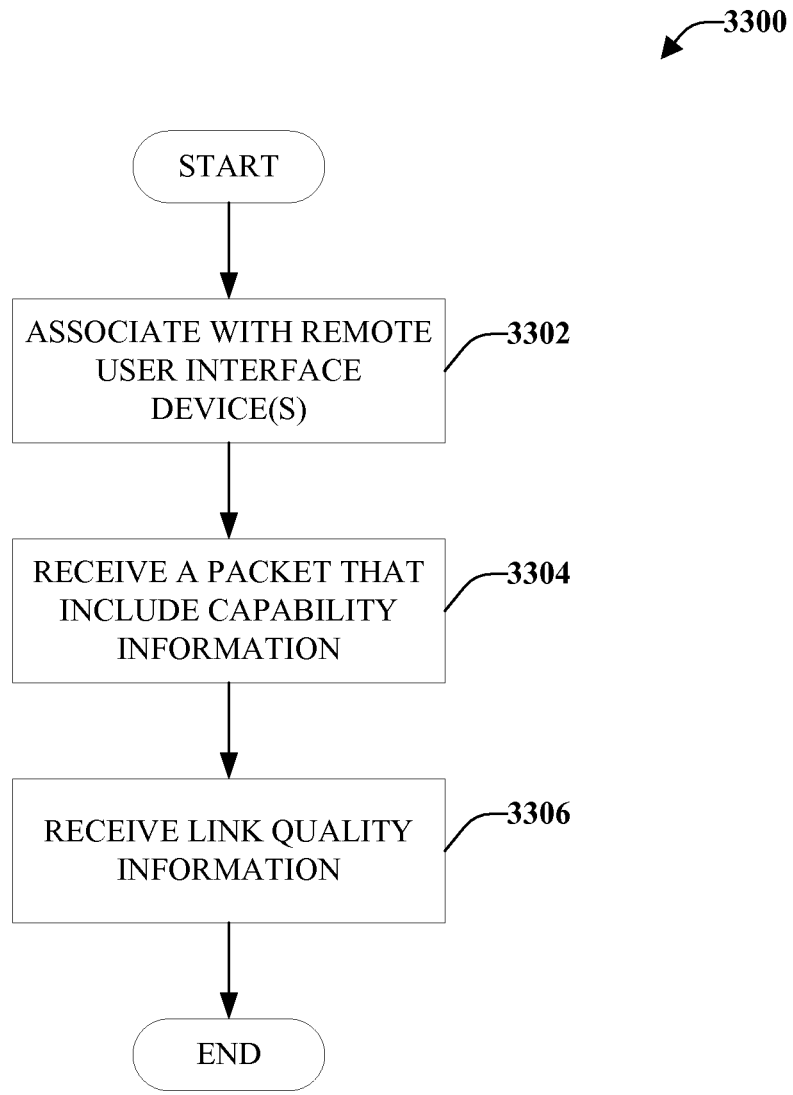
FIG. 33 illustrates a method for high rate wireless digital data communication between a sender and one or more remote receivers for user interface data.

Referring now to FIG. 33, illustrated is a method 3300 for high rate wireless digital data communication between a sender at one or more remote receivers for user interface data. The sender initiates the association when it desires to associate with a particular wireless receiver. For example, if the wireless sender is a phone and the wireless receiver is a projector, the phone (e.g., wireless sender) would typically start the association process. Sender initiated association is similar to receiver initiated association.

Method 3300 can start, at 3302, when a sender is associated with one or more remote user interface devices through a sender initiated association. Such association can include sending a request to the receiver that an association be established between the devices. The receiver can respond to the request, indicating that the association is possible (e.g., that the receiver is not associated with another sender). At substantially the same time as the devices are associated, a packet that includes capability information is received, at 3304, from the remote user interface device and, at 3306, link quality information is received, such as on a reverse link. The information can be sent in response to a C2 Request Packet that can be sent by the wireless sender to the receiver requesting the receiver to send the client capability packet. The C2 Request Packet can include Packet Length, Packet Type, C2 Client ID and C2 flags and CRC fields. The Packet Length field is two bytes that contain a 16 bit unsigned integer that specifies the total number of bytes in the packet, not including the packet length field. The Packet Type is two bytes that contain a 16 bit unsigned integer. A packet type of 149 identifies the packet as a C2 request packet. The C2 Client ID field is two bytes that contain a 16 bit unsigned integer reserved for ID of C2. The C2 flags field is one byte that contains an 8 bit unsigned integer that contains a set of flags to request information from C2. For example, if a bit is set to 1, then C1 requests the specified information from the client. If the bit is set to 0, then C1 does not need the information from C2. Bit 0 indicates C1 needs the client capability packet from C2. Bit 1 indicates C1 needs "Client Request and Status Packet" from C2. The CRC field is two bytes that contain a 16 bit CRC of all bytes in the packet including the Packet Length.

In some situations, the sender may initiate an association but the receiver may already be associated with a difference receiver or may not desire to associate with this sender. In this situation, an Association Denial Packet can be sent by Client (C2) as a reply to an association request when it does not want to associate with the w-MDDI Sender (after power up). The Association Denial Packet contains various fields including Packet Length, Packet Type 160, Sender MAC Address, Receiver MAC Address, a Reason Code, and CRC. The Packet Length can be two bytes that contain a 16 bit unsigned integer that specifies the total number of bytes in the packet not including the packet length field. The Packet Type can be two bytes that contain a 16 bit unsigned integer. A packet type of 160 identifies the packet as an association denial packet. The Sender Mac Address can be a six byte MAC Address of the W-MDDI Sender and the Receiver MAC Address can be a six byte MAC Address of the W-MDDI Receiver. The Reason Code is one byte noting the reason for the denial (0×1, 0×2, 0×3, or 0×4). 0×1 indicate already associated to another sender/s; cannot get associated anymore. 0×2 indicates association in progress with another sender. 0×3 indicates local error and 0×4 is miscellaneous. The CRC is two bytes that contain a 16 bit CRC of all bytes in the packet including the Packet Length.

Another packet that can is sent is a MAC CTA Setup Packet that is used by the host to setup CTAs in the forward and reverse directions. This can be used in the low-latency mode of operation of w-MDDI with IEEE 802.15.3 MAC. If the MAC protocol allows the sender MAC to set up CTAs in the reverse direction, then this packet will be dropped at the sender. Else, it will be forwarded to the receiver. The MAC CTA Setup Packet contents include a Packet Length field that is two bytes that contain a 16 bit unsigned integer that specifies the total number of bytes in the packet, not including the packet length field. A Packet Type field is two bytes that contain a 16 bit unsigned integer. A packet type of 152 identifies the packet as a CTA setup packet. C1ClientID field is two bytes that contain a 16 bit unsigned integer reserved for ID of the host—0. A C2ClientID field is two bytes that contain a 16 bit unsigned integer reserved for ID of C2. Forward CTA parameters are CTA parameters for data transfer in the forward direction and Reverse CTA parameters are CTA parameters for data transfer in the reverse direction.

Figure 34:
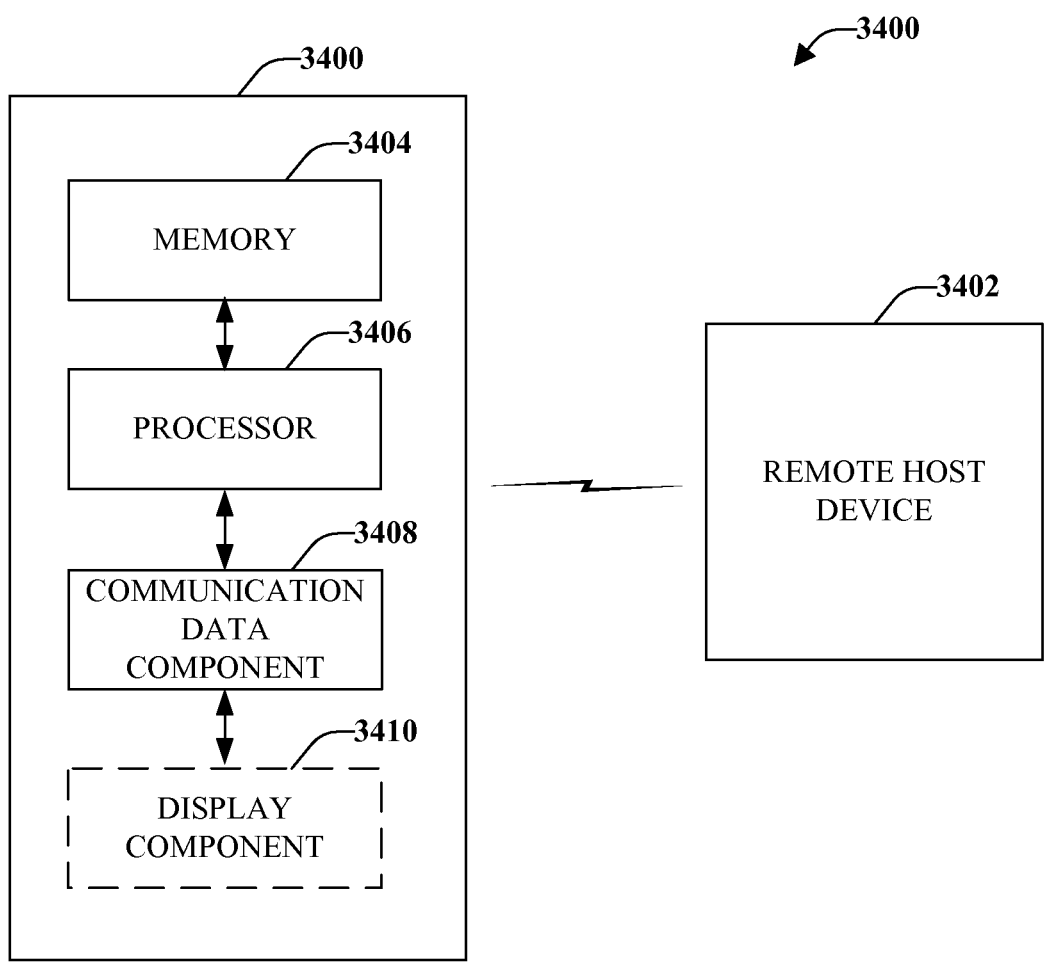
FIG. 34 illustrates an apparatus that initiates device association in accordance with the various aspects.

FIG. 34 illustrates an apparatus 3400 that initiates device association in accordance with the various aspects. Apparatus 3400 can be a receiver configured to communicate high rate digital data and which desires to associate with a wireless sender or remote host device 3402. Apparatus 3400 can include a memory 3404 that can be configured to store information. Such stored information can include a MAC address associated with the apparatus 3400 and/or a Client ID (as received in an Association Response Packet). For example, at substantially the same time as being associated with a particular wireless sender, the wireless receiver can store the MAC address of the sender or remote host device 3402 with which the apparatus 3400 is associated.

Also included in apparatus 3400 can be a processor 3406 that can be configured to analyze information stored in memory 3404. Processor 3406 can further selectively associate the apparatus 3400 with the remote host device 3402. In accordance with some aspects, processor 3406 can associate apparatus 3402 with remote host device 3402 at substantially the same time as receipt of an associated request packet from remote host device 3402. However, if a response packet is not received from the remote host device 3402 after a predetermined interval and a maximum number of sent association requests have been exceed, the processor 3406 does not associated the apparatus 3400 with the remote host device 3402.

Apparatus 3400 can further include a communication data component 3408 that can be configured to update a MAC Response Packet with apparatus MAC statistics for transmission to the remote host device 3402. After entering an associated state, the wireless receiver can periodically, such as each mac_response_time msec, send a MAC Response Packet. The host device 3402 can respond with a packet that acknowledges reception of the MAC Response Packet sent by apparatus 3400. If apparatus 3400 does not receive a response after a predetermined interval of time (e.g., mac_response-_fail_time msec duration), apparatus 3400 might infer that it has been dissociated from the host device 3402 and stops sending the MAC Response Packet. The apparatus 3400 and host device 3402 may become dissociated, as described above. In accordance with some aspects, apparatus 3400 can send a MAC Response Packet when specifically requested to do so by the host device 3402.

The apparatus 3400 and the remote host device 3402 may become disassociated, either intentionally or unintentionally. For example, a communication link may be lost between the apparatus 3400 and the remote user device 3402 due to a communication failure, the devices moving out of range of each other or for other reasons. For example, if a dissociation request packet is received from the remote host device 3402, the processor dissociates the apparatus 3400 from the host device 3402 at substantially the same time as receipt of the request. In another example, if a status packet is not received from the remote host device 3402 in response to the transmitted updated MAC response packet, the processor 3408 will selectively dissociate based on inference that the apparatus 3400 and the host device 3402 are no longer to be associated.

In accordance with some aspects, apparatus 3400 can include a display component 3410 that can be configured to compile one or more alternate display information. The alternate display information can be associated with the apparatus 3400. The display component 3410 can further be configured to convey the one or more alternate display information to the remote host device 3402. For example, if there are alternate displays associated with the wireless receiver, an Alternate Display Capability Packet can be sent to the remote host device 3402.

Figure 35:
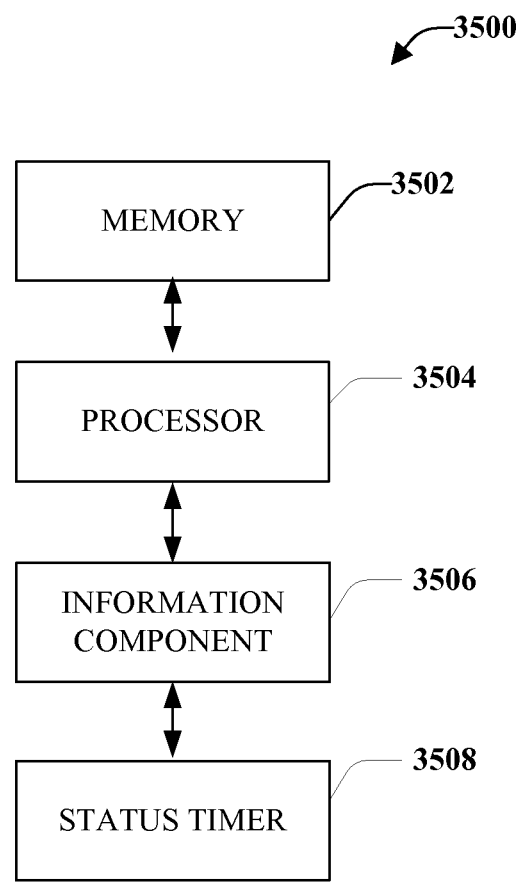
FIG. 35 illustrates an apparatus that can be configured to wirelessly communicate high rate user interface data.

With reference now to FIG. 35, illustrated is an apparatus 3500 that can be configured to wirelessly communicate high rate user interface data. The apparatus 3500 can include a memory 3502 that can be configured to store information related to an identification of a remote user interface device, such as a Client ID assigned to the remote device. A processor 3504 can be configured to selectively associate with one or more remote user interface devices based in part on the information stored in memory 3502. Apparatus 3500 can also include an information component 3506 that can be configured to analyze at least one capability of the one or more remote user interface devices. The capability can be received in a client capability packet. Information component 3506 can further be configured to analyze a link quality information data received in a status update packet.

In accordance with some aspects, apparatus 3500 can include a status timer 3508 that can be configured to determine if a response to the sender association request is received within a predefined interval. If the response is not received within the predefined interval, a subsequent sender association request can be sent by processor 3504.

If dissociation from the remote user interface device is desired, processor 3504 can selectively dissociate the remote device. For example, processor 3504 may selectively dissociate if link quality information data indicates that the quality of a communication link has fallen below a predetermined threshold.

Figure 36:
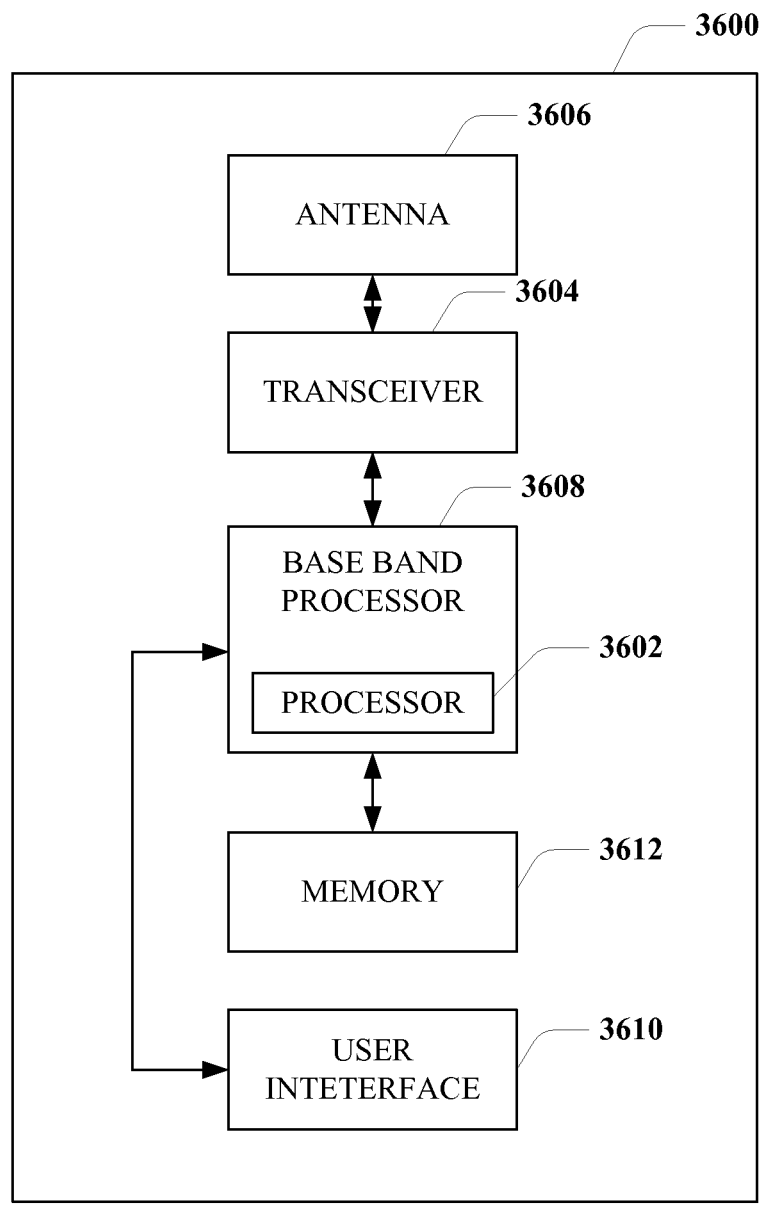
FIG. 36 illustrates a conceptual block diagram of a possible configuration of a terminal.

With reference now to FIG. 36, illustrated is a conceptual block diagram of a possible configuration of a terminal 3600. As those skilled in the art will appreciate, the precise configuration of the terminal 3600 may vary depending on the specific application and the overall design constraints. Processor 3602 can implement the systems and methods disclosed herein.

Terminal 3600 can be implemented with a front-end transceiver 3604 coupled to an antenna 3606. A base band processor 3608 can be coupled to the transceiver 3604. The base band processor 3608 can be implemented with a software based architecture, or other type of architectures. A microprocessor can be utilized as a platform to run software programs that, among other functions, provide control and overall system management function. A digital signal processor (DSP) can be implemented with an embedded communications software layer, which runs application specific algorithms to reduce the processing demands on the microprocessor. The DSP can be utilized to provide various signal processing functions such as pilot signal acquisition, time synchronization, frequency tracking, spread-spectrum processing, modulation and demodulation functions, and forward error correction.

Terminal 3600 can also include various user interfaces 3610 coupled to the base band processor 3608. User interfaces 3610 can include a keypad, mouse, touch screen, display, ringer, vibrator, audio speaker, microphone, camera and/or other input/output devices.

The base band processor 3608 comprises a processor 3602. In a software-based implementation of the base band processor 3608, the processor 3602 may be a software program running on a microprocessor. However, as those skilled in the art will readily appreciate, the processor 3602 is not limited to this aspect, and may be implemented by any means known in the art, including any hardware configuration, software configuration, or combination thereof, which is capable of performing the various functions described herein. The processor 3602 can be coupled to memory 3612 for the storage of data.

Figure 37:
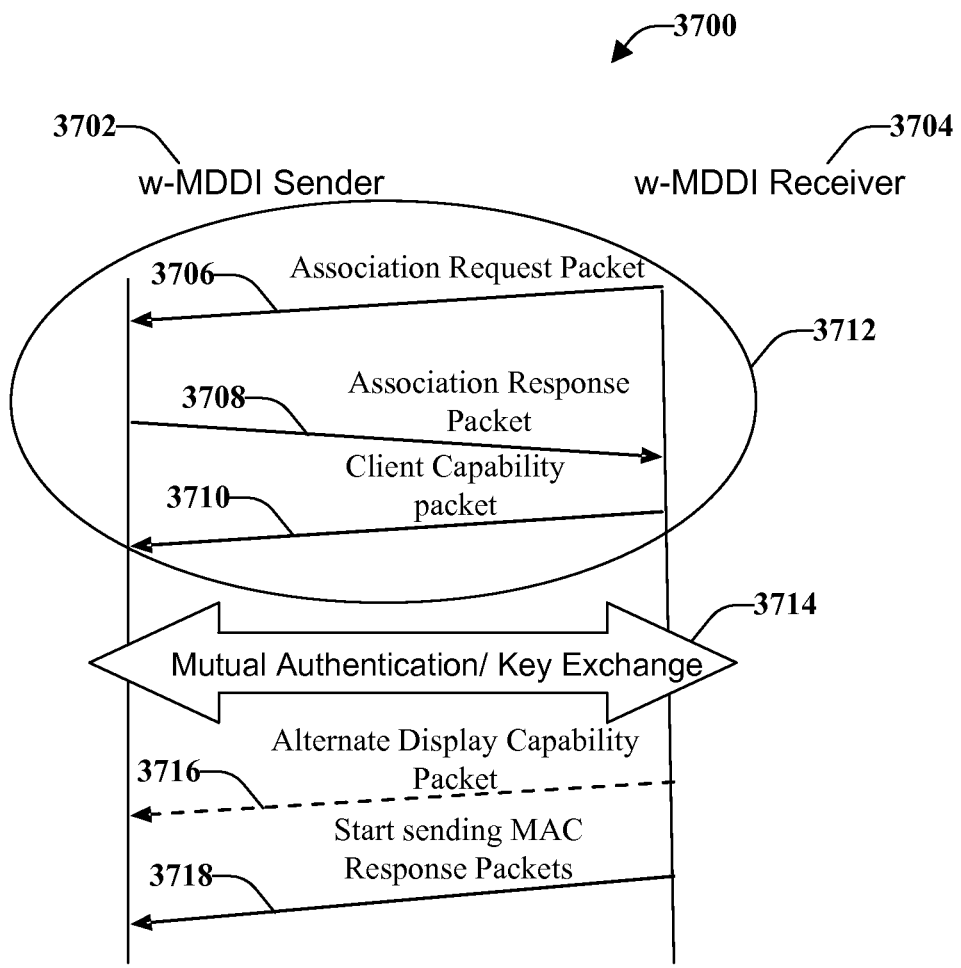
FIG. 37 illustrates a receiver-initiated association procedure when security is enabled in accordance with the disclosed aspects.

FIG. 37 illustrates a receiver-initiated association procedure 3700 when security is enabled in accordance with the disclosed aspects. A w-MDDI receiver 3704 transmits an association request packet 3706 to a w-MDDI sender 3702. At this point the devices are in a un-associated state. The w-MDDI receiver 3704 can enter a waiting for association response state. The w-MDDI sender 3702 can reply with an Association Response Packet 3708. If a reply is not received, a number of association request packets can be sent, up to a maximum number of retries and before expiration of a predefined interval of time. Upon receipt of the association response packet 3708, a Client Capability Packet 3710 is sent from the w-MDDI receiver 3704 to the w-MDDI sender. These three packets represent a three-way handshake 3712.

The devices can enter an associated state. The devices can remain in the associated state until a dissociation request is received/confirmed and/or until there are no responses received for several LinkStatus packets.

In accordance with some aspects, an optional mutual authentication/key exchange 3714 can be performed. An alternate display capability packet 3716 is sent to the w-MDDI sender 3702, if there are alternate displays available. At 3718, MAC response packets can be sent to the w-MDDI sender.

Figure 38:
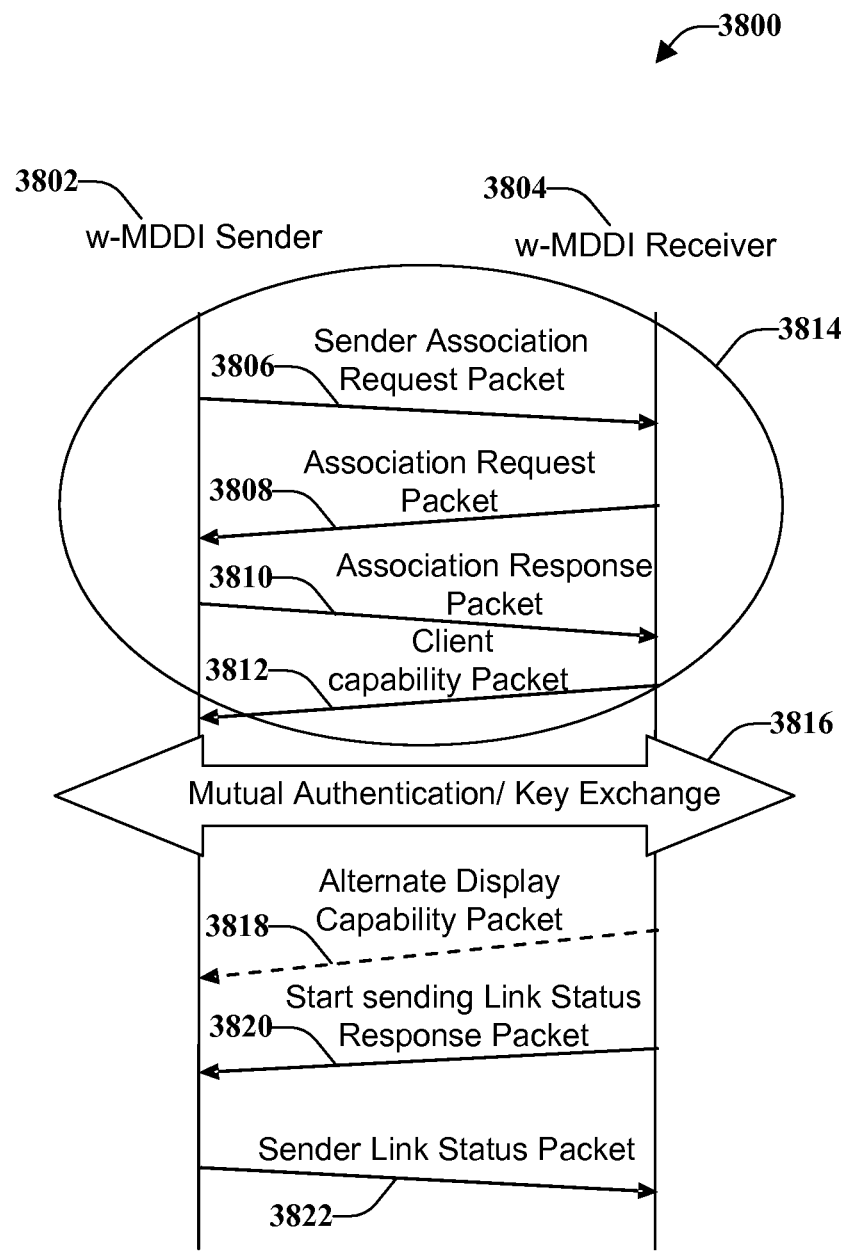
FIG. 38 illustrates a sender-initiated association procedure when security is enabled in accordance with the disclosed aspects.

FIG. 38 illustrates a sender-initiated association procedure 3800 when security is enabled in accordance with the disclosed aspects. A w-MDDI sender 3802 transmits a sender association request 3806 to a w-MDDI receiver. At this point, the devices are in an unassociated state. The device is in a waiting for association request state. The receiver 3804 can respond with an association request 3808. The w-MDDI sender 3802 responds with an association response 3810 and a client capability packet 3812 is sent by the w-MDDI receiver 3804 (e.g., device is in the waiting for client capabilities state). The above four packets are included in a four-way handshake 3814.

In accordance with some aspects, an optional mutual authentication/key exchange 3816 can be performed. W-MDDI receiver 3804 can transmit an alternate display capability packet 3818. Thereafter, link status response packets 3820 can be transmitted. The w-MDDI sender 3802 can provide sender link status packets 3822 to the w-MDDI receiver.

Figure 39:
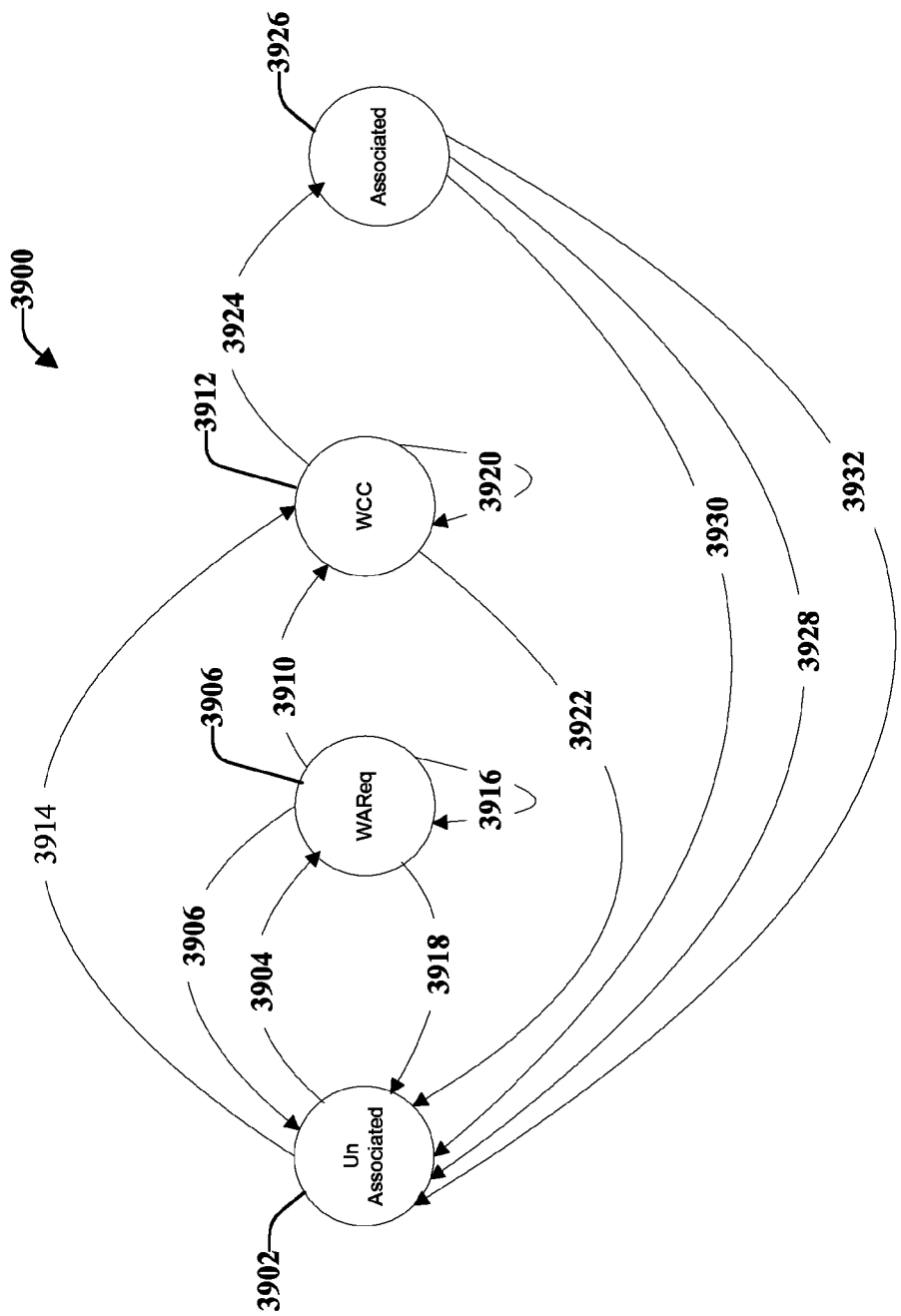
FIG. 39 illustrates a host association state diagram.

FIG. 39 illustrates a host (sender) association state diagram 3900. At 3902, the host is in an un-associated state (e.g., there is no association between the host and a client). To associate with a client, indicated by line 3904, the host sends a request to associate and enters a WaitingForAssociationRequest (WAReq) state 3906. In accordance with some aspects, in response to the association request, an Association Denied might be received, as indicated at 3908. If an Association Denied is received, the host returns to the un-associated state 3902.

At substantially the same time as the association request is sent, at 3904, a timer can be started that indicates a maximum amount of time that will be allowed for the client to reply to the request. While waiting for the response from the client, the host might transmit a number of association requests (e.g., retries) up to a maximum number of attempts. The host remains in the WAReq state 3906 provided the timer has not timed out and a number of retry attempts has not exceed a maximum number of retries (MAX_RETRIES), as indicated at 3910. If the timer times out and/or the maximum number of retry attempts is exceeded, the host enters an un-associated state, at 3912.

In response to the association request, a Association Request can be received, at 3914 and the host moves to a WaitingForClientCapabilities (WCC) state 3916. In accordance with some aspects, the host can transition from the un-associated state 3902 directly to the WCC state 3916 if an AssociationRequest 3918 is received while the host is in the un-associated state 3902 (e.g., skipping the WAReq state 3906).

At substantially the same time as entering the WCC state 3916, the host can start a timer to limit the amount of time waiting for a response from the client. The host might also send a number of requests for a client capabilities response, up to a maximum number of retry attempts(MAX_RETRIES), as indicated at 3920. If the timer times out and/or the MAX_RETRIES has been exceeded, the host, at 3922, returns to the un-associated state 3902.

At substantially the same time as receiving the ClientCapabilities, at 3924, the host enters the associated state 3926. The host can remain in the associated state 3926 until a DissociationRequest is received, at 3928, from the client. At substantially the same time as receiving the DissociationRequest, the host transitions to the unassociated state 3902.

In accordance with some aspects, a timeout on a LinkStatus packet 3930 causes the host to move from an associated state 3926 to an unassociated 3902 state. In this situation, the host has not received a Link Status Packet (MAC Response Packet) for mac_response_fail_time msec duration. Not receiving a LinkStatus Packet for a pre-defined amount of time indicates that the client is no longer associated with the host. According to some aspects, the host can decide to dissociated, indicated at 3932 and the host transitions from the associated state 3926 to the unassociated state 3902.

Figure 40:
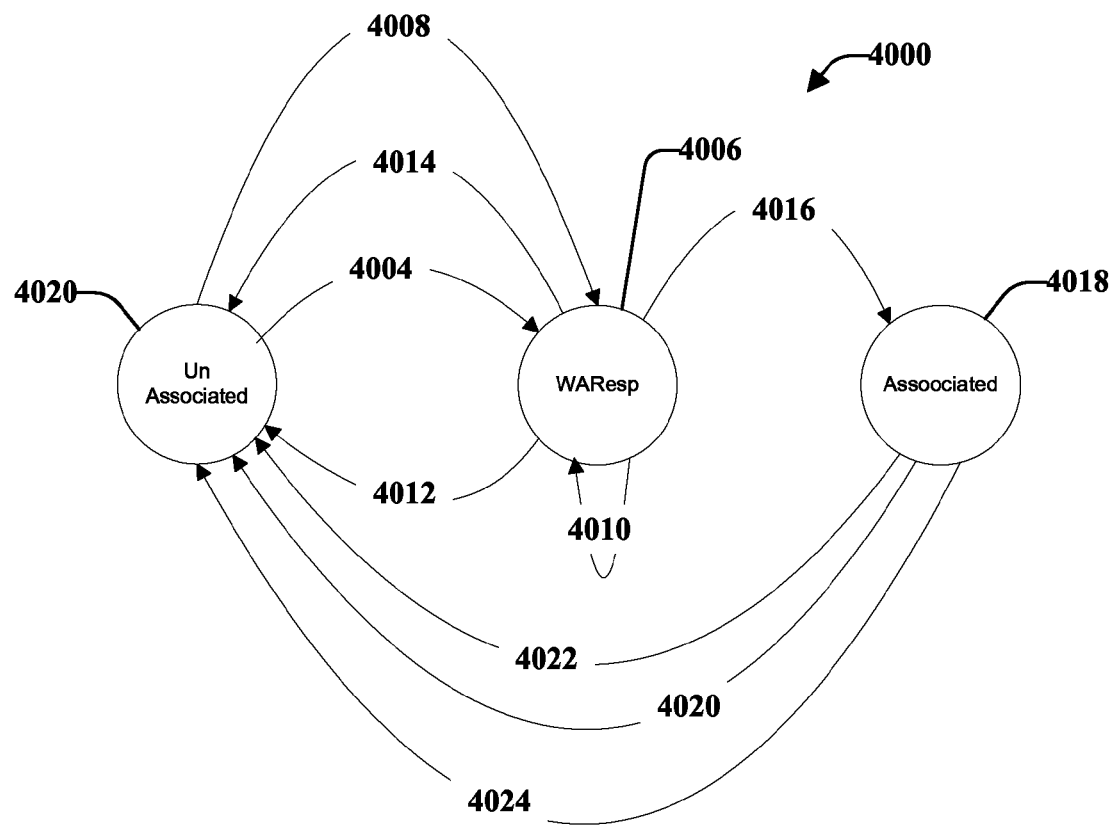
FIG. 40 illustrates a client association state diagram.

FIG. 40 illustrates a client association state diagram. At 4002, the client is in an un-associated state. A client associate request is sent, at 4004, and the client enters a WaitingForAssociationResponse (WAResp) state, at 4006. At substantially the same time as sending the request, at 4004, a timer can be started to allow a limited interval of time during which the host waits for the AssociationResponse. In accordance with some aspects, the client can enters the WAResp state 4006 when a SenderAsssociationRequest is received, at 4008.

While waiting for the AssociationResponse, the host might send multiple association requests 4004, up to a maximum number of requests. The host remains in the WAResp state 4006 provided the timer has not timed out and the number of retries has not exceed a maximum number of retry attempts (MAX_RETRIES), as indicated at 4010. If the timer times out and/or the number of retries excess MAX_RETRIES, the host transitions to the un-associated state, at 4012.

In accordance with some aspects, an association denied might be received, indicated at 4014 in response to the association request. The association might be denied if the host is already associated with another client or for other reasons. Upon receipt of the Association Denied, the client enters the un-associated state 4002.

The client remains in the WAResp state 4006 until an AssociationResponse is received, at 4016. At substantially the same time as receiving the AssociationResponse, the client enters an associated state 4018. The client can remain in the associated state 408 until a dissociation request is received, at 4020, until no response has been received for several LinkStatus packets, at 4022, and/or until the client (e.g., user) desires to dissociate from the host, at 4024. If any of these three events 4020, 4022, 4024, occur, the client returns to the unassociated state 4002.

Figure 41:
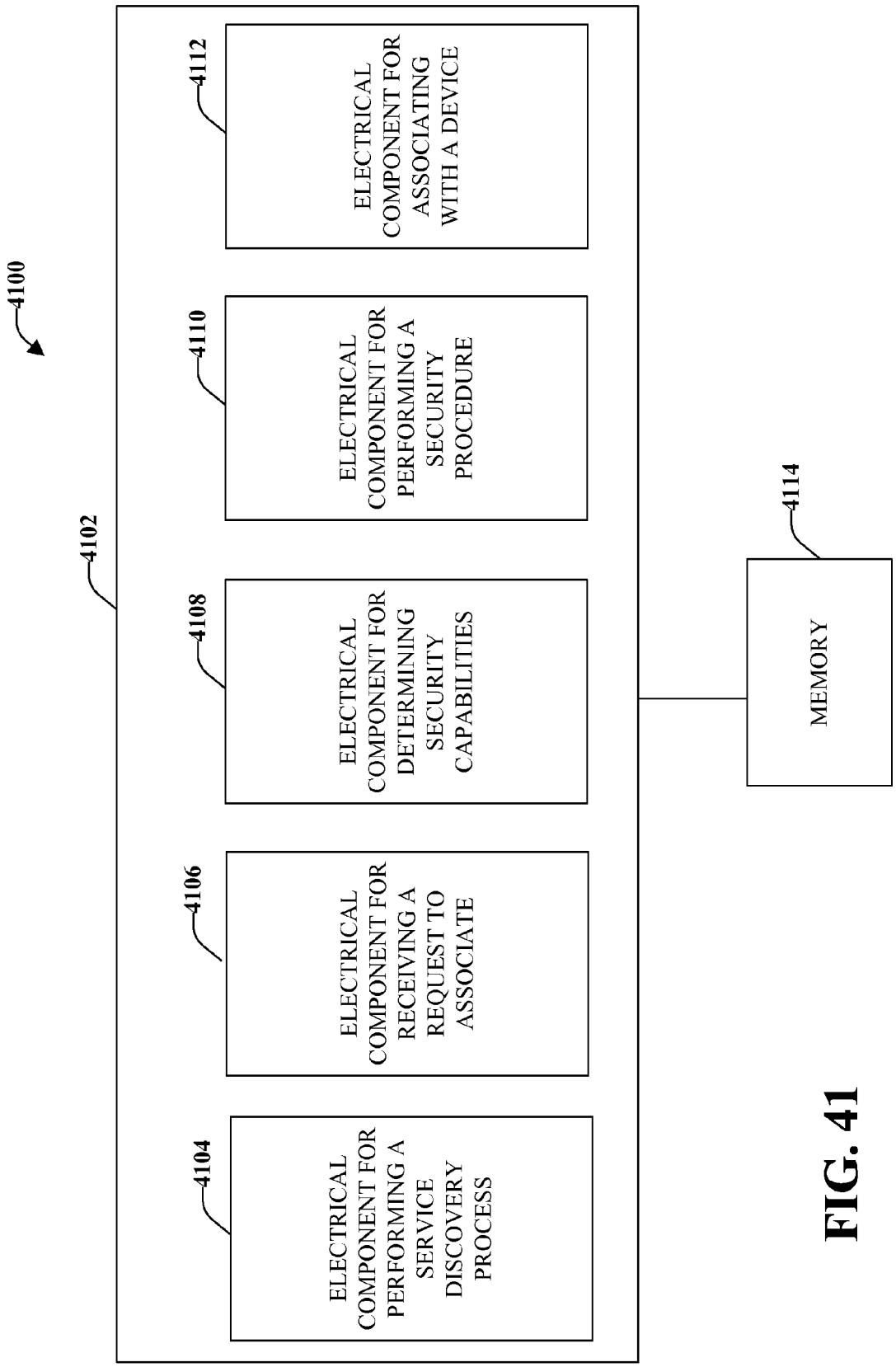
FIG. 41 illustrates a system for wirelessly communicating data at a high rate between a host entity and at least one remote wireless MDDI client capable device.

FIG. 41 illustrates a system 4100 for wirelessly communicating data at a high rate between a host entity and at least one remote wireless MDDI client capable device. It is to be appreciated that system 4100 is represented as including functional blocks, which may be functional blocks that represent functions implemented by a processor, software, or combination thereof (e.g., firmware).

Included in system 4100 is a logical grouping 4102 that includes an electrical component 4104 for performing a service discovery process to gather information related to a plurality of wireless MDDI client capable devices in a local area. In accordance with some aspects, the information related to a plurality of wireless MDDI client capable devices includes a string identifier corresponding to a device name, capabilities of the device, and a state indication, wherein the information is retained locally.

Also included in logical grouping 4102 is an electrical component 4106 for receiving a request to associate with at least one of the plurality of wireless MDDI client capable devices. The request can be received from a user, for example.

Further, logical grouping 4102 includes an electrical component 4108 for determining security capabilities of each of the plurality of wireless MDDI client capable devices and an electrical component 4110 for selectively performing a security association procedure. For example, the security procedure can be performed if both devices are security enabled and security is required for both devices. Also included is an electrical component 4112 for associating with the at least one of the plurality of wireless MDDI client capable devices.

In accordance with some aspects, logical grouping also includes an electrical component for conveying a message to a lower layer to obtain a list of devices and an electrical component for receiving a response that includes the list of devices. Also included in logical grouping is an electrical component for transmitting a packet to each of the devices included in the received list and an electrical component for receiving a response that contains strings identifiers for each of the responding devices.

In accordance with some aspects, the lower layer supports multicast. In this aspect, logical grouping includes an electrical component for transmitting a service query packet to a multicast group to solicit information from a selected wireless MDDI client capable device. The multicast group is specified by a multicast address.

In another aspect, the lower layer is wiMedia UWB MAC and logical grouping includes an electrical component for receiving application specific information elements related to each of the w-MDDI client capable devices.

In accordance with some aspects, the lower layer is UDP/IP. In this aspect, logical grouping includes an electrical component for communicating a service query packet to a multicast group on a UDP port. Also included in logical grouping is an electrical component for joining the multicast group on the UDP port and an electrical component for receiving a service response from each device that supports w-MDDI.

Additionally, system 4100 can include a memory 4114 that retains instructions for executing functions associated with electrical components 4104, 4106, 4108, 4110, and 4112, or other components. While shown as being external to memory 4114, it is to be understood that one or more of electrical components 4104, 4106, 4108, 4110, and 4112 can exist within memory 4114.

Figure 42:
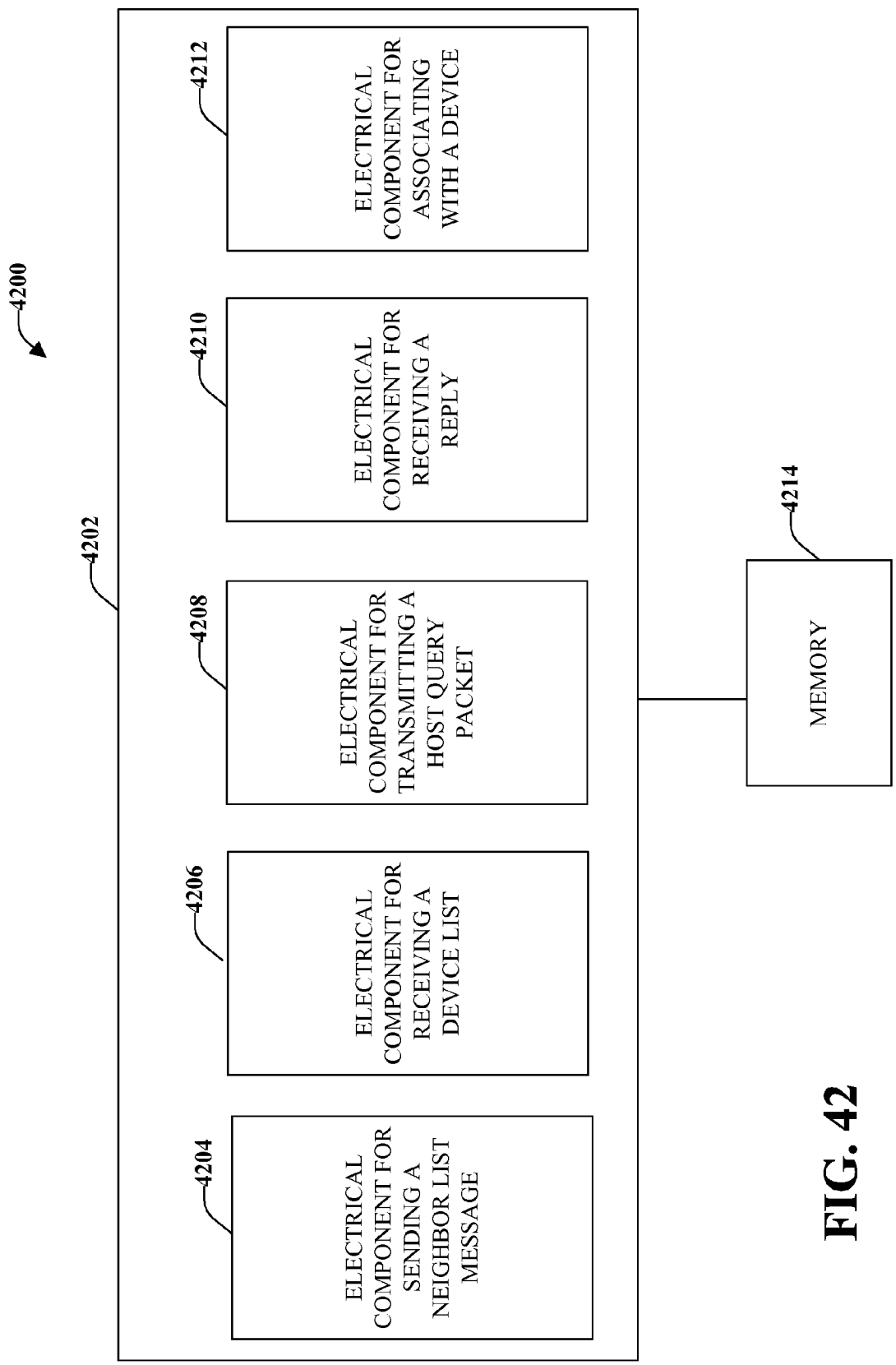
FIG. 42 illustrates a system for wirelessly communicating data at a high rate with a host entity.

FIG. 42 illustrates a system 4200 for wirelessly communicating data at a high rate with a host entity. It is to be appreciated that system 4200 is represented as including functional blocks, which may be functional blocks that represent functions implemented by a processor, software, or combination thereof (e.g., firmware).

Included in system 4200 is a logical grouping 4202 that includes an electrical component 4204 for sending a neighbor list message to a lower layer, the neighbor list message solicits a list of devices in a local area. Also included is an electrical component 4206 for receiving a list of devices in the local area. Further, logical grouping 4202 includes an electrical component 4208 for transmitting a query packet to each of the devices. An electrical component 4210 for receiving a reply that includes string identifiers for the replying device is included. The reply is received before expiration of a predetermined interval.

In accordance with some aspects, the neighbor list message is a "Get Neighbor List" message and the list of devices is received from a lower layer in a "Lower Layer Neighbor List Response." In accordance with some aspects, the query packet is a "w-MDDI Service Query" packet and the reply is a "w-MDDI Service Response" packet (e.g., Receiver Service Discover). In accordance with other aspects, the query packet is a "w-MDDI Host Query" packet and the reply is a "w-MDDI Host Response" packet (e.g., Sender Service Discovery).

If a reply is not received before expiration of a predetermined interval, the association is unsuccessful and a previous state is resumed. Logical grouping 4202 also includes an electrical component 4212 for associating with the replying device. In accordance with some aspects, the lower layer supports multicasting, is wiMedia UWB MAC and/or is UDP/IP. In accordance with some aspects, logical grouping 4202 also includes an electrical component for performing mutual security authentication.

Additionally, system 4200 can include a memory 4214 that retains instructions for executing functions associated with electrical components 4204, 4206, 4208, 4210, and 4212, or other components. While shown as being external to memory 4214, it is to be understood that one or more of electrical components 4204, 4206, 4208, 4210, and 4212 can exist within memory 4214.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for wirelessly communicating data at a high rate between a host entity and at least one remote wireless Mobile Display Digital Interface (MDDI) client capable device, comprising:
    transmitting, from an upper network layer to a lower network layer, a message to obtain a list of devices in a local area that support wireless MDDI;
    performing a service discovery process to obtain information related to a plurality of wireless MDDI client capable devices in a local area;
    receiving an indication to associate with at least one of the plurality of wireless MDDI client capable devices;
    determining security capabilities of each of the plurality of wireless MDDI client capable devices;
    selectively performing a security association procedure; and
    associating with the at least one of the plurality of wireless MDDI client capable devices.

2. The method of claim 1, wherein the information related to a plurality of wireless MDDI client capable devices includes a string identifier corresponding to a device name, capabilities of the device, and a state indication, wherein the information is retained locally.

3. The method of claim 1, wherein performing a service discovery process comprises:
    transmitting the message to the lower layer to obtain the list of devices in the local area that support wireless MDDI;
    receiving a response that includes the list of devices;
    sending a packet to each of the devices included in the received list; and
    receiving a response that contains strings identifiers for each of the responding devices.

4. The method of claim 3, wherein the lower layer supports multicast, the method further comprises transmitting a service query packet to a multicast group to solicit information from a selected wireless MDDI client capable device, wherein the multicast group is specified by a multicast address.

5. The method of claim 3, wherein the lower layer is wiMedia UWB MAC, the method further comprises receiving application specific information elements related to each of the w-MDDI client capable devices.

6. The method of claim 3, wherein the lower layer is UDP/IP, the method further comprising:
    transmitting a service query packet to a multicast group on a UDP port;
    joining the multicast group on the UDP port; and
    receiving a service response from each device that supports w-MDDI.

7. A wireless communications apparatus, comprising:
    a memory that retains instructions related to transmitting a message from an upper network layer to a lower network layer to obtain a list of devices in a local area that support wireless MDDI, performing a service discovery process to gather information related to a plurality of wireless MDDI client capable devices in a local area, receiving a request to associate with at least one of the plurality of wireless MDDI client capable devices, determining security capabilities of each of the plurality of wireless MDDI client capable devices, performing a security association procedure, and associating with the at least one of the plurality of wireless MDDI client capable devices; and
    a processor, coupled to the memory, configured to execute the instructions retained in the memory.

8. The wireless communications apparatus of claim 7, wherein the information related to a plurality of wireless MDDI client capable devices includes a string identifier corresponding to a device name, capabilities of the device, and a state indication, wherein the information is retained locally.

9. The wireless communications apparatus of claim 7, wherein the memory further retains instructions related to conveying the message to the lower layer to obtain the list of devices, receiving a response that includes the list of devices, transmitting a packet to each of the devices included in the received list, and receiving a response that contains strings identifiers for each of the responding devices.

10. The wireless communications apparatus of claim 9, wherein the lower layer supports multicast, the memory further retains instructions related to transmitting a service query packet to a multicast group to solicit information from a selected wireless MDDI client capable device, wherein the multicast group is specified by a multicast address.

11. The wireless communications apparatus of claim 9, wherein the lower layer is wiMedia UWB MAC, the memory further retains instructions related to receiving application specific information elements related to each of the w-MDDI client capable devices.

12. The wireless communications apparatus of claim 9, wherein the lower layer is UDP/IP, the memory further retains instructions related to communicating a service query packet to a multicast group on a UDP port, joining the multicast group on the UDP port, and receiving a service response from each device that supports w-MDDI.

13. A wireless communications apparatus that wirelessly communicates data at a high rate, comprising:
    means for performing a service discovery process to gather information related to a plurality of wireless MDDI client capable devices in a local area, wherein the means for performing the service discovery process comprises means for transmitting, from an upper network layer to a lower network layer, a message to obtain a list of devices that includes the plurality of wireless MDDI client capable devices in the local area;
    means for receiving a request to associate with at least one of the plurality of wireless MDDI client capable devices;
    means for determining security capabilities of each of the plurality of wireless MDDI client capable devices;
    means for selectively performing a security association procedure; and
    means for associating with the at least one of the plurality of wireless MDDI client capable devices.

14. The wireless communications apparatus of claim 13, wherein the information related to a plurality of wireless MDDI client capable devices includes a string identifier corresponding to a device name, capabilities of the device, and a state indication, wherein the information is retained locally.

15. The wireless communications apparatus of claim 13, further comprising:
    means for conveying the message to the lower layer to obtain the list of devices;
    means for receiving a response that includes the list of devices;
    means for transmitting a packet to each of the devices included in the received list, and
    means for receiving a response that contains strings identifiers for each of the responding devices.

16. The wireless communications apparatus of claim 15, wherein the lower layer supports multicast, the apparatus further comprises means for transmitting a service query packet to a multicast group to solicit information from a selected wireless MDDI client capable device, wherein the multicast group is specified by a multicast address.

17. The wireless communications apparatus of claim 15, wherein the lower layer is wiMedia UWB MAC, the apparatus further comprises means for receiving application specific information elements related to each of the w-MDDI client capable devices.

18. The wireless communications apparatus of claim 15, wherein the lower layer is UDP/IP, the apparatus further comprising:
    means for communicating a service query packet to a multicast group on a UDP port;
    means for joining the multicast group on the UDP port; and
    means for receiving a service response from each device that supports w-MDDI.

19. A computer program product, comprising:
    a nontransitory computer-readable medium comprising:
        a first set of codes for causing a computer to perform a service discovery process to obtain information related to a plurality of wireless MDDI client capable devices in a local area, wherein the service discovery process comprises transmitting, from an upper network layer to a lower network layer, a message to obtain a list of devices that includes the plurality of wireless MDDI client capable devices in the local area;
        a second set of codes for causing the computer to receive an indication to associate with at least one of the plurality of wireless MDDI client capable devices;
        a third set of codes for causing the computer to determine security capabilities of each of the plurality of wireless MDDI client capable devices;
        a fourth set of codes for causing the computer to perform a security association procedure; and
        a fifth set of codes for causing the computer to associate with the at least one of the plurality of wireless MDDI client capable devices.

20. The computer program product of claim 19, wherein the information related to a plurality of wireless MDDI client capable devices includes a string identifier corresponding to a device name, capabilities of the device, and a state indication, wherein the information is retained locally.

21. The computer program product of claim 19, wherein the lower layer supports multicast.

22. The computer program product of claim 19, wherein the lower layer is wiMedia UWB MAC or UDP/IP.

23. At least one processor configured to communicate data at a high rate between a host entity and at least one remote wireless MDDI client capable device, comprising:
    a first electrical component for performing a service discovery process to obtain information related to a plurality of wireless MDDI client capable devices in a local area, wherein the service discovery process comprises transmitting, from an upper network layer to a lower network layer, a message to obtain a list of devices that includes the plurality of wireless MDDI client capable devices in the local area;
    a second electrical component for receiving an indication to associate with at least one of the plurality of wireless MDDI client capable devices;
    a third electrical component for determining security capabilities of each of the plurality of wireless MDDI client capable devices;
    a fourth electrical component for selectively performing a security association procedure; and
    a fifth electrical component for associating with the at least one of the plurality of wireless MDDI client capable devices.

24. The at least one processor of claim 23, wherein the lower layer supports multicast.

25. The at least one processor of claim 23, wherein the lower layer is wiMedia UWB MAC or UDP/IP.

26. A method for wirelessly communicating data at a high rate with a host entity, comprising:
    transmitting a neighbor list message from an upper network layer to a lower network layer that solicits a list of devices in a local area;

receiving a list of devices in the local area;
sending a wireless MDDI query packet to each of the devices;
receiving a reply that includes string identifiers for the replying device, the reply is received before expiration of a predetermined interval; and
selectively associating with the replying device.

27. The method of claim 26, wherein the neighbor list message is a "Get Neighbor List" message and the list of devices is received from a lower layer in a "Lower Layer Neighbor List Response."

28. The method of claim 27, wherein the wireless MDDI query packet is a "w-MDDI Service Query" packet and the reply is a "w-MDDI Service Response" packet.

29. The method of claim 27, wherein the wireless MDDI query packet is a "w-MDDI Host Query" packet and the reply is a "w-MDDI Host Response" packet.

30. The method of claim 26, wherein the lower layer supports multicasting.

31. The method of claim 26, wherein the lower layer is wiMedia UWB MAC.

32. The method of claim 26, wherein the lower layer is UDP/IP.

33. The method of claim 26, wherein if a reply is not received before expiration of a predetermined interval, the association is unsuccessful and a previous state is resumed.

34. The method of claim 26, further comprises performing mutual security authentication.

35. A wireless communications apparatus, comprising:
a memory that retains instructions related to transmitting a neighbor list message from an upper network layer to a lower network layer; wherein the neighbor list message solicits a list of devices in a local area, receiving a list of devices in the local area, sending a wireless MDDI query packet to each of the devices, receiving a reply that includes string identifiers for the replying device, and selectively associating with the replying device, wherein the reply is received before expiration of a predetermined interval; and
a processor, coupled to the memory, configured to execute the instructions retained in the memory.

36. The wireless communications apparatus of claim 35, wherein the lower layer supports multicasting.

37. The wireless communications apparatus of claim 35, wherein the lower layer is wiMedia UWB MAC.

38. The wireless communications apparatus of claim 35, wherein the lower layer is UDP/IP.

39. The wireless communications apparatus of claim 35, wherein if a reply is not received before expiration of a predetermined interval, the association is unsuccessful and a previous state is resumed.

40. The wireless communications apparatus of claim 35, the memory retains instructions related to performing mutual security authentication.

41. A wireless communications apparatus that wirelessly communicates data at a high rate, comprising:
means for sending a neighbor list message from an upper network layer to a lower network layer, wherein the neighbor list message solicits a list of devices in a local area;
means for receiving a list of devices in the local area;
means for transmitting a wireless MDDI query packet to each of the devices;
means for receiving a reply that includes string identifiers for the replying device, the reply is received before expiration of a predetermined interval; and
means for associating with the replying device.

42. The wireless communications apparatus of claim 41, wherein the lower layer supports multicasting.

43. The wireless communications apparatus of claim 41, wherein the lower layer is wiMedia UWB MAC.

44. The wireless communications apparatus of claim 41, wherein the lower layer is UDP/IP.

45. The wireless communications apparatus of claim 41, wherein if a reply is not received before expiration of a predetermined interval, the association is unsuccessful and a previous state is resumed.

46. The wireless communications apparatus of claim 41, further comprises means for performing mutual security authentication.

47. A computer program product, comprising:
a nontransitory computer-readable medium comprising:
a first set of codes for causing a computer to transmit a neighbor list message from an upper network layer to a lower network layer, wherein the neighbor list message solicits a list of devices in a local area;
a second set of codes for causing the computer to receive a list of devices in the local area;
a third set of codes for causing the computer to transmit a wireless MDDI query packet to each of the devices;
a fourth set of codes for causing the computer to receive a reply that includes string identifiers for the replying device, the reply is received before expiration of a predetermined interval; and
a fifth set of codes for causing the computer to associate with the replying device.

48. The computer program product of claim 47, wherein the lower layer supports multicasting.

49. The computer program product of claim 47, wherein the lower layer is wiMedia UWB MAC or UDP/IP.

50. At least one processor configured to communicate data at a high rate, comprising:
a first electrical component for transmitting a neighbor list message from an upper network layer to a lower network layer, wherein the neighbor list message solicits a list of devices in a local area;
a second electrical component for receiving a list of devices in the local area;
a third electrical component for sending a wireless MDDI query packet to each of the devices;
a fourth electrical component for receiving a reply that includes string identifiers for the replying device, the reply is received before expiration of a predetermined interval; and
a fifth electrical component for selectively associating with the replying device.

51. The method of claim 1, wherein the upper network layer comprises a wireless MDDI layer.

52. The wireless communications apparatus of claim 7, wherein the upper network layer comprises a wireless MDDI layer.

53. The wireless communications apparatus of claim 13, wherein the upper network layer comprises a wireless MDDI layer.

54. The computer program product of claim 19, wherein the upper network layer comprises a wireless MDDI layer.

55. The processor of claim 23, wherein the upper network layer comprises a wireless MDDI layer.

56. The method of claim 26, wherein the upper network layer comprises a wireless MDDI layer.

57. The method of claim 35, wherein the upper network layer comprises a wireless MDDI layer.

58. The wireless communications apparatus of claim 41, wherein the upper network layer comprises a wireless MDDI layer.

59. The computer program product of claim 47, wherein the upper network layer comprises a wireless MDDI layer.

60. The at least one processor of claim 50, wherein the upper network layer comprises a wireless MDDI layer.

61. The computer program product of claim 19, wherein the first set of codes for causing a computer to perform a service discovery process further comprise:
- code for transmitting the message to the lower layer to obtain the list of devices in the local area that support wireless MDDI;
- code for receiving a response that includes the list of devices;
- code for sending a packet to each of the devices included in the received list; and
- code for receiving a response that contains strings identifiers for each of the responding devices.

62. The computer program product of claim 19 wherein the lower layer is UDP/IP, and further comprising:
- code for transmitting a service query packet to a multicast group on a UDP port;
- code for joining the multicast group on the UDP port; and
- code for receiving a service response from each device that supports w-MDDI.

* * * * *